US011643333B2

(12) United States Patent
Jaroniec et al.

(10) Patent No.: US 11,643,333 B2
(45) Date of Patent: May 9, 2023

(54) HIGH SURFACE AREA CRYSTALLINE METAL ALUMINATES AND A METHOD OF MANUFACTURE THEREOF AT LOWER TEMPERATURE

(71) Applicant: KENT STATE UNIVERSITY, Kent, OH (US)

(72) Inventors: Mietek Jaroniec, Stow, OH (US); Alexandre A. S. Goncalves, Kent, OH (US)

(73) Assignee: KENT STATE UNIVERSITY, Kent, OH (US)

( * ) Notice: Subject to any disclaimer, the term of this patent is extended or adjusted under 35 U.S.C. 154(b) by 763 days.

(21) Appl. No.: 16/658,481

(22) Filed: Oct. 21, 2019

(65) Prior Publication Data

US 2020/0123018 A1  Apr. 23, 2020

Related U.S. Application Data

(60) Provisional application No. 62/749,363, filed on Oct. 23, 2018.

(51) Int. Cl.
*C01F 7/021* (2022.01)
*B01J 37/04* (2006.01)
(Continued)

(52) U.S. Cl.
CPC ............... *C01F 7/021* (2013.01); *B01J 21/04* (2013.01); *B01J 23/72* (2013.01); *B01J 23/75* (2013.01);
(Continued)

(58) Field of Classification Search
CPC . C01F 7/021; C01F 7/441; B01J 21/04; B01J 23/72; B01J 23/75; B01J 23/755;
(Continued)

(56) References Cited

U.S. PATENT DOCUMENTS 4,380,510 A * 4/1983 D'Aniello, Jr. ........ B01J 23/894
502/332
4,392,980 A * 7/1983 Lee ...................... C01G 45/006
556/14
(Continued)

OTHER PUBLICATIONS

Fiori et al., Electronics Based on Two-dimensional Materials, Nat. Nanotechnol., 2014, vol. 9, pp. 768-779.
(Continued)

*Primary Examiner* — Melissa S Swain
(74) *Attorney, Agent, or Firm* — Hudak, Shunk & Farine Co LPA

(57) ABSTRACT

Sintering is an important issue in creating crystalline metal oxides with high porosity and surface area, especially in the case of high-temperature materials such as metal aluminates. Herein we report a rationally designed synthesis of metal aluminates that diminishes the surface area loss due to sintering. Metal aluminate (e.g. $MeAl_2O_4$ or $MeAlO_3$–Me=Mg, Mn, Fe, Ni, Co, Cu, La, or Ce; or mixture thereof) supported on $\gamma$-$Al_2O_3$ with ultralarge mesopores (up to 30 nm) was synthesized through microwave-assisted peptization of boehmite nanoparticles and their self-assembly in the presence of a triblock copolymer (Pluronic P123) and metal nitrates, followed by co-condensation and thermal treatment. The resulting materials showed the surface area up to about 410 $m^2 \cdot g^{-1}$, porosity up to about 2.5 $cm^3 \cdot g^{-1}$, and very good thermal stability. The observed enhancement in their thermomechanical resistance is associated with the faster formation of the metal aluminate phases. The nanometer scale path diffusion and highly defective interface of $\gamma$-alumina facilitate the counter diffusion of $Me^{X+}$ and $Al^{3+}$ species and further formation of the metal aluminate phase.

7 Claims, 36 Drawing Sheets

(51) Int. Cl.
| | |
|---|---|
| B01J 21/04 | (2006.01) |
| B01J 37/08 | (2006.01) |
| B01J 23/75 | (2006.01) |
| B01J 23/72 | (2006.01) |
| C01F 7/441 | (2022.01) |
| B01J 23/755 | (2006.01) |

(52) U.S. Cl.
CPC ............. B01J 23/755 (2013.01); B01J 37/04 (2013.01); B01J 37/088 (2013.01); C01F 7/441 (2013.01); C01P 2006/12 (2013.01); C01P 2006/14 (2013.01)

(58) Field of Classification Search
CPC ...... B01J 37/04; B01J 37/088; C01P 2006/12; C01P 2006/14
USPC ........................................................ 423/115
See application file for complete search history.

(56) References Cited

U.S. PATENT DOCUMENTS

| | | | | |
|---|---|---|---|---|
| 6,369,000 | B1* | 4/2002 | Johnson | B01J 23/06 502/439 |
| 9,677,019 | B2* | 6/2017 | Chandran | C10J 3/723 |
| 11,305,229 | B1* | 4/2022 | He | B01D 53/1418 |

OTHER PUBLICATIONS

Jayalakshmi et al., Simple Capacitors to Supercapacitors—An Overview, Int. J. Electrochem. Sci., 2008, vol. 3, pp. 1196-1217.
Li et al., Optical Properties and Applications of Hybrid Semiconductor Nanomaterials, Coord. Chem. Rev., 2009, vol. 253, pp. 3015-3041.
Ogletree et al., Revealing Optical Properties of Reduced-Dimensionality Materials at Relevant Length Scales, Adv. Mater., 2015, vol. 27, pp. 5693-5719.
Shiju et al., Recent Developments in Catalysis using Nanostructured Materials, Applied Catalyst A, 2009, vol. 356, pp. 1-17.
Zaera et al., Nanostructured Materials for Applications in Heterogeneous Catalysis, Chem. Soc. Rev., 2013, vol. 42, pp. 2746-2762.
Zhou et al., Catalytic Conversion of Lignocellulosic Biomass to Fine Chemicals and Fuels, Chem. Soc. Rev., 2011, vol. 40, pp. 5588-5617.
Labhasetwar et al., Perovskite-type catalytic materials for environmental applications, Sci. Technol. Adv. Mater., 2015, vol. 16, pp. 1-13.
Trueba et al., γ-Alumina as a Support for Catalysts: A review of Fundamental Aspects, Eur. J. Inorg. Chem., 2005, pp. 3393-3403.
Qian et al., Design and Functionalization of Photocatalytic Systems within Mesoporous Silica, ChemSusChem, 2014, vol. 7, pp. 1528-1536.
Perez et al., Stabilization of Self-Assembled Alumina Meso-phases, Chem. Mater., 2013, vol. 25, pp. 848-855.
Klimov et al., Supported on Alumina Co—Mo Hydrotreating Catalysts: Dependence of Catalytic and Strength Characteristics on the Initial AlOOH Particle Morphology, Catal. Today, 2014, vol. 220, pp. 66-77.
Pinheiro et al., Analysis of Coke Deposition and Study of the Structural Features of MAl2O4 Catalysts for the Dry Reforming of Methane, Catal. Commun., 2009, vol. 11, pp. 11-14.
Vasiliadou et al., A. Synthesis and Performance of Highly Dispersed Cu/SiO2 Catalysts for the Hydrogenolysis of Glycerol, Appl. Catalysis B, 2014, vol. 145, pp. 108-119.
Fulvio et al., Synthesis of Mesoporous Alumina from Boehmite in the Presence of Triblock Copolymer, ACS Appl. Mater. Interfaces, 2010, vol. 2, pp. 588-593.
Goncalves et al., One-Pot Synthesis of Mesoporous Ni—Ti—Al Ternary Oxides: Highly Active and Selective Catalysts for Steam Reforming of Ethanol, ACS Appl. Mater. Interfaces, 2017, vol. 9, pp. 6079-6092.

Morris et al., Ordered Mesoporous Alumina-Supported Metal Oxides, J. Am. Chem. Soc., 2008, vol. 130, pp. 15210-15216.
Cai et al., Facile Synthesis of Ordered Mesoporous Alumina and Alumina-Supported Metal Oxides with Tailored Adsorption and Framework Properties, Chem. Mater., 2011, vol. 23, pp. 1147-1157.
De Morais Batista et al., Mesoporous MAl2O4 (M=Cu, Ni, Fe or Mg) spinels: Characterisation and Application in the Catalytic Dehydrogenation of Ethylbenzene in the Presence of CO2, Appl. Catalysis A, 2010, vol. 382, pp. 148-157.
Giiannakas et al., Surface Properties, Textural Features and Catalytic Performance for NO plus CO Abatement of Spinels MAl2O4 (M=Mg, Co and Zn) Developed by Reverse and Bicontinuous Microemulsion Method, Appl. Surf. Sci., 2007, vol. 253, pp. 6969-6979.
Rahnamaeiyan et al., Novel Sol-gel Method for Synthesis of Cobalt Aluminate and its Photocatalyst Application, J. Mater. Sci.: Mater. Electron., 2015, vol. 26, pp. 8720-8725.
Chorkendorff et al., Concepts of modern catalysis and kinetics, Wiley-VHC: Weinheim, Germany, 2003, pp. 192-193.
Shang et al., Facile Strategy for Synthesis of Mesoporous Crystalline γ-alumina by Partially Hydrolyzing Aluminum Nitrate Solution, J. Mater. Chem., 2012, vol. 22, pp. 23806-23814.
Perez et al., Condensation-Enhanced Self-Assembly as a Route to High Surface Area alpha-Aluminas, Chem. Mater., 2013, vol. 25, pp. 3971-3978.
Wang et al., Facile Synthesis of Highly Ordered Mesoporous Alumina with High Thermal and Hydrothermal Stability using Zirconia as Promoter, Mater. Lett., 2013, vol. 97, pp. 27-30.
Vedygain et al., Stabilization of Active Sites in Alloyed Pd—Rh Catalysts on γ-Al2O3 Support, Catalysis Today, 2014, vol. 238, pp. 80-86.
Tirsoaga et al., Eco-friendly Combustion-based Synthesis of Metal Aluminates MAl2O4 (M=Ni, Co), J. Nanopart. Res., 2011, vol. 13, pp. 6397-6408.
Stathopoulos et al., Low-temperature Synthesis of Spinels MAl2O4 (M=Mg, Co, Ni, Cu, Zn) Prepared by a Sol-gel Method, Prog. Colloid Polym., 2001, vol. 118, pp. 17-21.
Dhak et al., Particle Size Comparison of Soft-chemically Prepared Transition Metal (Co, Ni, Cu, Zn) Aluminate Spinels, J. Am. Ceram. Soc, 2006, vol. 89, pp. 1014-1021.
Yue et al., Crystalline Mesoporous Metal Oxide, Prog. Nat. Sci., 2008, vol. 18, pp. 1329-1338.
Zhen et al., Crystalline Mesoporous Transition Metal Oxides: Hard-templating Synthesis and Application in Environmental Catalysis, Front. Environ. Sci. Eng., 2013, vol. 7, pp. 341-355.
Pozzoli et al., Entropy Production During the Process of Sintering, Procedia Mater. Sci., 2015, vol. 8, pp. 1073-1078.
Deraz, N. M., Synthesis and Characterization of Nano-Sized Nickel Aluminate Spinel Crystals, Int. J. Electrochem. Sci., 2013, vol. 8, pp. 5203-5212.
Trumble et al., The Thermodynamics of Spinel Interphase Formation at Diffusion-Bonded Ni/Al2O3 Interfaces, Acta Metall. Mater., 1991, vol. 39, pp. 1915-1924.
Pettit et al., Formation of NiAl2O4 by Solid State Reaction, J. Am. Ceram. Soc., 1966, vol. 49, pp. 199-203.
Ghule et al., In Situ Monitoring of NiO—Al2O3 Nanoparticles Synthesis by Thermo-Raman Spectroscopy, Mater. Chem. Phys., 2010, vol. 119, pp. 86-92.
Anchieta et al., Effect of Thermal Treatment on the Synthesis of NiAl2O4 Spinel Oxide using Chitosan as Precursor, Ceramica, 2015, vol. 61, pp. 477-481.
Taguchi et al., Reaction Temperature Variations on the Crystallographic State of Spinel Cobalt Aluminate, Dalton Trans., 2013, vol. 42, pp. 7167-7176.
Jafari et al., Preparation of CoAl2O4 Nanoblue Pigment via Polyacrylamide Gel Method, Powder Technology, 2014, vol. 266, pp. 236-238.
Srisawad et al., Formation of CoAl2O4 Nanoparticles via Low-Temperature Solid-State Reaction of Fine Gibbsite and Cobalt Precursor, J. Nanomater., 2012, Article ID. 108369, pp. 1-8.
Ummartyotin et al., Cobalt Aluminate (CoAl2O4) Derived from Co—Al-TEA Complex and Its Dielectric Behaviors, J. Sustainable Energy Environ., 2009, vol. 1, pp. 31-37.

(56) References Cited

OTHER PUBLICATIONS

Kwak et al., Preparation and characterization of nanocrystalline CuAl2O4 spinel catalysts by Sol-gel Method for the Hydrogenolysis of Glycerol, Catal. Commun., 2012, vol. 24, pp. 90-95.
Hu et al., Formation of Copper Aluminate Spinel and Cuprous Aluminate Delafossite to Thermally Stabilize Simulated Copper-laden Sludge, J. Hazard. Mater., 2010, vol. 181, pp. 399-404.
Li et al., Synthesis and Characterization of Nanocrystalline CoAl2O4 Spinel Powder by Low Temperature Combustion, J. Eur. Ceram. Soc., 2003, vol. 23, pp. 2289-2295.
Ahmed, I. S., A Simple Route to Synthesis and Characterization of CoAl2O4 Nanocrystalline via Combustion Method using Egg White (Ovalbumine) as a New Fuel, Mater. Res. Bull., 2011, vol. 46, pp. 2548-2553.
Hashemzehi et al., Micro-wave-Assisted Solution Combustion Synthesis of Spinel-Type Mixed Oxides for Esterification Reaction, Chem. Eng. Commun., 2017, vol. 204, pp. 415-423.
Manikandan et al., Sesamum Indicum Plant Extracted Microwave Combustion Synthesis and Opto-Magnetic Properties of Spinel MnxCo1—xAl2O4 Nano-Catalysts, J. Nanosci. Nanotechnol, 2016, vol. 16, pp. 448-456.
Mimani, T., Instant Synthesis of Nanoscale Spinel Aluminates, J. Alloys Compd., 2001, vol. 315, pp. 123-128.
Lv et al., Synthesis, Characterization and Photocatalytic Properties of Spinel CuAl2O4 Nanoparticles by a Sonochemical Method, J. Alloys Compd., 2009, vol. 479, pp. 480-483.
Abaide et al., Production of Copper and Cobalt Aluminate Spinels and Their Application as Supports for Inulinase Immobilization, Mater. Res. (Sao Carlos, Braz.), 2015, vol. 18, pp. 1062-1069.
Habibi et al., Low-temperature Synthesis of Mesoporous Nanocrystalline Magnesium Aluminate (MgAl2O4) Spinel with High Surface Area using a Novel Modified Sol-gel Method, Adv. Powder Technol., 2017, vol. 28, pp. 1249-1257.
Kumar et al., Comparative Study of Nano Copper Aluminate Spinel Prepared by Sol-gel and Modified Sol-gel Techniques: Structural, Electrical, Optical and Catalytic Studies, J. Alloys Compd., 2012, vol. 522, pp. 39-45.
Platero et al., Synthesis of High Surface Area CoAl2O4 and NiAl2O4 Spinels by an Alkoxide Route, Res. Chem. Intermed., 1999, vol. 25, pp. 187-194.
Otero et al., Sol-gel Method for Preparing High Surface Area CoAl2O4 and Al2O3—CoAl2O4 Spinels, Mater. Lett., 1999, vol. 39, pp. 22-27.
Cesteros et al., Preparation and Characterization of Several High-area NiAl2O4 Spinels. Study of their Reducibility, Chem. Mater., 2000, vol. 12, pp. 331-335.
McCarty et al., Vacancies in Solids and the Stability of Surface Morphology, Nature, 2001, vol. 412, pp. 622-625.
Pavelec et al., A Multi-Technique Study of CO2 Adsorption on Fe3O4 Magnetite, J. Chem. Phys., 2017, vol. 146, pp. 014701-014701-10.
Funk et al., Effect of Oxygen Vacancy Sites on CO2 Adsorption Dynamics: The case of Rutile (1×1)-TiO2(110), Chem. Phys. Lett., 2006, vol. 422, pp. 461-465.
Liu et al., Spontaneous Dissociation of CO2 to CO on Defective Surface of Cu(I)/TiO2-x Nanoparticles at Room Temperature, J. Phys. Chem. C, 2012, vol. 116, pp. 7904-7912.
Wang et al., Adsorption of CO2 on Pristine Zn—ZnO(0001) and Defected Zn—ZnO(0001): A Thermal Desorption Spectroscopy Study, Surf. Sci., 2005, vol. 577, pp. 158-166.
Peymannia et al., Production of a Stable and Homogeneous Colloid Dispersion of Nano CoAl2O4 Pigment for Ceramic ink-jet ink, J. Eur. Ceram. Soc., 2014, vol. 34, pp. 3119-3126.
James et al., CuAl2O4 Formation and its Effect on α-Al2O3 Phase Evolution on Calcination of Metal ion Doped Boehmite Xerogels, Mater. Chem. Phys., 2007, vol. 103, pp. 248-254.
Ragupathi et al., Combustion Synthesis, Structure, Magnetic and Optical Properties of Cobalt Aluminate Spinel Nanocrystals, Ceram. Int., 2014, vol. 40, pp. 13067-13074.
Stangar et al., Sol-gel-derived Thin Ceramic CoAl2O4 Coatings for Optical Applications, Mater. Technol., 2002, vol. 36, pp. 387-394.
Ouahdi et al., Synthesis of CoA21O4 by Double Decomposition Reaction Between LiAlO2 and Molten KCoCl3, J. Eur. Ceram. Soc., 2008, vol. 28, pp. 1987-1994.
Salleh et al., New Insight into Electrochemical-induced Synthesis of NiAl2O4/Al2O3: Synergistic Effect of Surface Hydroxyl Groups and Magnetism for Enhanced Adsorptivity of Pd(II), Appl. Surf. Sci., 2015, vol. 349, pp. 485-495.
Preudhomme et al., Infrared Studies of Spinels-III: The Normal II-III Spinels. Spectrochim Acta, 1971, vol. 27A, pp. 1817-1835.
Ghiasi et al., Synthesis and Optical Properties of Cubic Co3O4 Nanoparticles via Thermal Treatment of a Trinuclear Cobalt Complex, Mater. Sci. Semicond. Process., 2016, vol. 42, pp. 311-318.
McClure, D., The Distribution of Transition Metal Cations in Spinels, J. Phys. Chem. Solids, 1957, vol. 3, pp. 311-317.
Ragupathi et al., Preparation, Characterization and Catalytic Properties of Nickel Aluminate Nanoparticles: A Comparison Between Conventional and Microwave Method, J. Saudi Chem. Soc., 2017, vol. 21, pp. S231-S239.
Meyer et al., Micro-emulsion Mediated Sol-gel Synthesis of Nano-scaled MAl2O4 (M=Co, Ni, Cu) Spinels from Single-source Heterobimetallic Alkoxide Precursors, J. Mater. Chem., 1999, vol. 9, pp. 1755-1763.
Leal et al., NiAl2O4 Catalysts Prepared by Combustion Reaction using Glycine as Fuel, Mater. Res. Bull., 2011, vol. 46, pp. 1409-1413.
Allahyar et al., Simple New Synthesis of Nickel Oxide (NiO) in Water using Microwave Irradiation, J. Mater. Sci.: Mater. Electron., 2017, vol. 28, pp. 2846-2851.
Balamurugan et al., A Versatile Combustion Synthesis and Properties of Nickel Oxide (NiO) Nanoparticles, J. Supercond. Novel Magn., 2016, vol. 29, pp. 2207-2212.
Busca et al., FT-IR Study of the Surface-Properties of the Spinels NiAl2O4 and CoAl2O4 in Relation to Those of Transitional Aluminas, J. Catal., 1991, vol. 131, pp. 167-177.
Ribeiro et al., Synthesis of NiAl2O4 with High Surface Area as Precursor of Ni Nanoparticles for Hydrogen Production, Int. J. Hydrogen Energy, 2010, vol. 35, pp. 11725-11732.
Fu et al., Tailoring Mesoporous α-Al2O3 Properties by Transition Metal Doping: A Combined Experimental and Computational Study, Chem. Mater., 2017, vol. 29, pp. 1338-1349.
Kruk et al., Gas Adsorption Characterization of Ordered Organic—Inorganic Nanocomposite Materials, Chem. Mater., 2001, vol. 13, pp. 3169-3183.
Kruk et al. Application of Large Pore MCM-41 Molecular Sieves to Improve Pore Size Analysis Using Nitrogen Adsorption Measurements, Langmuir, 1997, vol. 13, pp. 6267-6273.
Cao et al., Synthesis of Ultra-Large-Pore SBA-15 Silica with Two-Dimensional Hexagonal Structure Using Triisopropylbenzene as Micelle Expander, Chem. Mater., 2009, vol. 21, pp. 1144-1153.
Tang et al., Polymer-templated Mesoporous Hybrid Oxides of Al and Cu: Highly Porous Sorbents for Ammonia, RSC Adv., 2016, vol. 6, pp. 38662-38670.
Hinokuma et al., Copper Oxides Supported on Aluminum Oxide Borates for Catalytic Ammonia Combustion, J. Phys. Chem. C, 2016, vol. 120, pp. 24734-24742.
Hinokuma et al., Catalytic Activity and Selectivities of Metal Oxides and Pt/Al2O3 for NH3 Combustion, Chem. Lett., 2016, vol. 45, pp. 179-181.
Liu et al., Copper-complexed Clay/poly-acrylic Acid Composites: Extremely Efficient Adsorbents of Ammonia Gas, Appl. Clay Sci., 2016, vol. 121, pp. 154-161.

\* cited by examiner

HIGH SURFACE AREA CRYSTALLINE METAL ALUMINATES AND A METHOD OF MANUFACTURE THEREOF AT LOWER TEMPERATURE

FIELD OF THE INVENTION

Sintering is an important issue in creating crystalline metal oxides with high porosity and surface area, especially in the case of high-temperature materials such as metal aluminates. Herein we report a rationally designed synthesis of metal aluminates that diminishes the surface area loss due to sintering. Metal aluminates (e.g. $MeAl_2O_4$ or $MeAlO_3$– Me=Mg, Mn, Fe, Ni, Co, Cu, Ce or La; or mixtures thereof) supported on $\gamma$-$Al_2O_3$ with ultralarge mesopores (up to about 30 nm—KJS method) was synthesized through peptization of boehmite nanoparticles and their self-assembly in the presence of a block copolymer and metal salts, followed by co-condensation and thermal treatment. The resulting materials showed the surface area up to about 410 $m^2 \cdot g^{-1}$, porosity up to about 2.5 $cm^3 \cdot g^{-1}$, and very good thermal stability. The observed enhancement in their thermomechanical resistance is associated with the faster formation of the metal aluminate phases. The nanometer scale path diffusion and highly defective interface of $\gamma$-alumina facilitate the counter diffusion of $Me^{X+}$ and $Al^{3+}$ species and further formation of the metal aluminate phase.

BACKGROUND OF THE INVENTION

Metal oxides and mixed metal oxides are largely applied in several fields such as electronics,[1,2] optics,[3,4] and catalysis.[5,6] In the latter, metal oxides are extensively studied in several reactions, including oil refining, fine chemistry, and environmental catalysis.[7,8] Since chemical reactions involving heterogeneous catalysts occur onto the catalyst surface, high surface area and well-developed porosity are beneficial for transfer of reactants to catalytic sites and for turnover frequency. Moreover, metal oxides are usually deposited on solid supports, among which mesoporous alumina and silica are the most studied inorganic supports.[9,10] However, the interaction between the supported transition metal and alumina is usually stronger than that with silica. Thus, alumina supports usually possess better properties than siliceous counterparts such as higher acidity/basicity and are more favorable for achieving high dispersion of catalytic nanoparticles, and therefore are most often commercially applied.

In general, it is desirable that solid supports possess specific features such as improved thermal and mechanical stability[11,12] and proper surface properties that ensure high dispersion of active components.[13] The formation of crystalline phases in metal oxide based catalysts can be advantageous and disadvantageous. The latter occurs when the supported metal oxide, e.g., copper oxide on silica[14], becomes crystalline in the form of large crystals, which jeopardizes high dispersion of the active phase. On the other hand, the improved crystallinity of the support, e.g., $\gamma$-alumina phase,[15] is beneficial for the thermal, hydrothermal, and mechanical stability. However, the synthesis of crystalline structures such as $MeAl_2O_4$ (Me=divalent metals) can overcome the aforementioned disadvantage and retain the advantage because the insertion of the active phase precursor (Me) into alumina crystal structure results in the high dispersion of transition metal species at the atomic level. Thus, the aforementioned synthesis strategy represents an improvement as compared to that producing highly homogeneous amorphous metalalumina based materials.[16-18]

Moreover, a further improvement in the metal dispersion and accessibility of nanostructured oxide catalysts can be achieved by enhancing their porosity and surface area.

SUMMARY OF THE INVENTION

Metal aluminas such as $MeAl_2O_4$ materials have been shown to be interesting catalysts due to their activity and stability[13,19-21], while $\gamma$-alumina is known as the most important catalyst support,[9] and both types of materials possess a spinel-type crystal structure. Although the XRD pattern of $\gamma$-$Al_2O_3$ resembles that of a spinel structure, the stoichiometry in the chemical formula of $Al_2O_3$ does not reflect spinel composition, which is usually represented by $AB_2O_4$, where A and B denote divalent and trivalent cations, respectively. Therefore, the $\gamma$-$Al_2O_3$ crystal structure would be more similar to $(Al^{3+})Al_2O_4$, which does not obey the charge neutrality requirement. In order to obtain charge neutrality $\gamma$-$Al_2O_3$ is a cation-deficient material with inherent structural defects.[22] Moreover, the synthesis of crystalline alumina, $MeAl_2O_4$, and most of metal oxides is usually performed at high temperatures using partially crystalline or amorphous precursors to generate high surface area and/or porous materials.[17] For instance, $\gamma$-alumina with large pore sizes and pore volumes can be obtained using commercial boehmite nanoparticles through their peptization followed by condensation and thermal treatment[15] or other strategies.[9,23-26]

The use of higher temperatures to improve crystallinity of porous materials has a drawback, which is reflected by reducing their mesostructural ordering and stability as well as by decreasing their specific pore volume and surface area. In other words, high temperature promotes sintering of the porous material. $MeAl_2O_4$ materials are usually obtained at temperatures above 600° C.[27-29] Therefore, they possess low specific surface area and pore volume as compared to the amorphous counterparts or materials with low degree of crystallinity.[17-19] This phenomenon is unavoidable because it is thermodynamically driven; namely, a reduction in the entropy caused by increasing crystallinity is compensated by the pore closure, resulting in the reduction of surface energy and minimization of the overall energy. The use of hard templates to support the mesophase during high temperature treatment is the most common strategy used to overcome this drawback.[19,30,31] However, it requires extra steps to produce porous materials, and the crystal growth cannot be controlled exclusively inside the pores as the outside diffusion is favored.

Any practical strategy for synthesis of metal oxides requires easy steps and readily available precursors that form highly nanoporous crystalline oxides suitable for several applications such as catalysis and adsorption. Sintering is an important issue in creating crystalline metal oxides with high porosity and surface area, especially in the case of high-temperature materials such as metal aluminates. Considering current technologies, it is challenging to create such materials with tuned surface properties, well-developed porosity, and proper degree of crystallinity, particularly with all these features. In the case of materials prepared via thermal activation, the formation of porosity and crystallinity are contrasting processes. Usually, crystallinity improves with increasing temperature, which in turn promotes sintering, the consequence of which is the deterioration or collapse of pores paired with the development of crystallinity. This phenomenon is unavoidable as it is thermodynamically driven. We have designed a synthesis strategy to circumvent the aforementioned phenomenon and obtain ceramic catalysts with outstanding features as compared to other synthesis strategies. Our studies indicate that if no significant phase transitions occur, the sintering process slows down upon temperature evolution. Therefore, our synthesis strategy aimed to create crystalline phases of metal aluminates in a solid solution with γ-alumina at lower temperatures. Consequently, our method diminishes both the surface area and porosity losses due to sintering. Metal aluminates (e.g. $MeAl_2O_4$ or $MeAlO_3$–Me=Mg, Mn, Fe, Ni, Co, Cu, Ce or La; or mixture thereof) supported by $γ-Al_2O_3$ (or other transition phases of alumina or mixture thereof) with ultra-large mesopores (up to 30 nm) were synthesized through peptization of boehmite nanoparticles and their self-assembly with a pore directing agent, followed by co-condensation and thermal treatment. The resulting materials showed the surface area up to about 410 $m^2 \cdot g^{-1}$, and porosity up to about 2.5 $cm^3 \cdot g^{-1}$, and very good thermal stability. The observed enhancement in their thermomechanical resistance is associated with the faster formation of the metal aluminates phases. In general, the formation of crystalline phases is limited by chemical potential and diffusion constraints. The latter is a limiting factor for high-temperature materials, and was improved with our strategy by bringing the counter-diffusion to the nanometer scale. The nanometer scale path-diffusion and highly defective interface of γ-alumina (due to peptization) facilitate the counter-diffusion of $Me^{x+}$ and $Al^{3+}$ species, and consequently, the formation of metal aluminate phases. This sets this strategy apart from current technologies. Moreover, it was found that the use of copper induces the formation of α-alumina at up to 30 $m^2 \cdot g^{-1}$, which is 2-3 times higher than that of α-alumina obtained via the currently existing methods. Additionally, analysis of the material prepared by the aforementioned strategy over one year ago shows its high stability. This is interesting because α-alumina with high surface area (commonly in the form of small particles) is usually unstable due to the fast crystal growth rate. Our material shows dimensions in the micrometer range and, therefore, its stability is better.

DETAILED DESCRIPTION OF THE INVENTION

Figure 1:
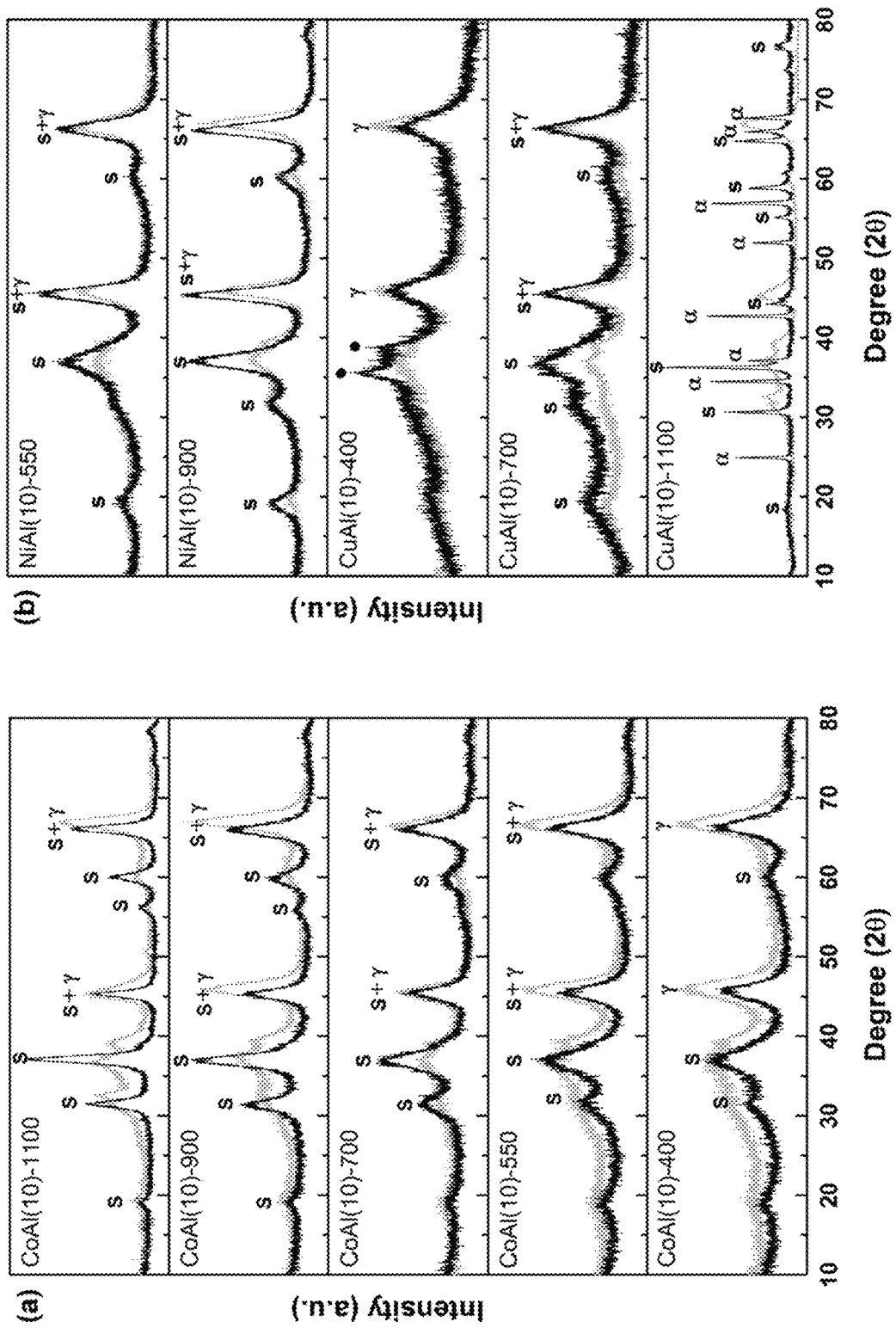
FIG. 1 reflects powder XRD patterns obtained for MeAl (10)-γ calcined at different temperatures. The gray lines represent patterns for the samples prepared without metal addition—samples $Al_2O_3$-γ. The symbols refer only to the diffraction patterns MeAl(10)-γ MeAl(10)-γ. The symbol (s) indicates the presence of $CoAl_2O_4$, $NiAl_2O_4$, or $CuAl_2O_4$ spinel phases, while (•) indicates CuO, (γ) $γ-Al_2O_3$, and (α) $α-Al_2O_3$.

To establish synthesis strategies that permit minimizing the sintering process, one needs to elucidate the entropy changes during thermal treatment. The entropy production involved in the sintering process is quite complex because it involves factors such as temperature, chemical potential gradient, grain-boundary migration, and chemical reactions.[32] These factors define the differences in the mass transfer. e.g., vacancy diffusion, metal cation and oxygen diffusion, and grain growth.[32-34] For instance, the mechanism of crystal formation and growth of metal aluminates rely on the cation counter-diffusion at the interfaces of both metal oxides—$Al_2O_3$ and MeO—formed during the initial stages of thermal treatment.[35] The diffusion of $Me^{2+}$ at the alumina interface leads to the formation of $Al^{3+}$ ions (eq 1), which diffuse at the metal oxide interface and form $Me^{2+}$ ions (eq 2), and vice versa. Note that equations 1 and 2 occur simultaneously, which is equivalent to the overall equation 3.[33,35] Additionally, a large amount of energy is required to speed up the cation counter-diffusion; thus, the formation of metal aluminates usually happens at high temperatures.[27-29,36-41] As a result, the highly crystalline metal aluminates have the specific surface areas up to 40 $m^2·g^{-1}$ and low porosity.[41-47] By abandoning the degree of crystallinity or creating nanoparticles (the main strategy found in literature), the specific surface area can be improved to about 200 $m^2·g^{-1}$ and pore volumes to about 0.4 $cm^3·g^{-1}$, with pore diameters below 10 nm.[29,37,41,48-55] Therefore, a new synthetic strategy to create nanostructured metal aluminates is needed to further advance the use of these materials.

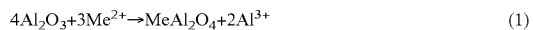

$$4Al_2O_3 + 3Me^{2+} \rightarrow MeAl_2O_4 + 2Al^{3+} \quad (1)$$

$$2Al^{3+} + 4MeO \rightarrow MeAl_2O_4 + 3Me^{2+} \quad (2)$$

$$Al_2O_3 + MeO \rightarrow MeAl_2O_4 \quad (3)$$

It is known that the existence of crystal defects facilitates the mass transfer of ions across the oxide interface. Thus, the existence of vacancies plays an important role in the phase formation and crystal growth of metal aluminates. This phenomenon occurs because bulk diffusion is known to be faster than surface diffusion,[56] implying that the surface diffusion is the limiting factor for the crystal formation and further growth. Therefore, by enhancing vacancies in a solid support one can improve the mass transfer of atoms across the interface and facilitate the phase formation at lower temperatures. Nonetheless, the formation of a new phase requires energy and will also enhance sintering. Therefore, if the crystalline phase is partially formed and possesses higher amount of interfacial defects, the metal diffusion and further insertion is facilitated without requiring a significant amount of energy to drive the formation of the new crystalline phase. Thus, the overall sintering will be minimized, which in turn preserves the materials' textural properties.

Furthermore, to rationally design better crystalline transition metal aluminates with high porosity and crystallinity, the aforementioned issues should be taken into account. Fulvio et al. prepared γ-alumina with pores up to 16 nm by using peptized boehmite as a precursor, and the $CO_2$-TPD analysis of which showed strong adsorption toward $CO_2$.[15] This strong $CO_2$ sorption may be related to presence of surface defects, because the chemisorption of $CO_2$ on solids is known to be strongly influenced by the type of surface defects.[57-60] The same synthesis procedure generates alumina with high thermal stability. Therefore, the aforementioned synthesis after suitable modification seems to be well suited for the design and preparation of nanostructured $MeAl_2O_4$ with high surface area and well-developed porosity.

Herein, we report a synthetic strategy to create thermally resistant metal aluminates (e.g. $MeAl_2O_4$ and $MeAlO_3$– Me=Mg, Mn, Fe, Ni, Co, Cu, Ce or La; or mixture thereof) with high surface areas and large pore volumes and pore sizes, along with enhanced adsorption properties. This has been accomplished by rational minimization of the entropy changes during the crystallization process; specifically, (1) by using precursors that lead to similar crystal structures after thermal treatment (conversion of boehmite to either γ-alumina or $MeAl_2O_4$-spinel structures), (2) by employing the synthesis strategy that enhances surface defects, and (3) by performing peptization of boehmite to create alumina polycations, which facilitate the counter-diffusion between $Me^{2+}$ and $Al^{3+}$—the phenomenon that drives the spinel phase formation and growth. Moreover, microwave irradiation was used to achieve homogeneous peptization of boehmite nanoparticles and formation of alumina polycations. Microwave irradiation was performed for high throughput studies; however, conventional thermal treatment delivers similar results. The triblock copolymer Pluronic P123 was used to generate porosity because of favorable polymer-metal interactions. Pluronic® P123 block copolymer was used as the main structure directing agent but other structure directing agents work too.

Structural Characterization of the Synthesized Materials.

A detailed description of the synthesis and materials characterization can be found in the Supporting Information. The synthesized materials herein discussed were named as MeAl(x)-y, where x stands for the transition metal percentage (5, 10, 20, or 30), y stands for the temperature applied in the calcination step, and Me indicates the transition metal cation used (Mg, Mn, Fe, Co, Ni, Cu, Ce or La; or mixture thereof). As reference materials, boehmite (namely Bh-y) and alumina (namely $Al_2O_3$-y) were calcined in the range of 400-1100° C.; the latter was obtained by following the aforementioned synthesis procedure without the use of a transition metal source.

The powder XRD patterns for the samples synthesized with addition of the transition metal cation, calcined at different temperatures, are displayed in FIG. 1. The gray lines represent the XRD patterns of the samples produced without addition of the transition metals, namely, $Al_2O_3$-y samples, to better show the difference in the crystalline phase due to the presence of the transition metal. Analysis of the $Al_2O_3$-y materials can be found in FIG. 6(a) Supporting Information, which shows the presence of transitional alumina phases. γ-$Al_2O_3$ is present at the temperature of 400° C. and persists until 900° C. at which γ-$Al_2O_3$ starts to transform to δ-$Al_2O_3$. At the temperature of 1100° C., the θ-$Al_2O_3$ phase is partially formed, thus the material comprises a mixture of transitional phases. (δ+θ)-$Al_2O_3$. These results are in accordance with a previous report[15] and show the difference in the phase transition when the peptization of boehmite is applied prior to the thermal treatment. For comparison, the XRD patterns of boehmite calcined at different temperatures, named Bh-y, are shown in FIG. 6(b), Supporting Information.

The observed differences in the phase transition of alumina upon temperature evolution are expected because each phase formation depends on several parameters, such as the ratio of octahedral $AlO_6$ and tetrahedral $AlO_4$ species, OH/Al ratio, solution pH, and existence of defects and impurities, as well as the dehydration kinetics; each of these factors is dependent on the synthesis strategy used. Therefore, it is expected that the addition of transition metal cations to the synthesis provides changes in the crystallization process and resulting phases. FIG. 1 shows the phases present in the material with 10% of $Co^{2+}$ added. As can be seen, the presence of $Co^{2+}$ changes the XRD pattern, being similar to a $CoAl_2O_4$ spinel structure, which is more evident as the temperature increases.

The sample CoAl(x)-400 is a dark olive green color, which changes to bright blue at 550° C. and becomes darker at higher temperatures. The bright blue color is characteristic of $CoAl_2O_4$ spinel.[40,61] Therefore, the dark olive green color of CoAl(10)-400 and CoAl(20)-400 may indicate that the spinel structure was not fully formed. Moreover, the diffraction peaks of $CoAl_2O_4$, $Co_3O_4$, and $\gamma$-$Al_2O_3$ have nearby positions, which makes it difficult to establish unequivocally the presence of each phase at 400° C. Additionally, because the amount of cobalt is not in stoichiometry to form a pure $CoAl_2O_4$ phase (1 Co:2 Al), a solid solution is expected.

Figure 6:
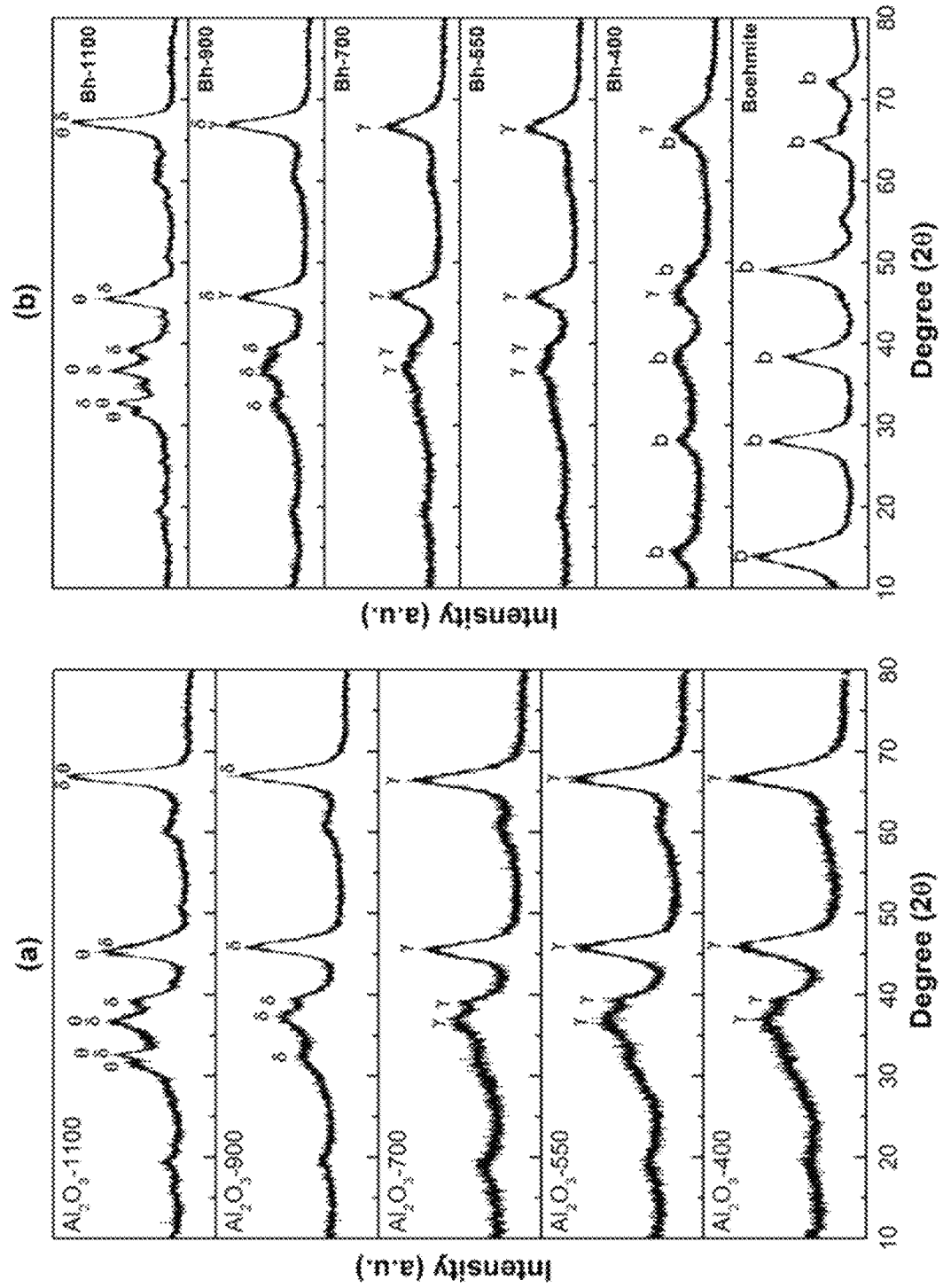
FIG. 6 shows powder XRD patterns obtained for (a) $Al_2O_3$-y, and (b) boehmite nanoparticles [CCD 00-001-0774] calcined at different temperatures. The diffraction peaks show the presence of transitional aluminas: (γ) $γ-Al_2O_3$, (δ) $δ-Al_2O_3$, and (θ) $θ-Al_2O_3$. In (b) the diffraction peaks indicate a transition from boehmite to $γ-Al_2O_3$ [CCD 00-010-0425] at 400° C. and 700° C., however, at 400° C. there is a portion of unconverted boehmite (b refers to boehmite peaks). At 900° C., the $δ-Al_2O_3$ phase [CCD 00-047-1770] is formed, partially transitioning to $θ-Al_2O_3$ [CDD 00-023-1009] at 1100° C.; thus both $(δ+θ)-Al_2O_3$ phases are present. A similar trend is observed in (a), however there is no evidence for unconverted boehmite phase at 400° C.

On the other hand, the most intense peaks of $\gamma$-$Al_2O_3$ are located at 45.9° and 67.0° (2θ) with approximately equal intensities (see FIG. 6(b), Supporting Information), while the peaks characteristic for $CoAl_2O_4$ are located at 2θ=31.2° and 36.8° (the latter having highest intensity) and are followed by less intense peaks at 59.2° and 65° (2θ). $Co_3O_4$ has the most intense peak at 36.8°, followed by weak peaks at 31.3° and 65.2°. Also, CoAl(x)-400 shows a relatively intense peak at 36.8° followed by less intense peaks at 45.9° and 67.0°. Nevertheless, the variations in the intensities of the diffraction peaks of the mixed Co—Al oxides studied, and their differences in relation to the XRD pattern of $Al_2O_3$-y (FIG. 1a, gray lines), indicate the formation of $CoAl_2O_4$ at 400° C., which is in a mixture with $\gamma$-$Al_2O_3$. However, the most intense peak for $Co_3O_4$ may be hidden by the broadening of the most intense peak of $CoAl_2O_4$.

Figure 7:
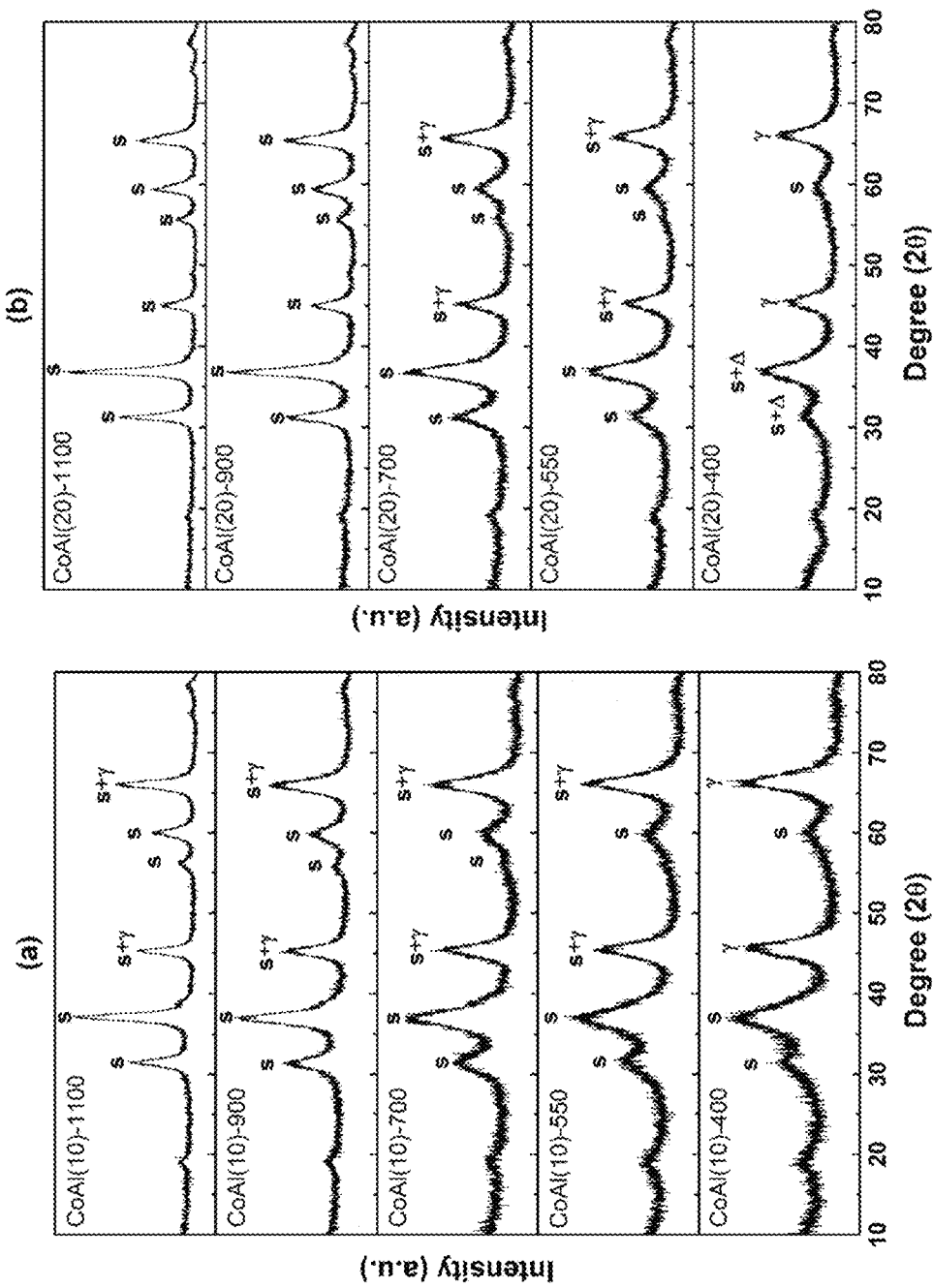
FIG. 7 shows powder XRD patterns obtained for (a) CoAl(10), and (b) CoAl(20), calcined at different temperatures, displaying diffraction peaks characteristic for (s) $CoAl_2O_4$ [CCD 00-044-0160], (γ) $γ-Al_2O_3$ [CCD 00-010-0425] and (Δ) $Co_3O_4$ [CDD 00-042-14-67].
Figure 8:
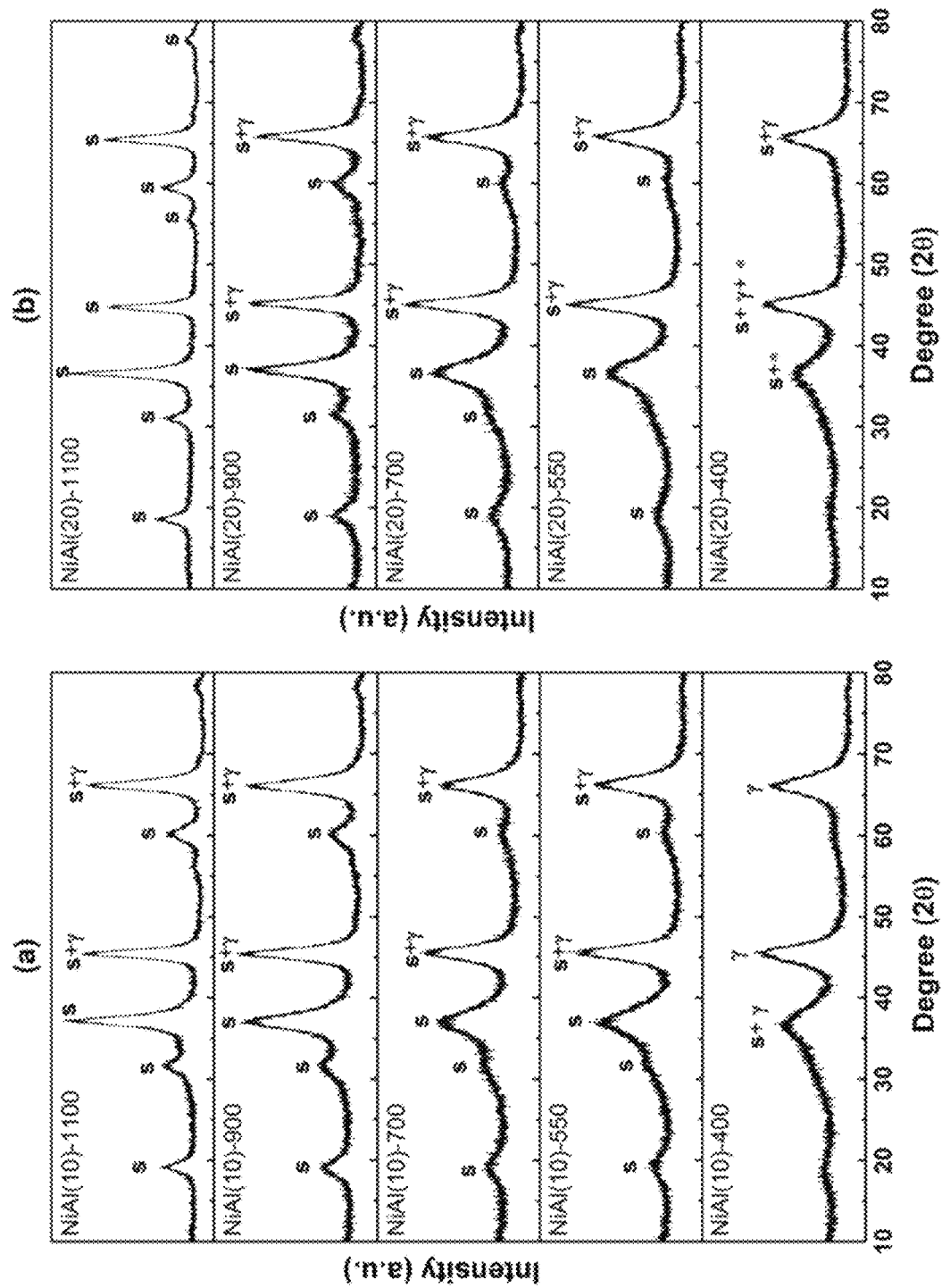
FIG. 8 shows powder XRD patterns obtained for (a) NiAl(10), and (b) NiAl(20), calcined at different temperatures, displaying diffraction peaks characteristic for (s) $NiAl_2O_4$ [CCD00-010-0339], (γ) $γ-Al_2O_3$ [CCD 00-010-0425], and (*) NiO [CCD 00-047-1049].
Figure 9:
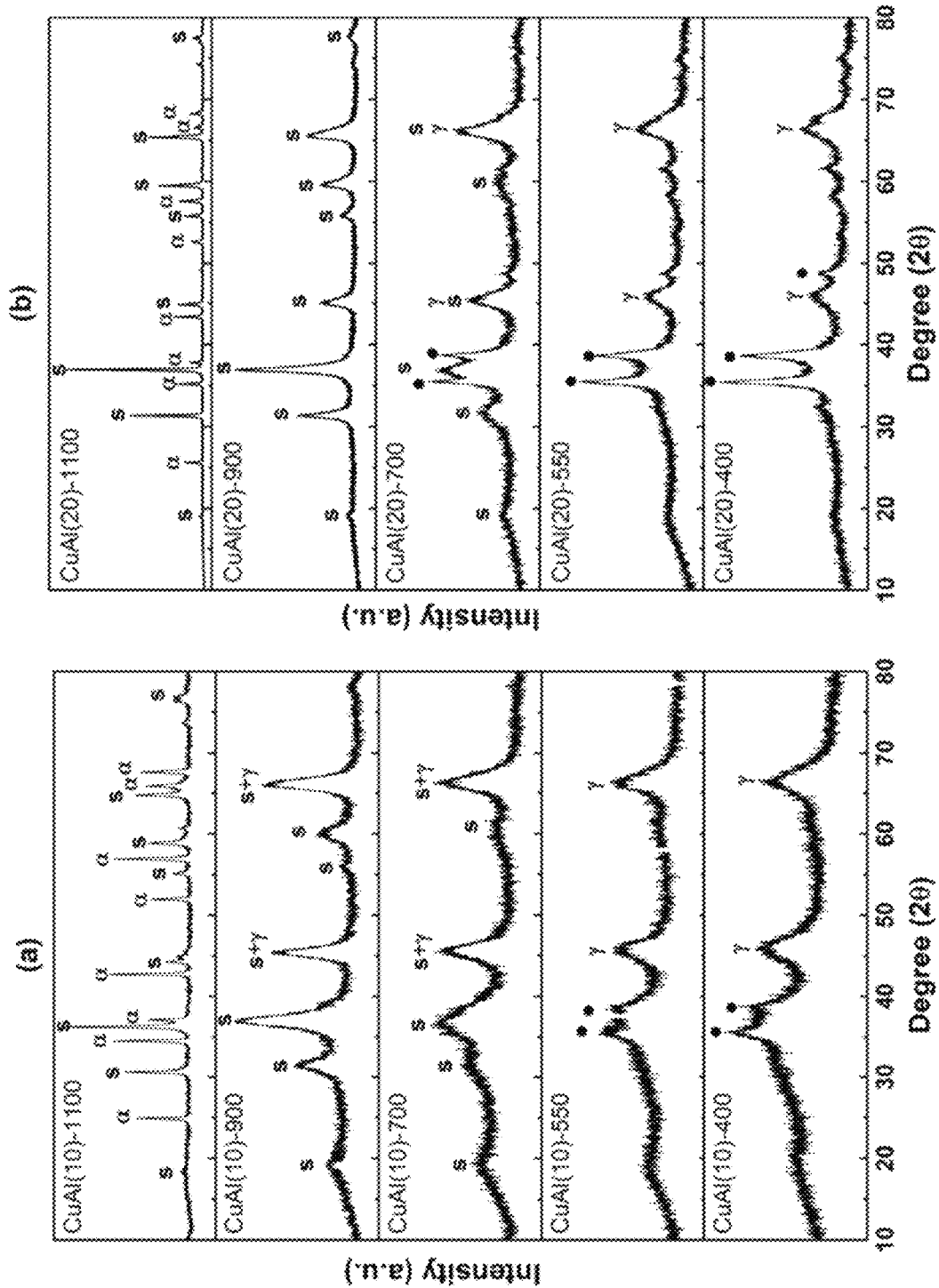
FIG. 9 shows powder XRD patterns obtained for (a) CuAl(10), and (b) CuAl(20), calcined at different temperatures, displaying diffraction peaks characteristic for (s) $CuAl_2O_4$ [CCD 00-033-0448], (•) CuO [CDD 00-045-0937], (γ) $γ-Al_2O_3$ [CCD 00-010-0425], and (α) $α-Al_2O_3$ [CCD 00-010-0173].
Figure 10A:
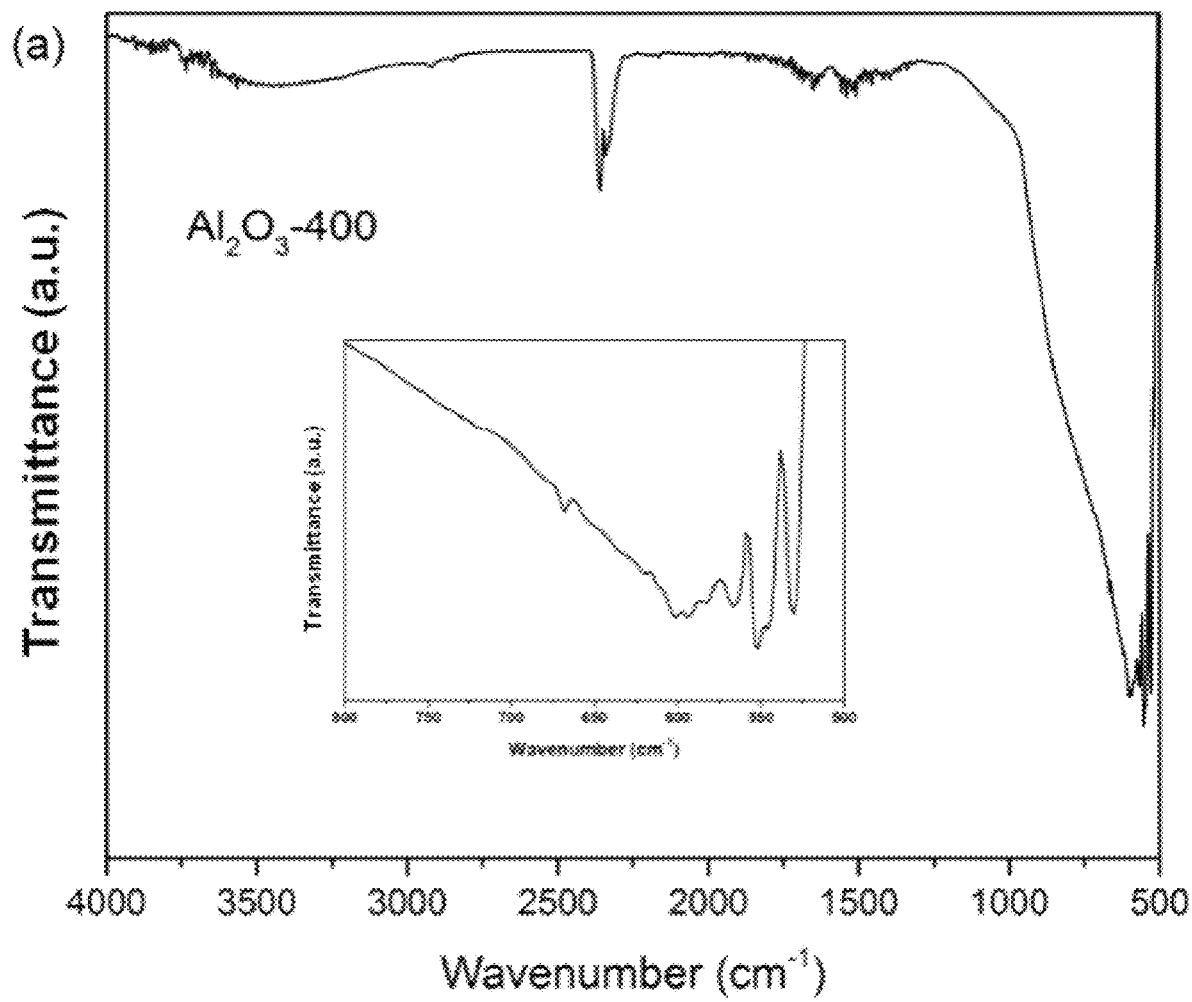
FIG. 10 shows FT-IR spectra of (a,b) $Al_2O_3$-y, (c,d) CoAl(20)-y and (e,f) NiAl(20)y materials.
Figure 10B:
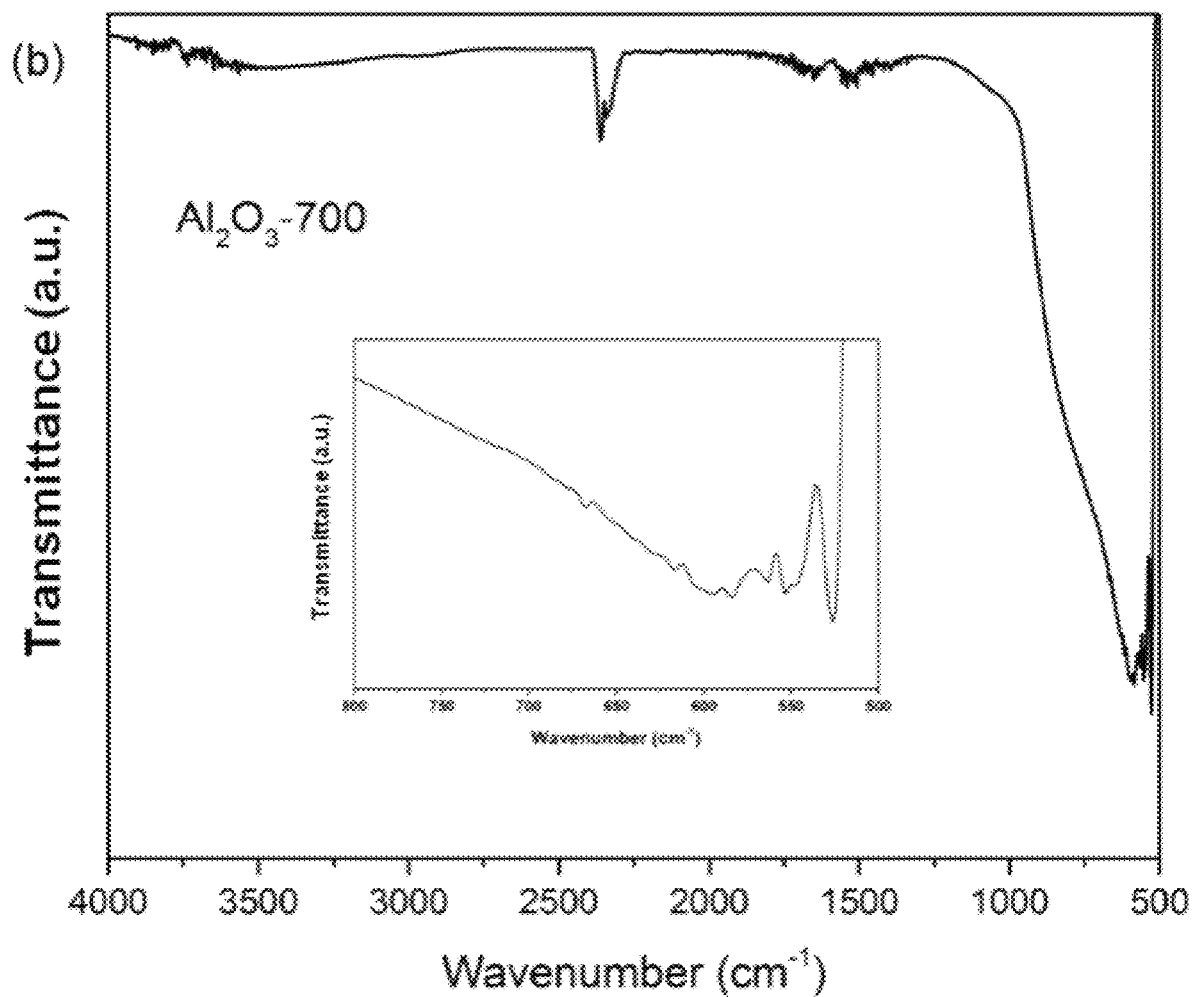
Figure 10C:
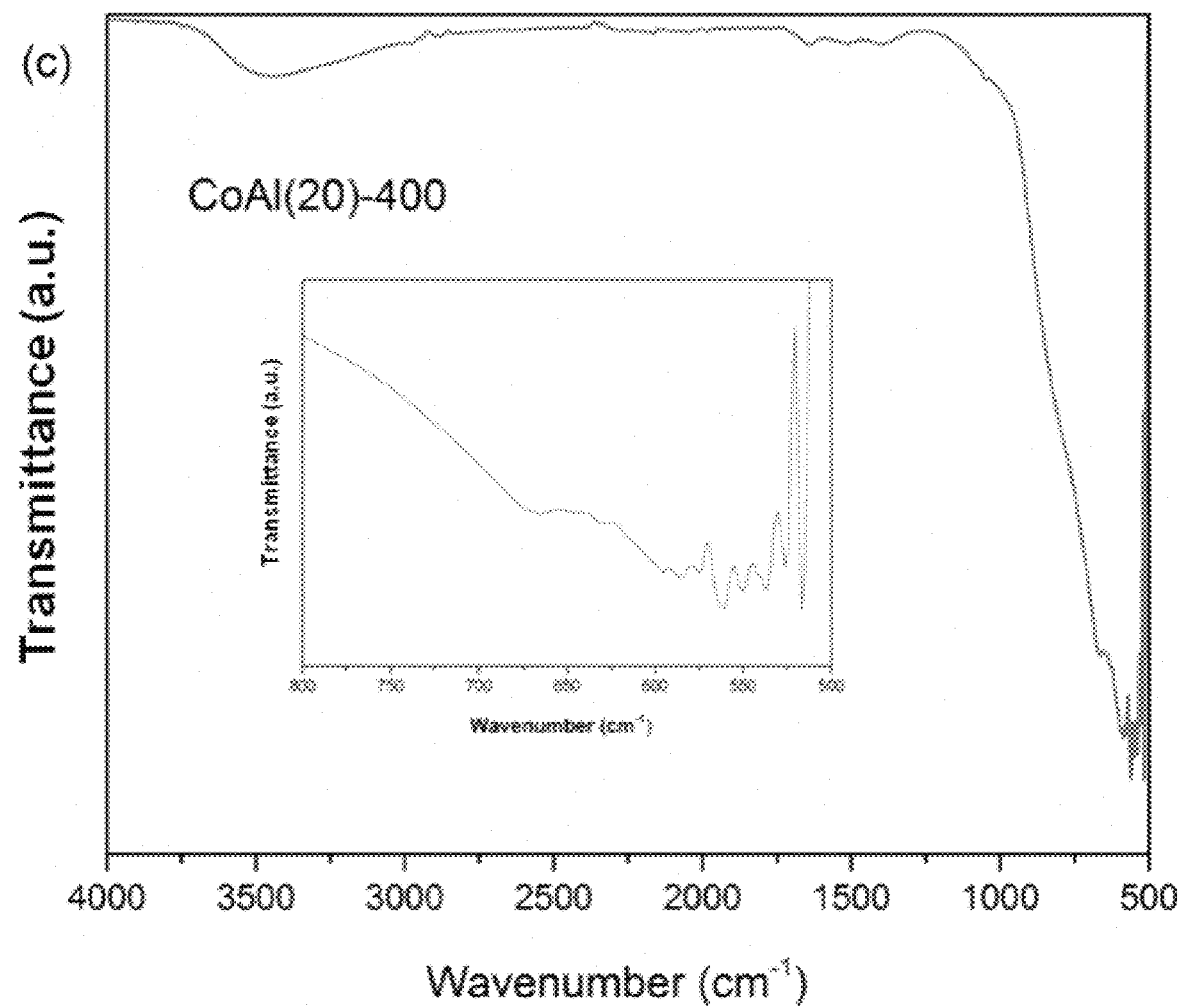
Figure 10D:
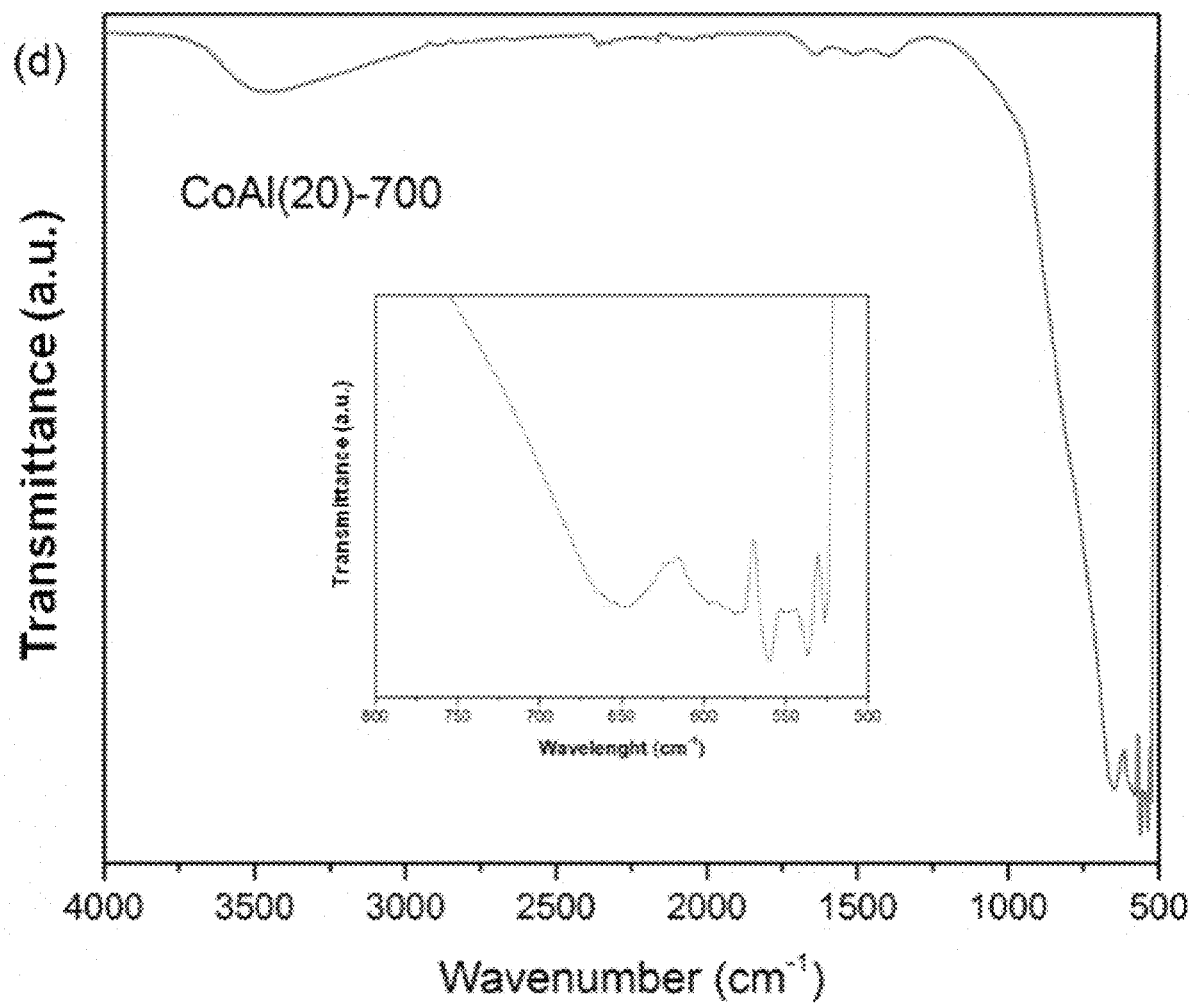
Figure 10E:
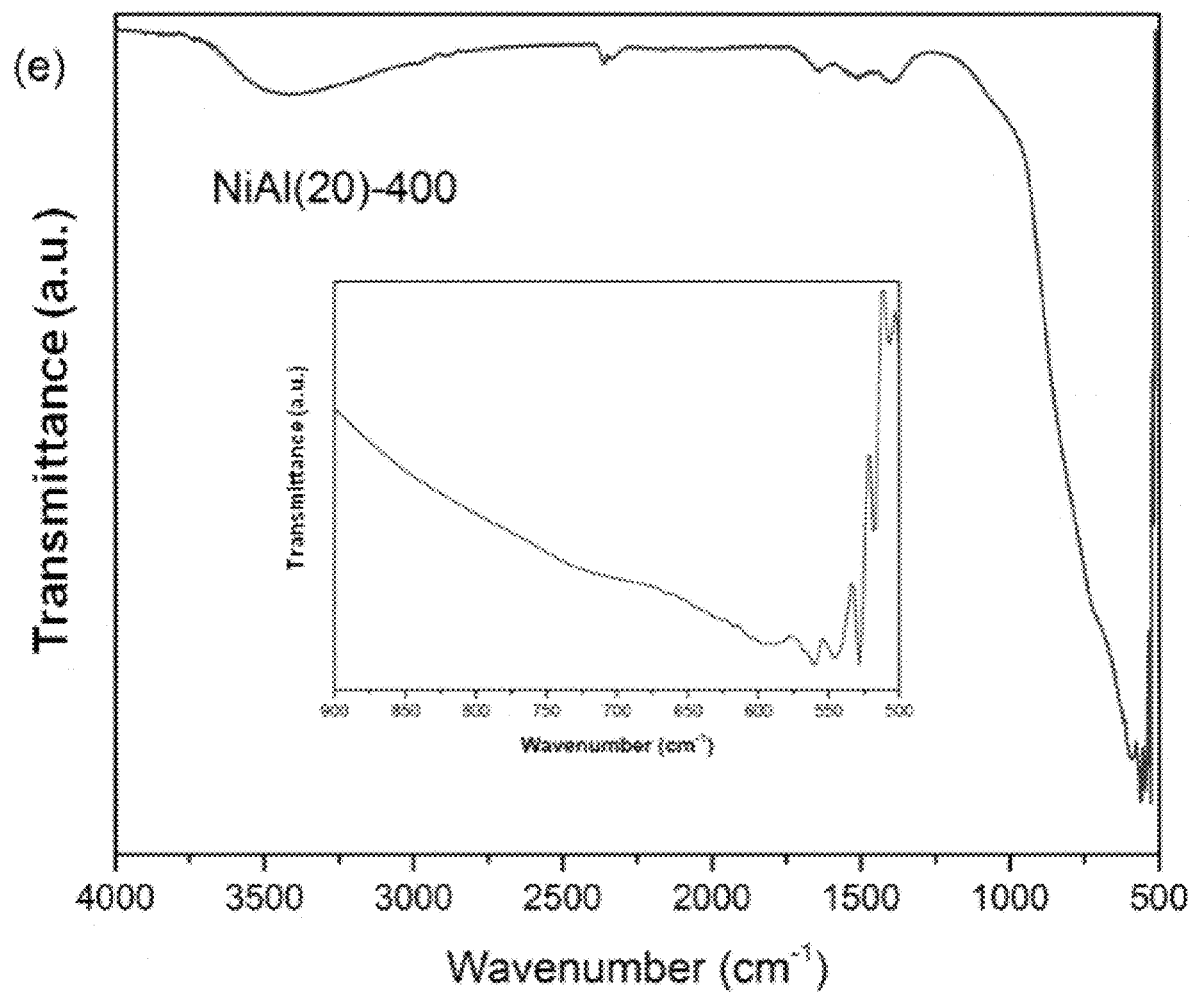
Figure 10F:
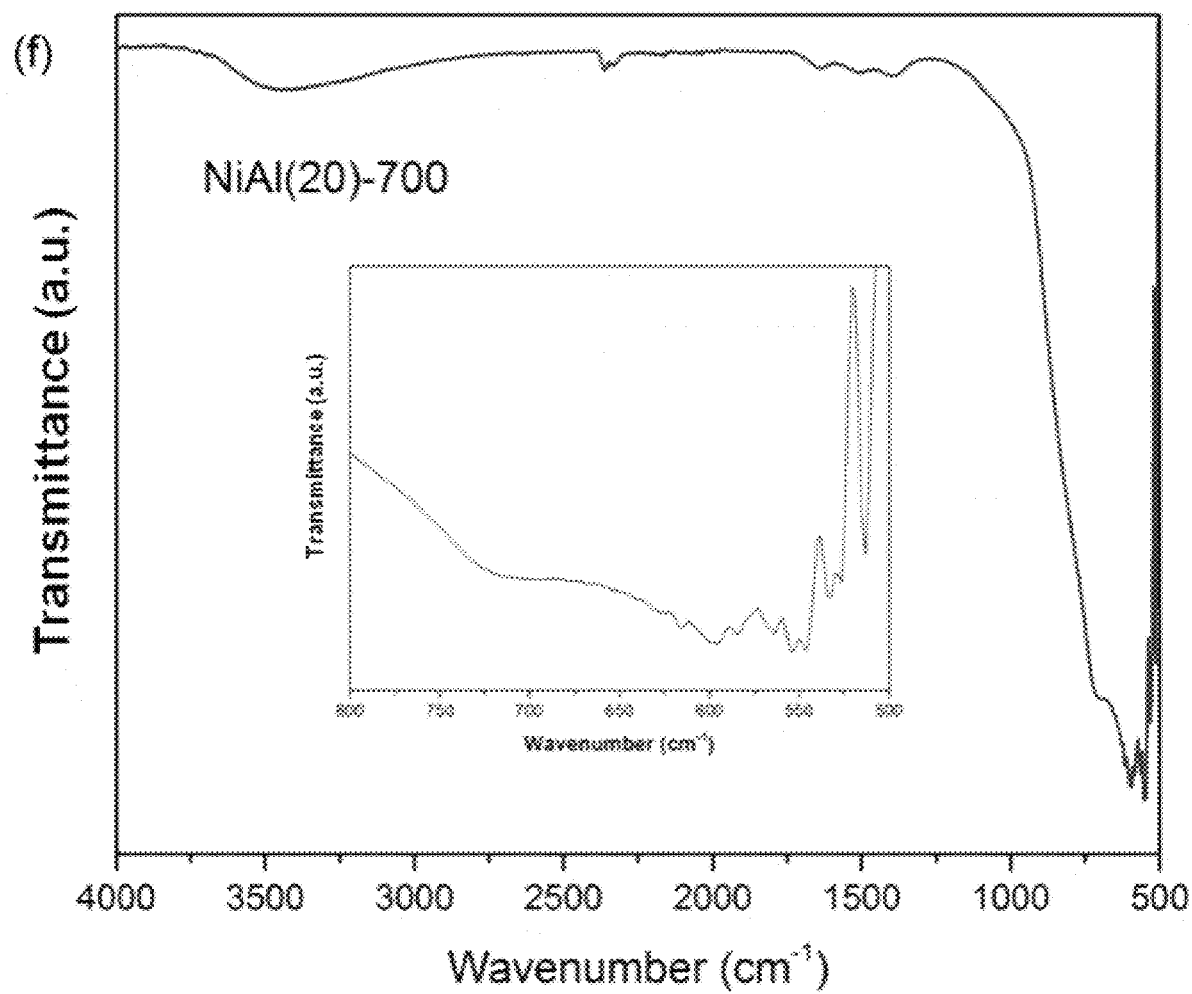
Figure 11:
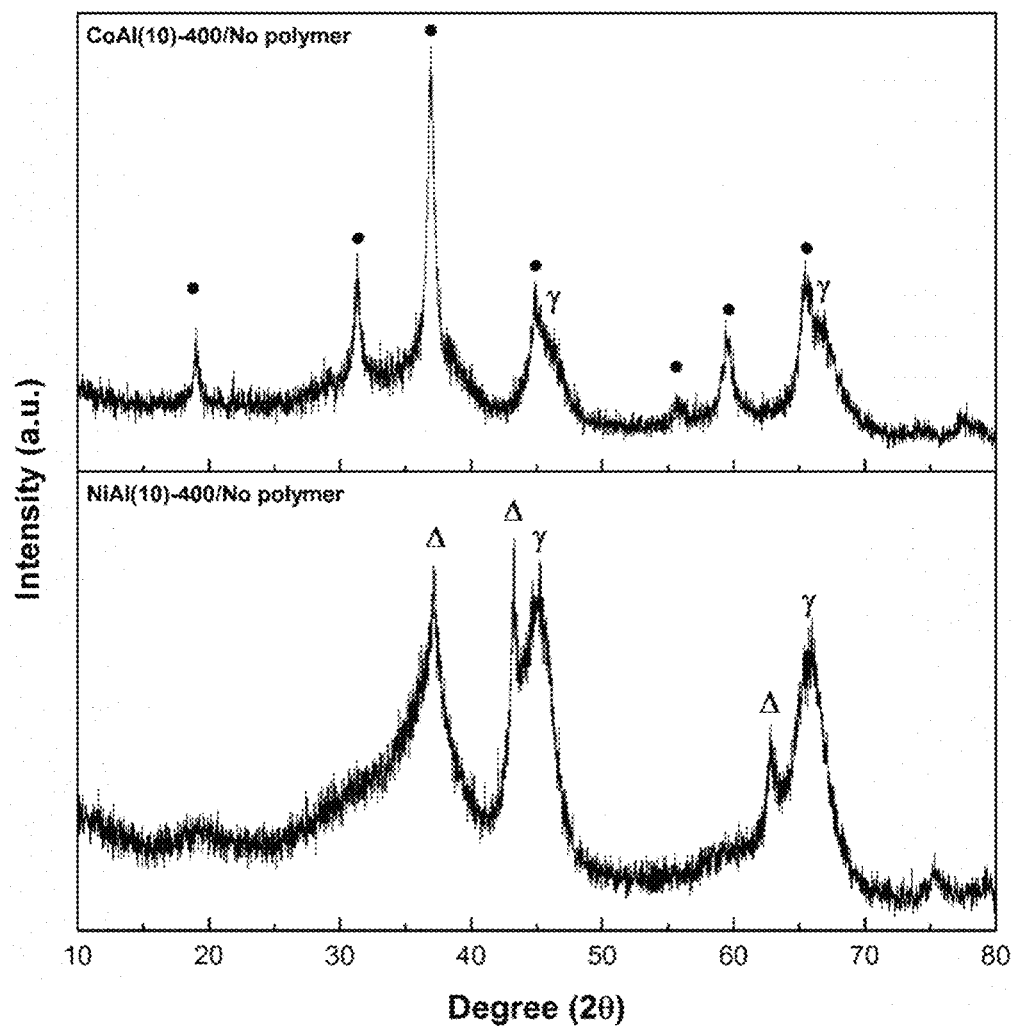
FIG. 11 shows powder XRD patterns obtained for CoAl (10)-400 and NiAl(10)-400 synthesized without the presence of block copolymer. The diffraction patterns show the presence of (•) $Co_3O_4$ [CDD 00-042-1467], (Δ) NiO [CDD 00-047-1049], and (γ) $γ-Al_2O_3$ [CDD 00-010-0425].
Figure 12A:
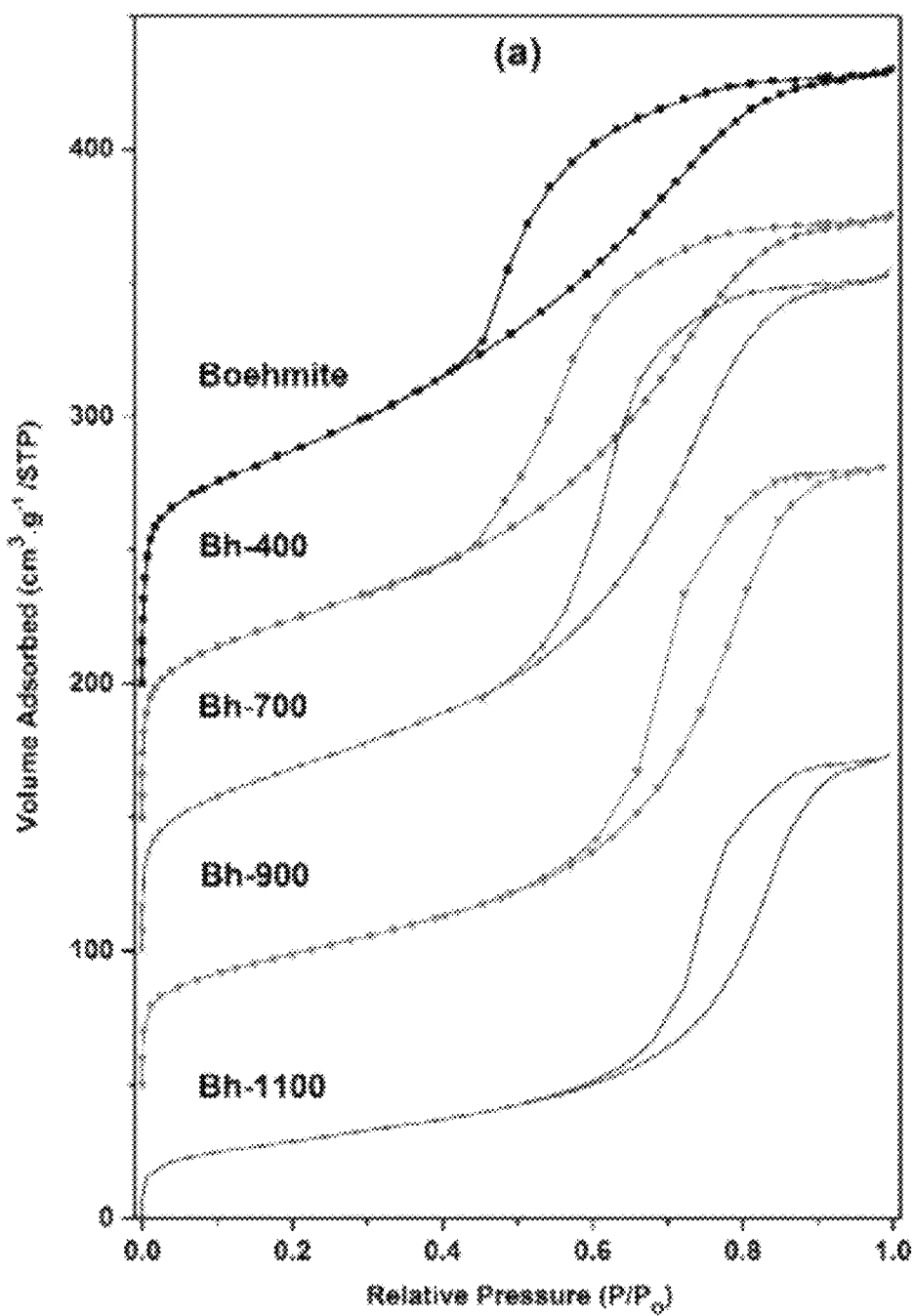
FIG. 12 shows (a,c) $N_2$ adsorption-desorption isotherms and (b,d) pore size distribution curves for (a,b) Bh-y, and (c,d) $Al_2O_3$-y materials. For clarity the y-axis for each subsequent isotherm in (a,c) was shifted upward by 50 and 100 $cm^3 \cdot g^{-1}$, respectively.
Figure 12B:
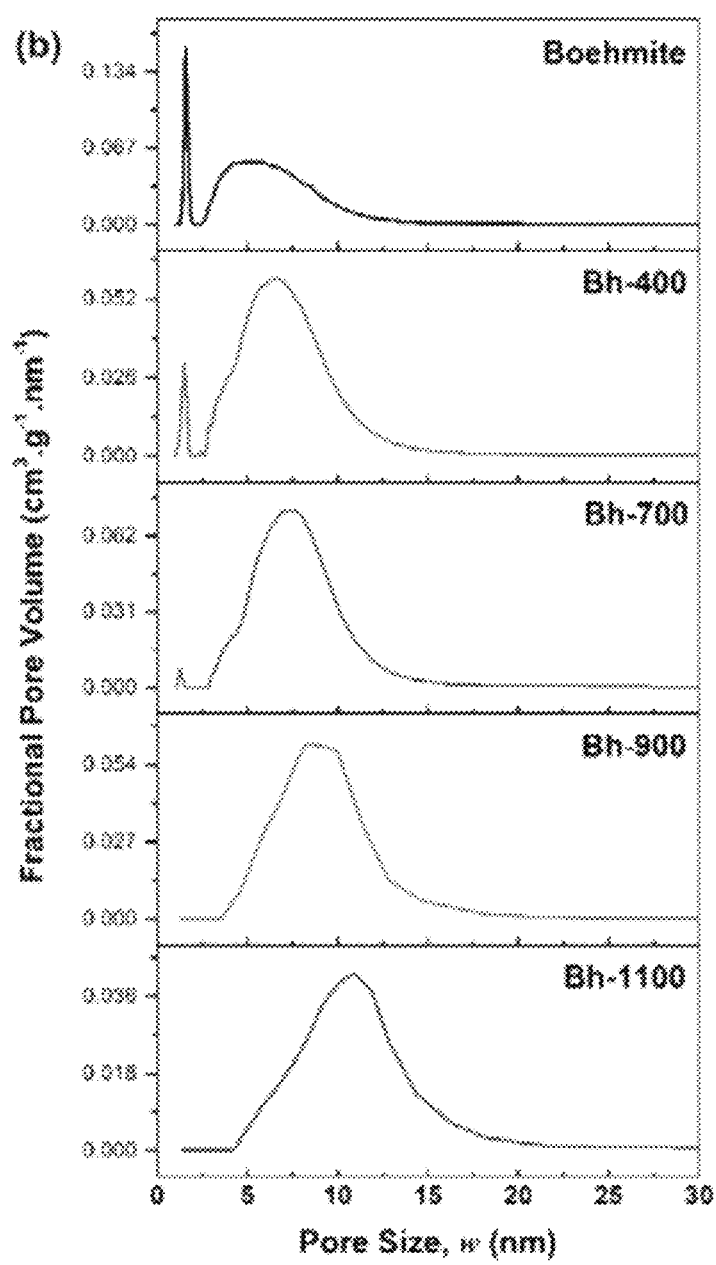
Figure 12C:
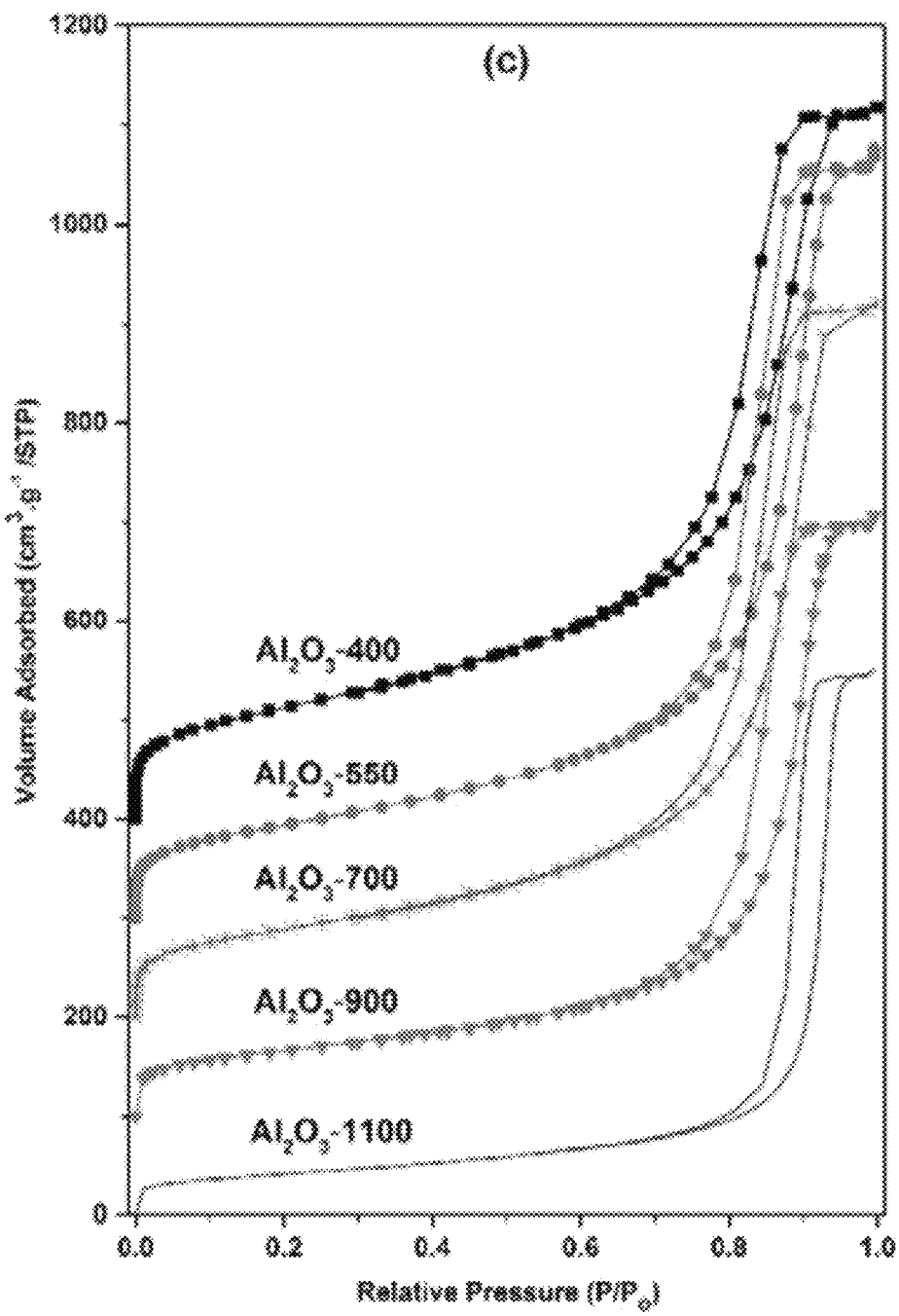
Figure 12D:
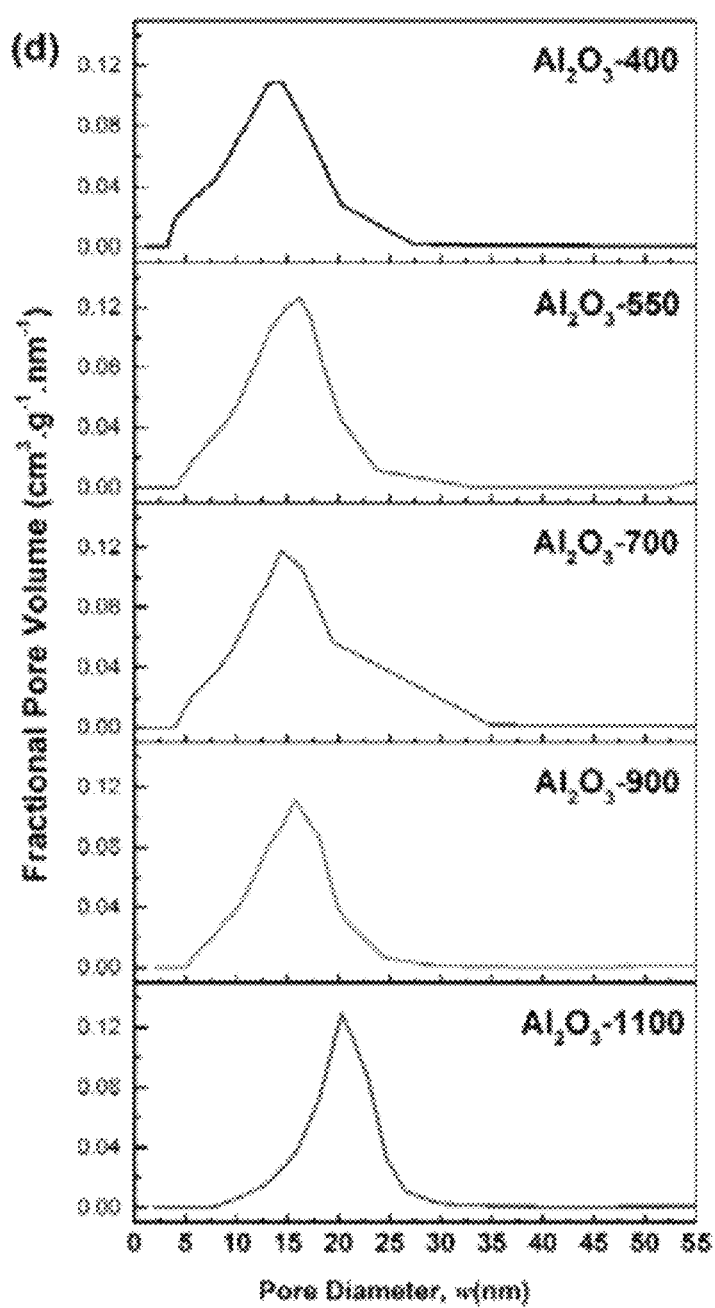
Figure 13A:
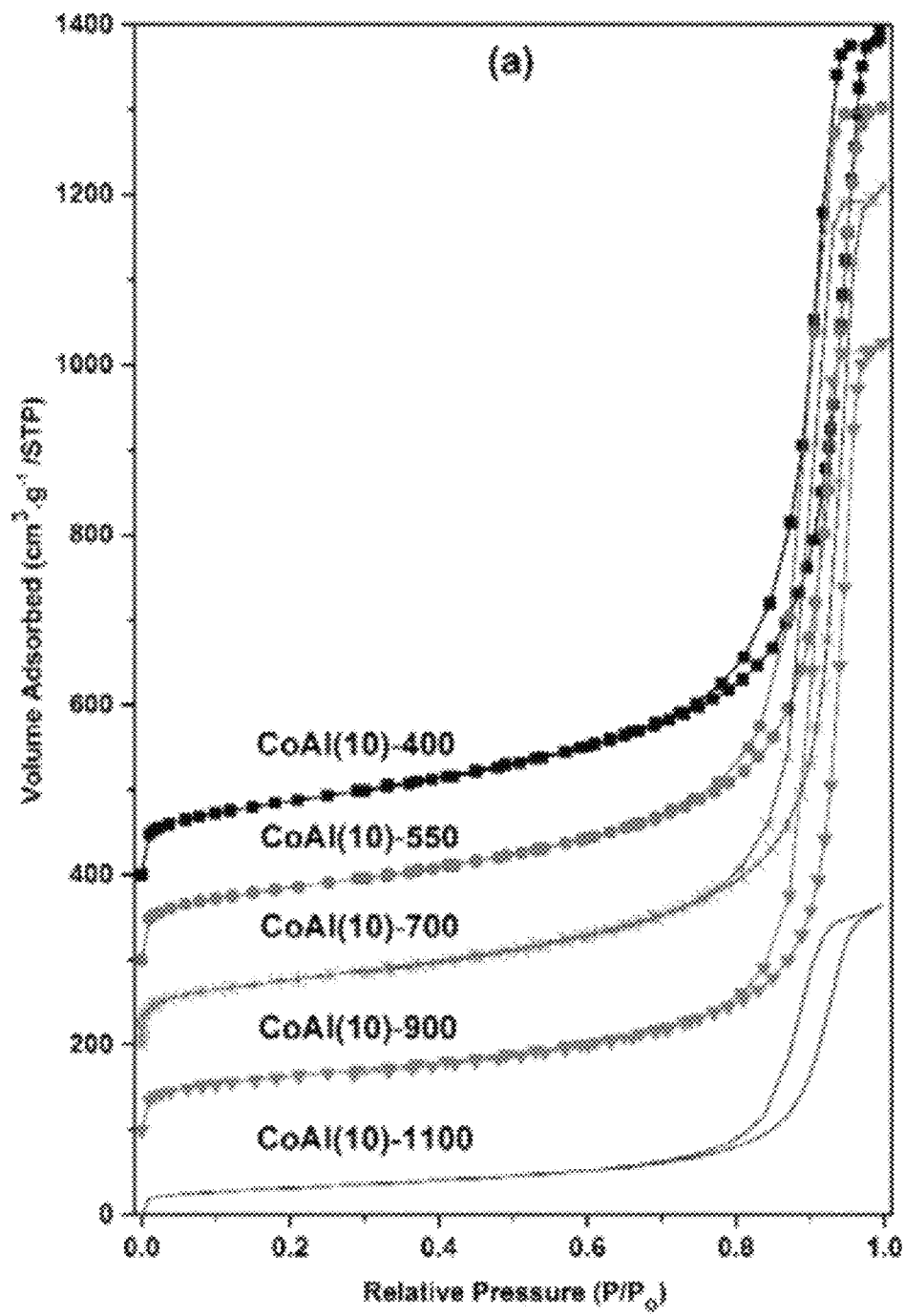
FIG. 13 shows (a,c) $N_2$ adsorption-desorption isotherms and (b,d) pore size distribution curves for (a,b) CoAl(10)-y, and (c,d) CoAl(20)-y materials. For clarity the y-axis for each subsequent isotherm in (a, c) was shifted upward by 100 $cm^3 \cdot g^{-1}$.
Figure 13B:
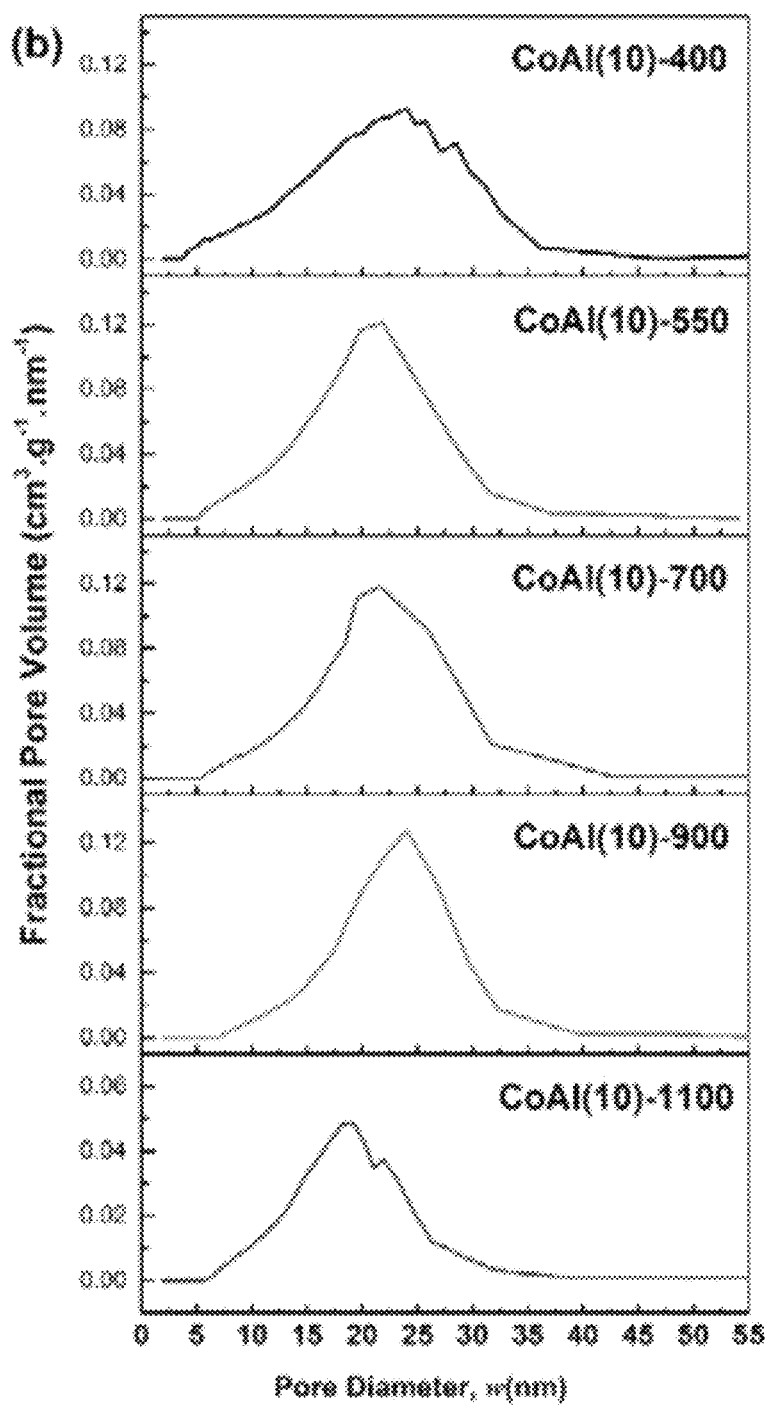
Figure 13C:
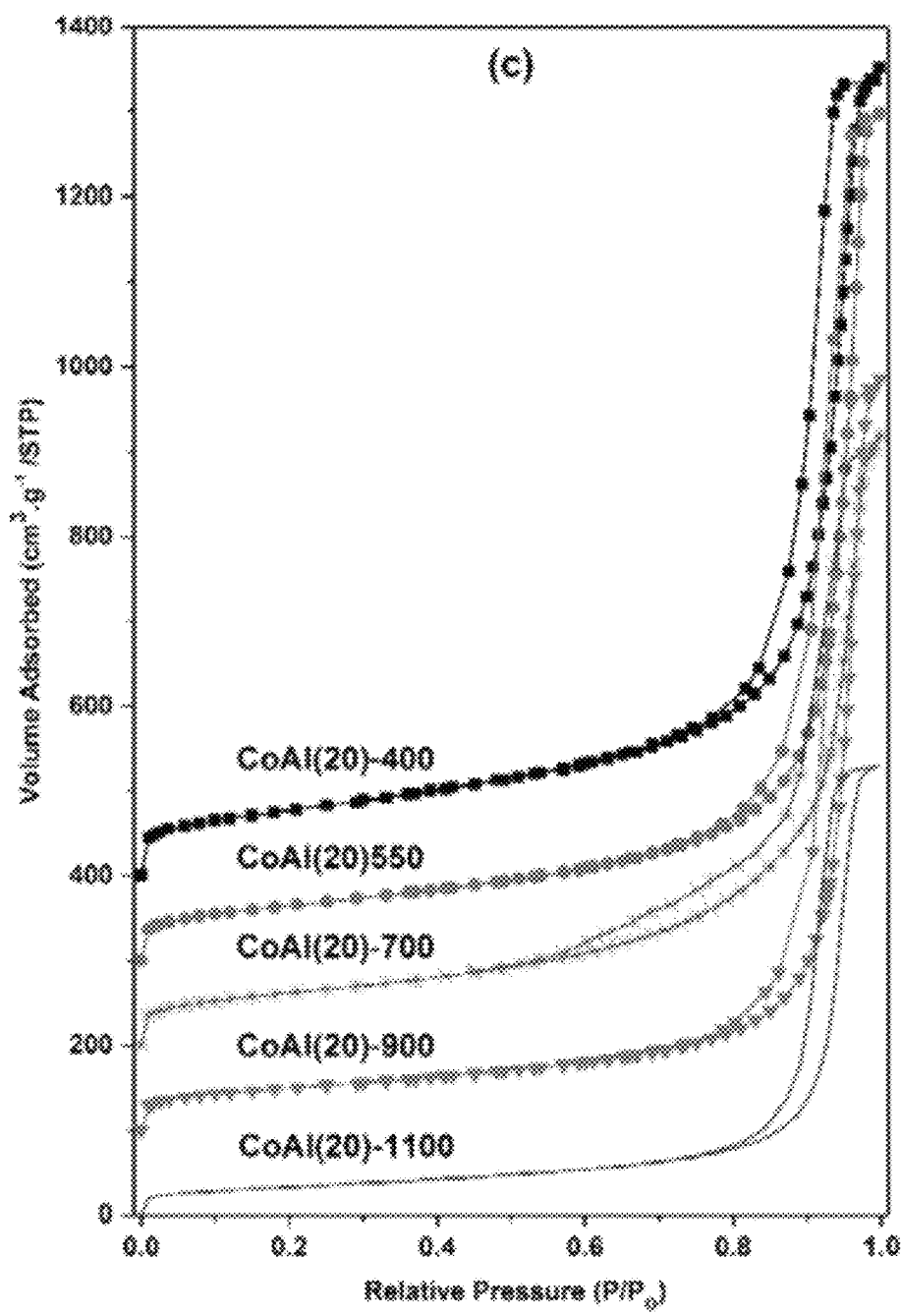
Figure 13D:
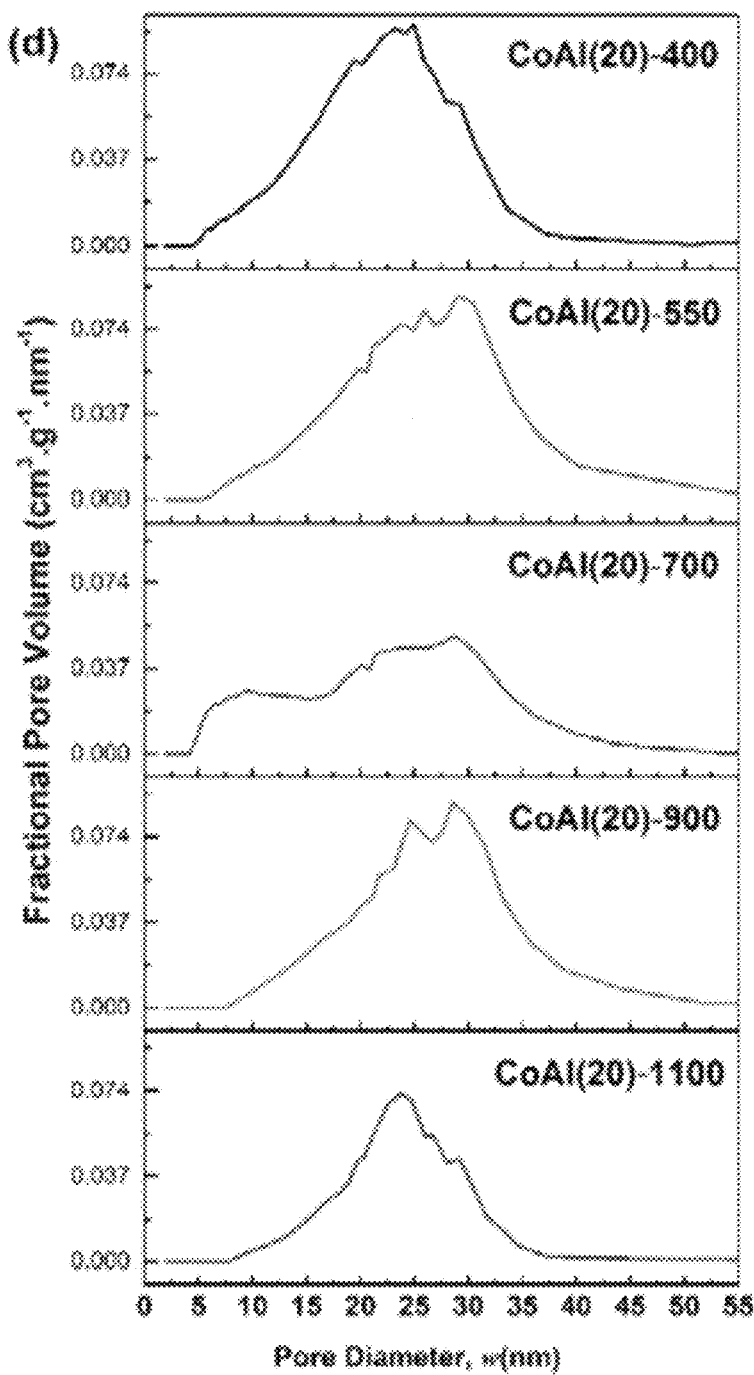
Figure 14A:
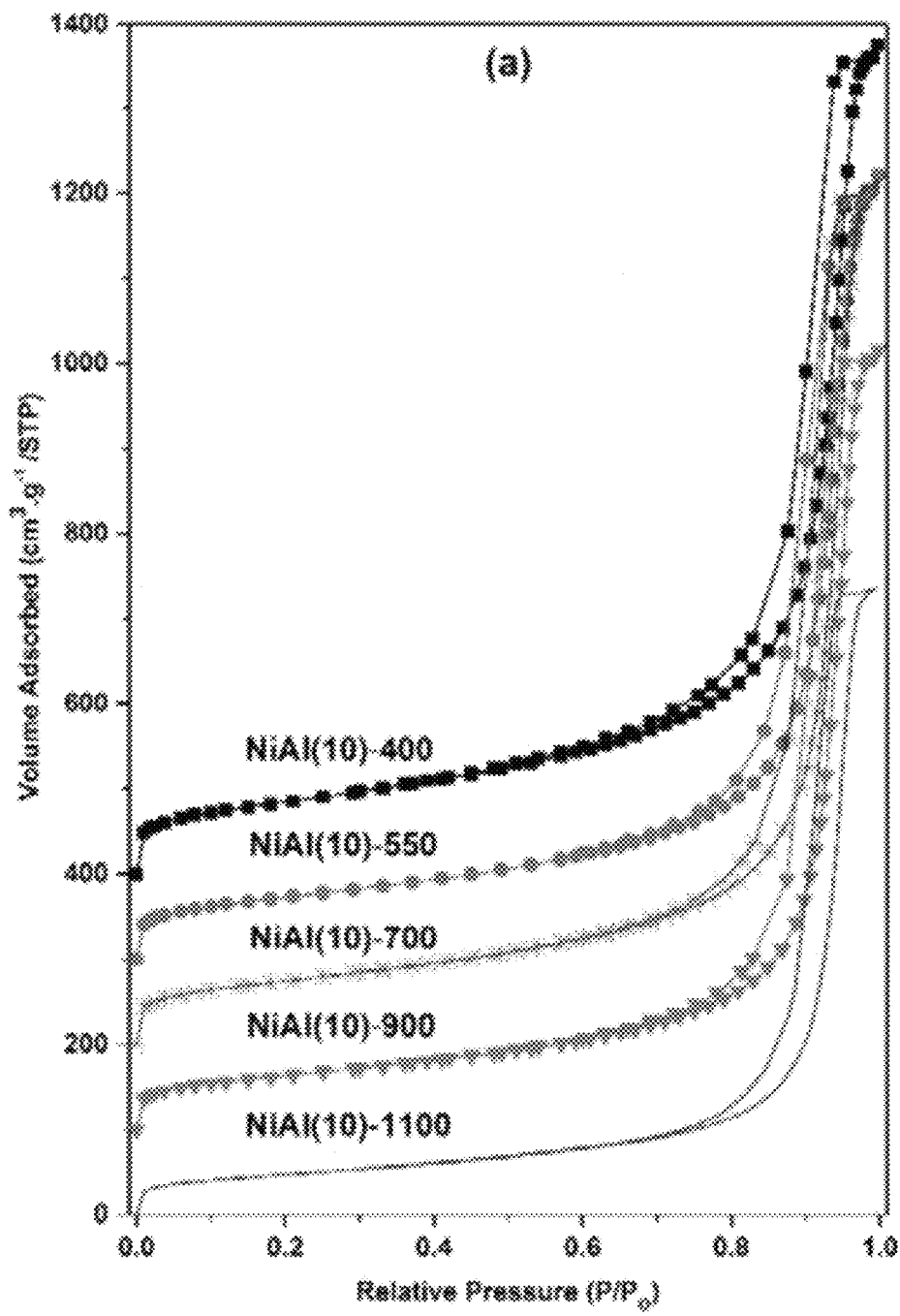
FIG. 14 shows (a,c) $N_2$ adsorption-desorption isotherms and (b,d) pore size distribution curves for (a,b) NiAl(10)-y, and (c,d) NiAl(20)-y materials. For clarity the y-axis for each subsequent isotherm in (a, c) was shifted upward by 100 $cm^3 \cdot g^{-1}$.
Figure 14B:
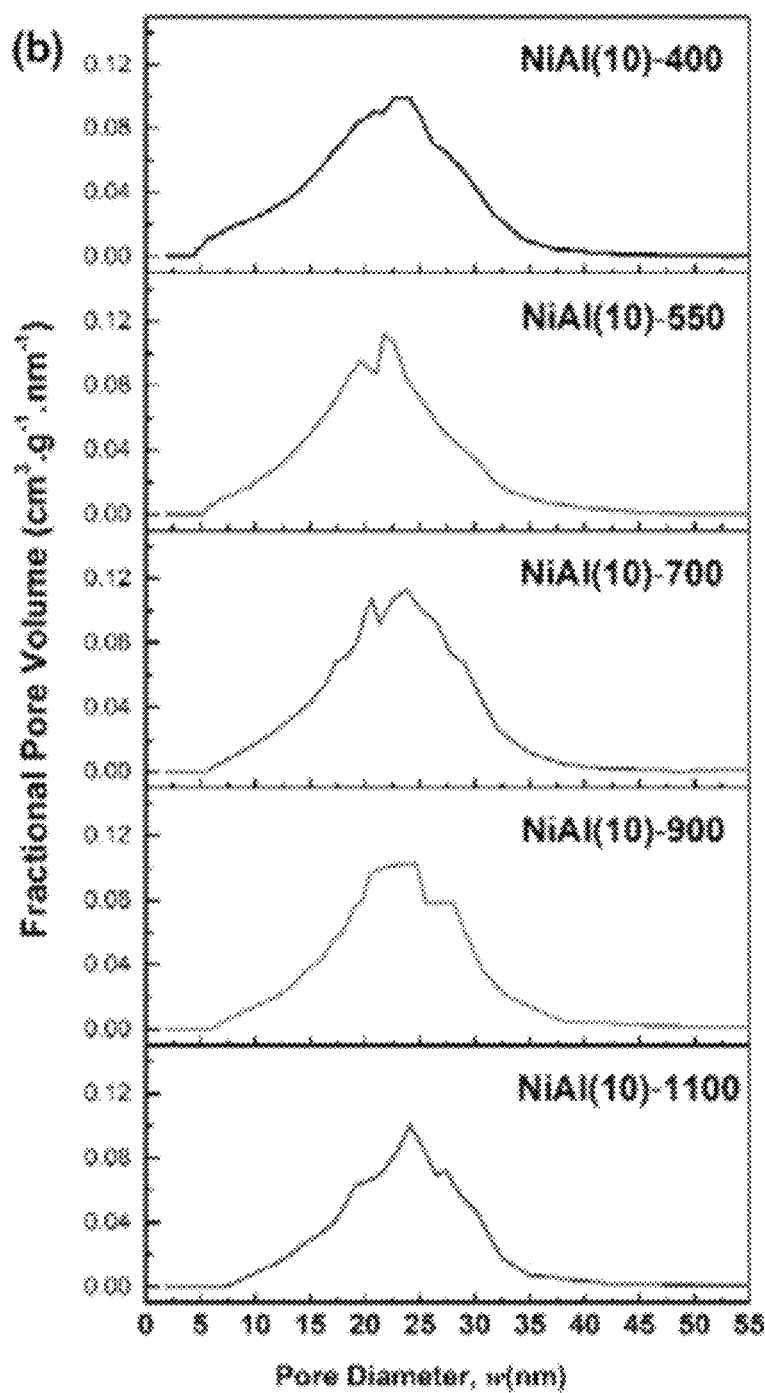
Figure 14C:
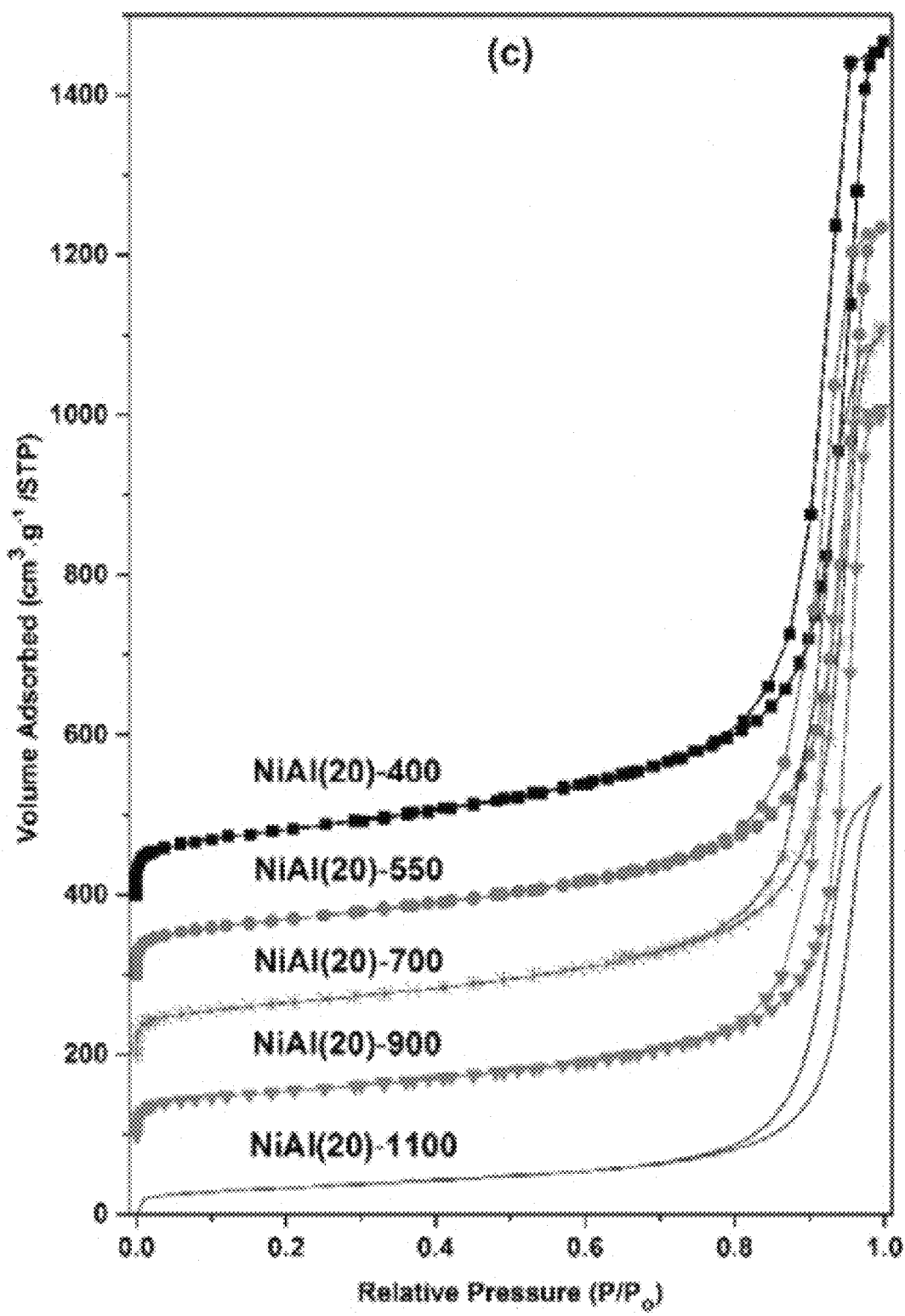
Figure 14D:
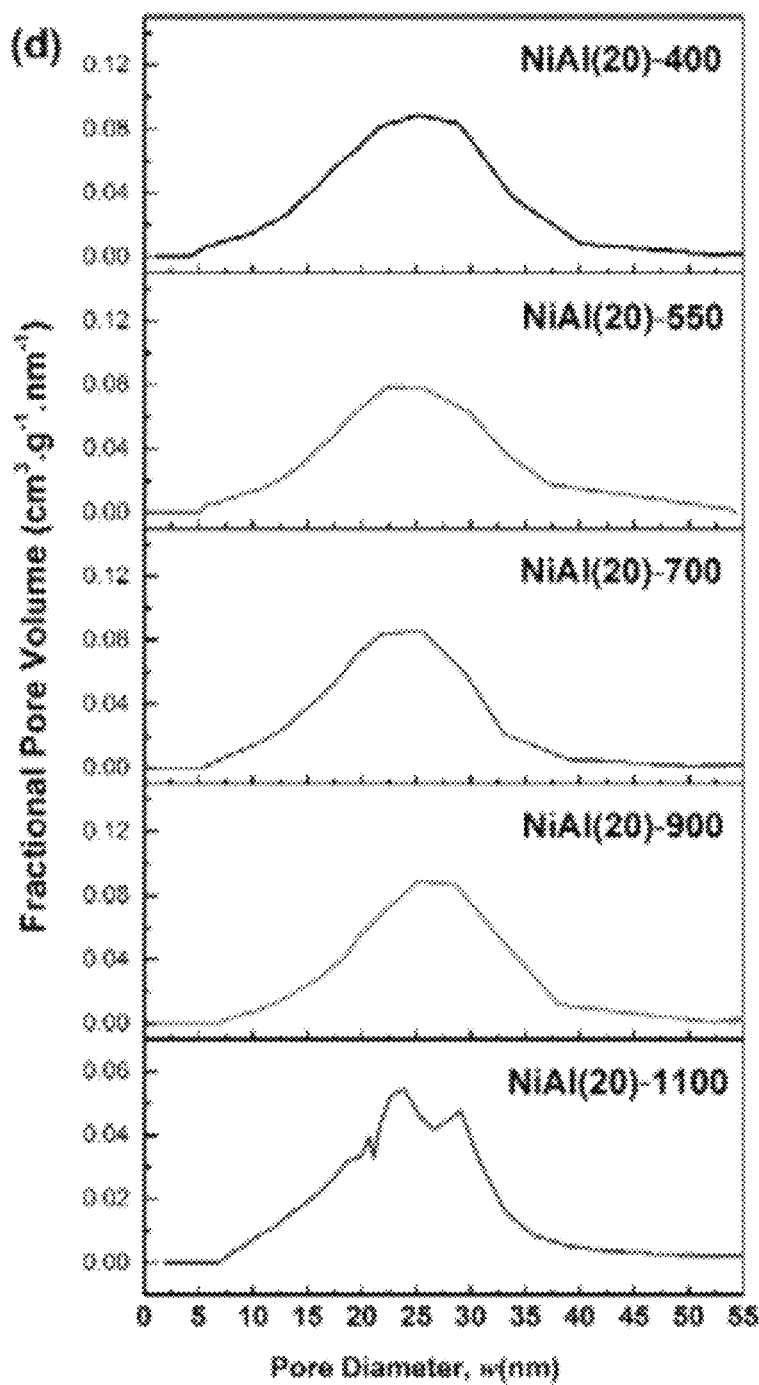
Figure 15A:
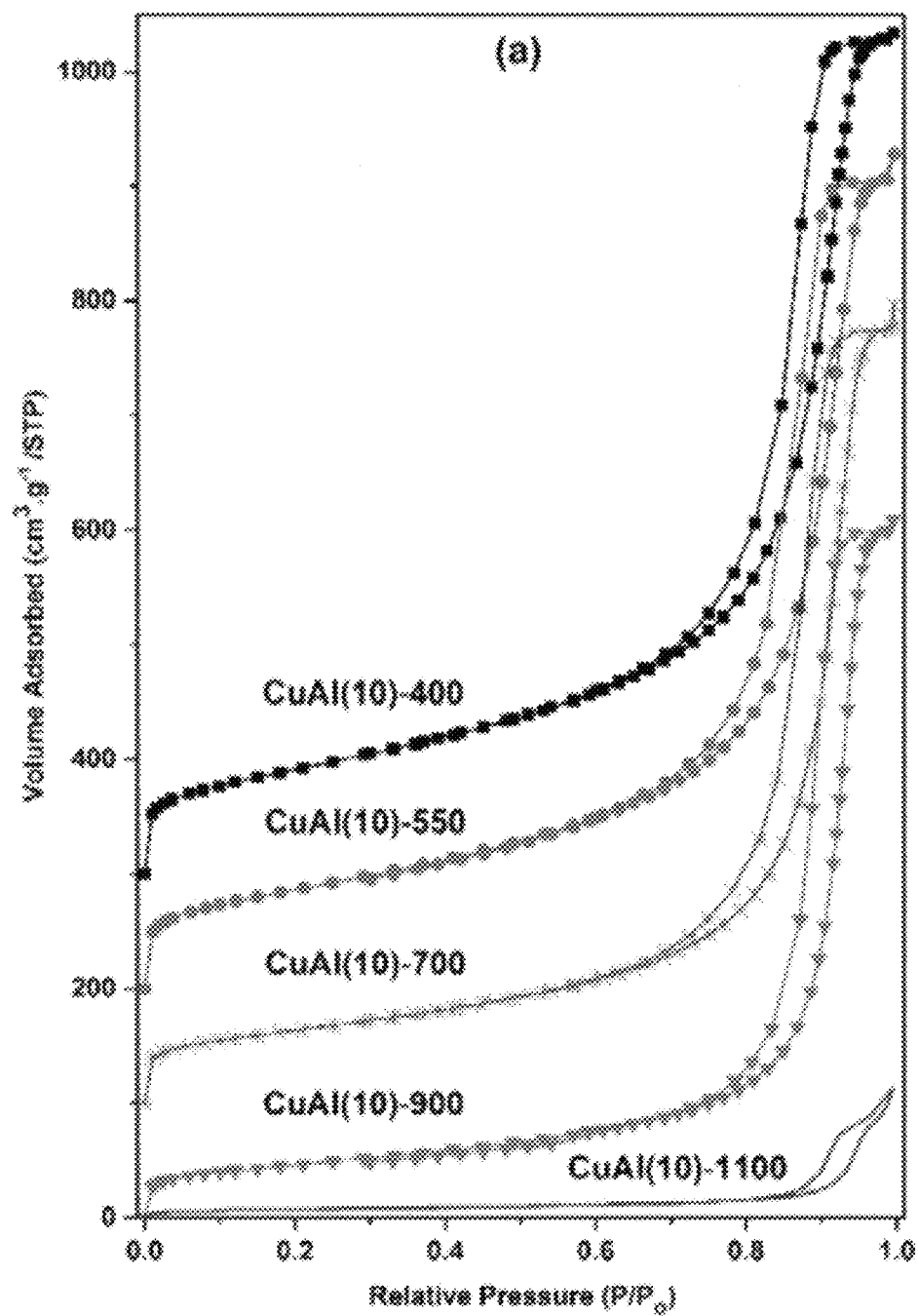
FIG. 15 shows (a,c) $N_2$ adsorption-desorption isotherms and (b,d) pore size distribution curves for (a,b) CuAl(10)-y, and (c,d) CuAl(20)-y materials. For clarity the y-axis for each subsequent isotherm in (a, c) was shifted upward by 100 $cm^3 \cdot g^{-1}$.
Figure 15B:
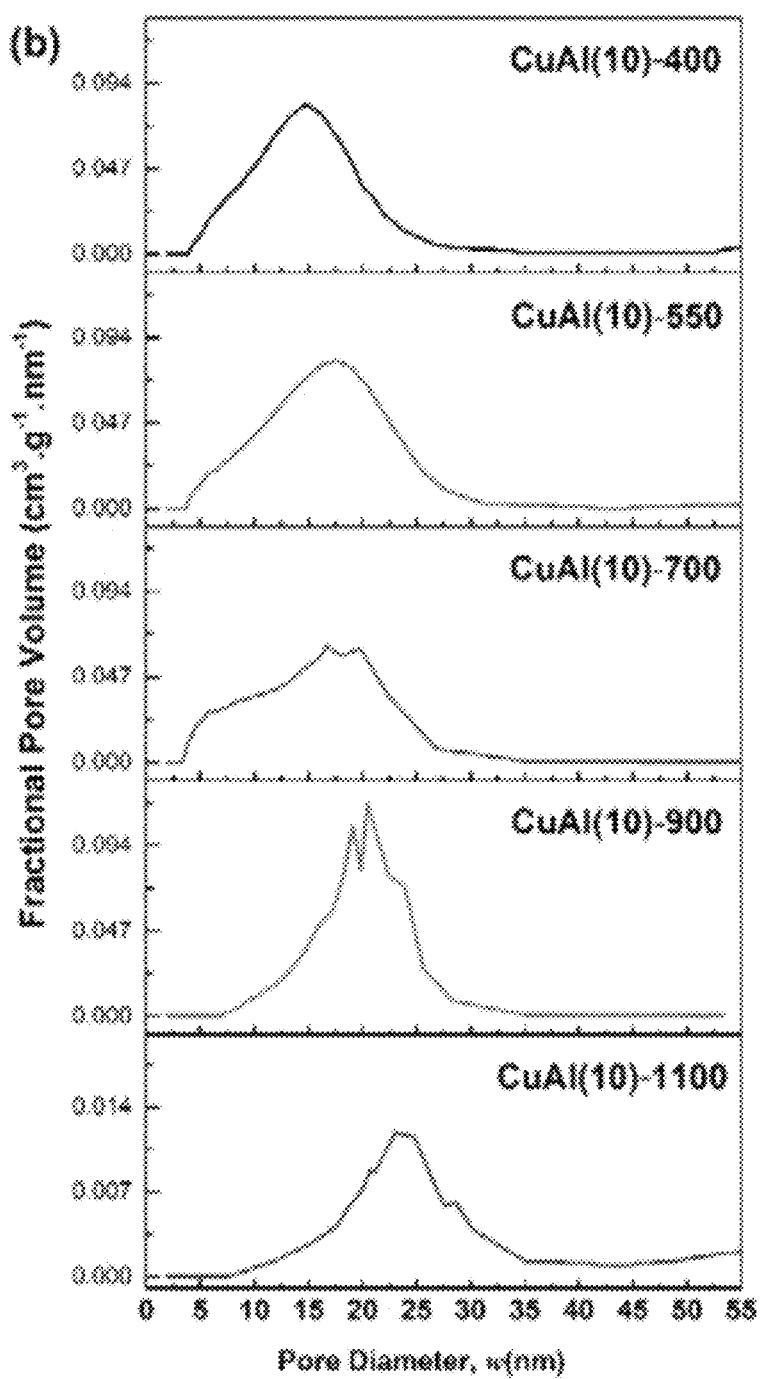
Figure 15C:
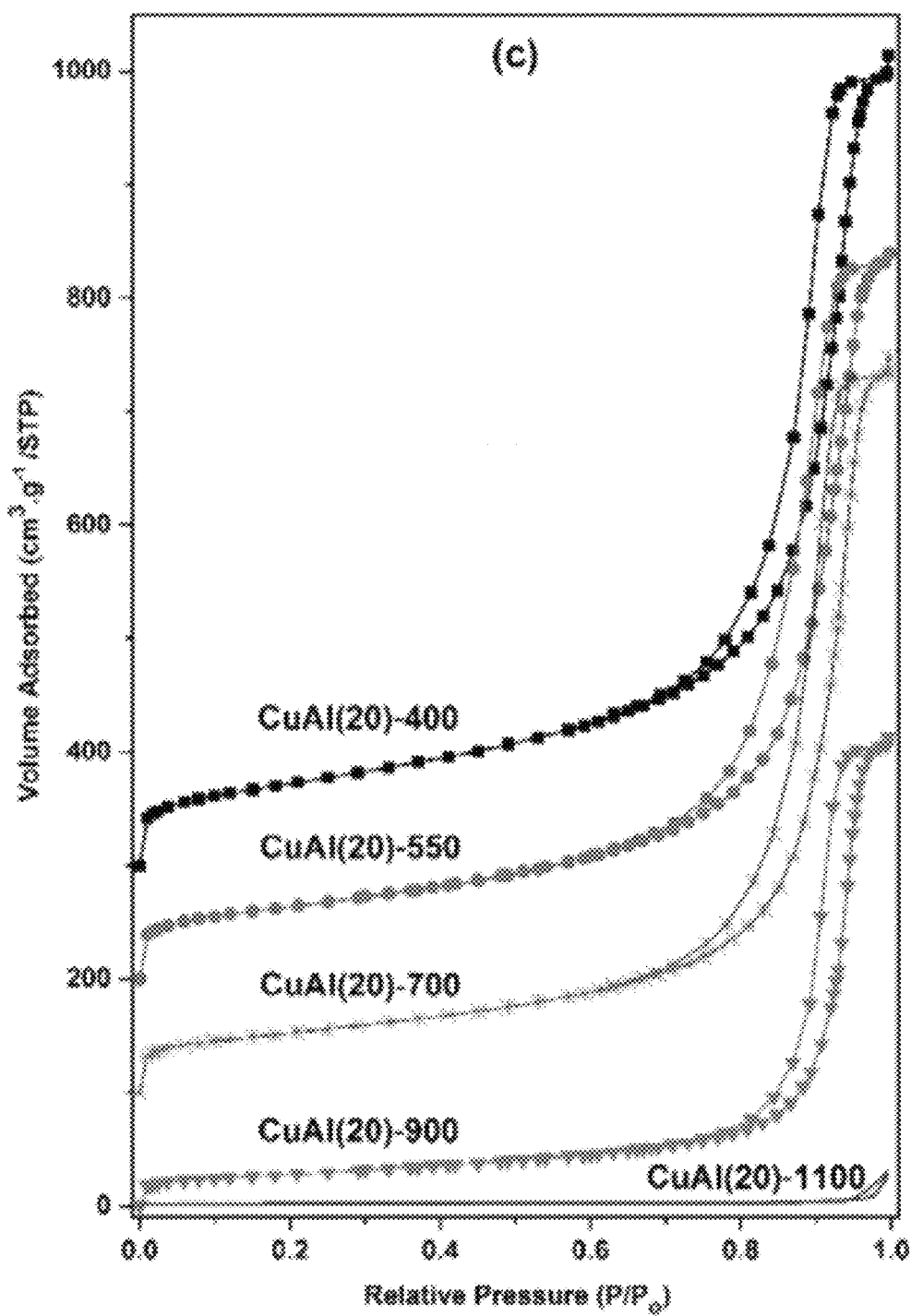
Figure 15D:
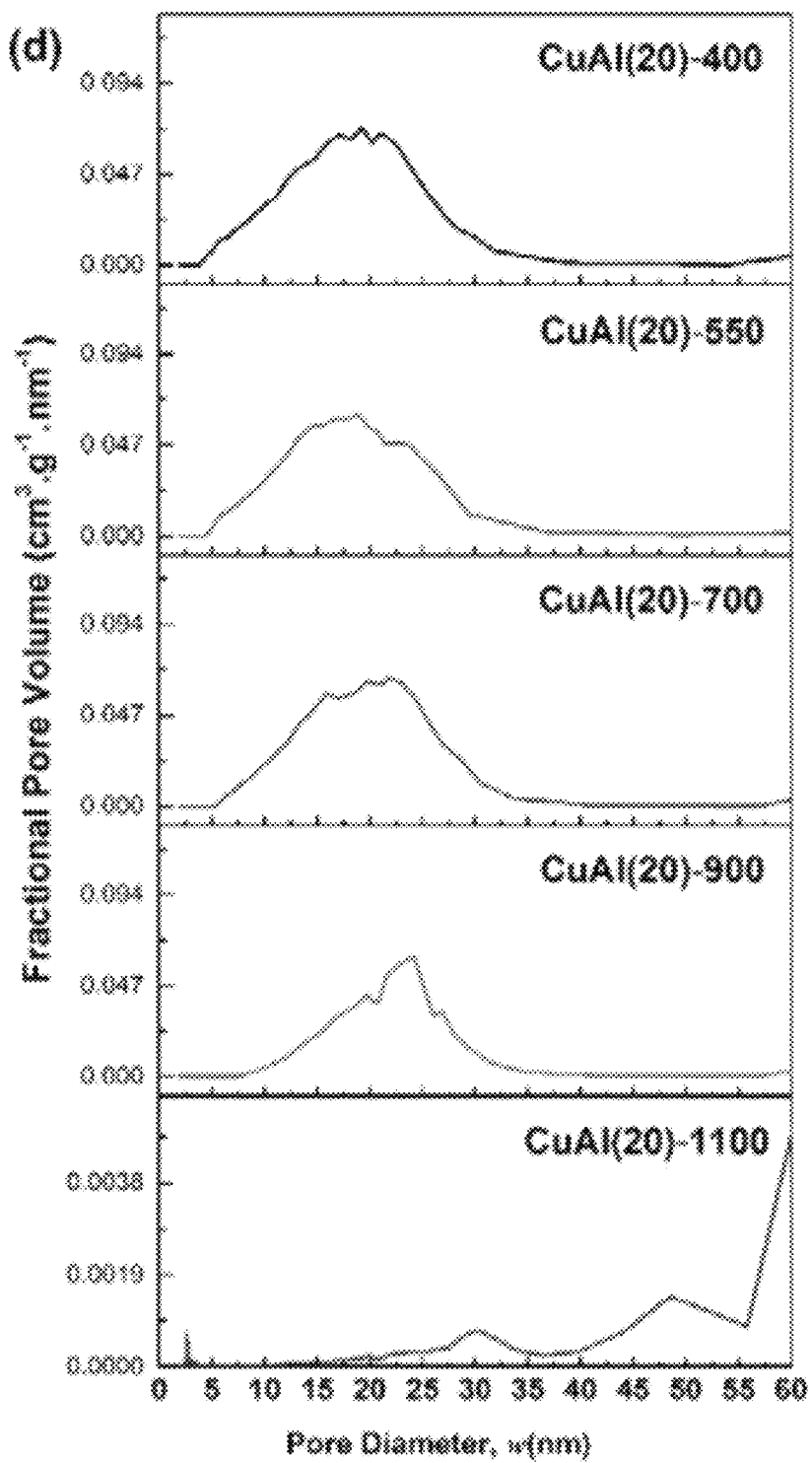

No black color, characteristic for $Co_3O_4$, was observed in all samples; thus, the dark olive green color observed at 400° C. may indicate that both $CoAl_2O_4$ and $Co_3O_4$ phases are present even though the XRD pattern does not show diffraction peaks for $Co_3O_4$. The presence of $CoAl_2O_4$ is confirmed by a low intensity peak at 55.6° (CDD 00-044-0160), which seems to begin to form at 550° C. The relative intensity of this peak is low even for highly crystalline $CoAl_2O_4$. Furthermore, this peak is more pronounced for the sample with 20% Co (FIGS. 7(b), Supporting Information). Note that cobalt aluminate can exist in two forms, $CoAl_2O_4$ or $Co_2AlO_4$, wherein both assume a spinel type structure and, therefore, possess almost indistinguishable XRD pattern. Therefore, the presence of both or any can be expected, specially at temperature below about 900° C.

Analogous findings were obtained for the samples with $Ni^{2+}$ and $Cu^{2+}$ additions. However, the XRD studies of these samples indicate that the spinel phases ($NiAl_2O_4$, $CuAl_2O_4$) start to form at the temperatures of 550° C. and 700° C., respectively (shown in FIG. 1). Also these samples are in the form of solid solution mixtures with $\gamma$-$Al_2O_3$ due to the nonstoichiometric composition. The XRD patterns for all synthesized samples can be found in FIGS. 3-5. Supporting Information.

The NiAl(10)-y sample prepared at 400° C. was a grayish blue solid, which became light blue at 550° C. and temperatures above. Commonly, NiO deposited on alumina or $\gamma$-$Al_2O_3$ is green, while light blue color is observed upon insertion of nickel into the alumina structure.[17] The observed light blue is in accordance with the XRD patterns, which indicate the presence of $NiAl_2O_4$ spinel structure at 550° C. and temperatures above. The most intense peak of $NiAl_2O_4$ occurs at 37° (2θ), followed by peaks at 45° and 65.5° (2θ). Similarly, as in the case of $CoAl_2O_4$, an enhancement in the relative intensity at 37° is already observed at the temperature of 400° C., along with a slight difference in the intensities at 45° and 65.5° (2θ). However, at 400° C. the characteristic light blue color of $NiAl_2O_4$ is not observed, indicating that the phase transition is still in process.

The peak near 31° has a weaker intensity for $NiAl_2O_4$, which differs from that of $CoAl_2O_4$, making identification of $NiAl_2O_4$ at 400° C. more difficult than that of $CoAl_2O_4$. On the other hand, the peaks at ~19° and 60° seem to appear at 550° C. for $NiAl_2O_4$ (CCD 00-010-0339), but their intensities are relatively low. The same peaks have negligible relative intensities for $\gamma$-$Al_2O_3$; therefore, these peaks indicate that the $NiAl_2O_4$ phase is present at 550° C., and its crystallinity increases with increasing temperature. No peaks related to NiO or $Ni_2O_3$ phases are observed for these samples. Moreover, an increase in the nickel content only confirms these observations (FIG. S3, Supporting Information)

More significant differences are observed for CuAl(10)-y materials. The XRD pattern at 400° C. shows characteristic peaks for CuO at 35.5° and 38.7° and a possible hidden peak at 36.4° for $Cu_2O$. With increasing temperature, the peaks for copper oxide lose intensity and the peaks of $CuAl_2O_4$ become more pronounced at 700° C. and well-defined at 900° C. However, the CuAl(10)-1100 material shows sharp diffraction peaks characteristic for $CuAl_2O_4$ and $\alpha$-$Al_2O_3$. Interestingly, the formation of $\alpha$-$Al_2O_3$, which is typically formed at temperatures higher than 1200° C., was induced by the presence of copper oxide. A similar result can be found in the literature and has been assigned to the thermal decomposition of $CuAl_2O_4$ in air atmosphere to form $CuAlO_2$, which is more thermodynamically stable (equation 4).[62] However, in this study no diffraction peaks for $CuAlO_2$ were found—the main diffraction peak is at 37.8°. Because thermal decomposition of $CuAl_2O_4$ (equation 4) produces oxygen, we suggest that a high oxygen deficiency at the alumina phase prevents this decomposition from happening, since it could cause an unbalance of charges, even though the formation of $\alpha$-$Al_2O_3$ was still induced. Moreover, the presence of CuO and further formation of $CuAl_2O_4$ and $\alpha$-$Al_2O_3$ with increasing temperature are more evident for the CuAl(20)-y materials (FIG. S4. Supporting Information).

$$4CuAl_2O_4 \rightarrow 4CuAlO_2 + 2Al_2O_3 + O_2 \qquad (4)$$

Although the formation of $CoAl_2O_4$ and $NiAl_2O_4$ phases is clearly evidenced by the XRD patterns at 550° C. and higher temperatures, their formation at 400° C. is not so evident since the characteristic color of these aluminates is not visible in the case of CoAl(x)-400 and NiAl(x)-400 samples. Therefore, other oxide phases may be present such as $Co_3O_4$ and NiO in these samples. To complement the XRD analysis and further confirm the presence of the spinel phase at 400° C., FTIR of CoAl(20)-400/700 and NiAl(20)-400/700 solids was performed and is shown in FIG. S5, Supporting Information. The characteristic vibration modes of Me-O, Al—O, and Me-O—Al in a spinel structure appear in the range 450-900 $cm^{-1}$.[29,37,63,64]

For CoAl(20)-400 and CoAl(20)-700, the FTIR analysis shows peaks around 660, 560, and 517 $cm^{-1}$, which are attributed to the vibration modes of Co—O, Al—O, and Co—O—Al in the spinel lattice structure.[64-67] A week shoulder at 670 $cm^{-1}$ and almost negligible peak at 574 $cm^{-1}$ are observed for CoAl(20)-400, indicating the presence of $Co_3O_4$ besides $CoAl_2O_4$, which also has a spinel structure.[68]

The band at 670 cm$^{-1}$ is commonly visible on the spectrum of $Co_3O_4$ and refers to the vibration mode of Co in a tetrahedral position. The shoulder at 670 cm$^{-1}$ is shifted to form a broadened peak at 660 cm$^{-1}$ in the case of CoAl (20)-700, indicating that $Co_3O_4$ disappears and the amount of $CoAl_2O_4$ increases. Therefore, Co species are diffusing from $Co_3O_4$ to the alumina structure to form $CoAl_2O_4$. On the other hand, the weak peak at 570 cm$^{-1}$ on the spectrum of CoAl(20)-400 is attributed to Co in an octahedral coordination environment of $Co_3O_4$. At 700° C. this peak vanishes, and the peak at 560 cm$^{-1}$ is well-defined. Such features are expected because $CoAl_2O_4$ is well-known to have a normal spinel crystal structure, and, therefore, one-eighth of Co species is expected to be in a tetrahedral position and one-half in an octahedral position.[69] Nonetheless, these results confirm that the dark olive green color of CoAl(20)-400 is due to the presence of $Co_3O_4$, coexisting with the $CoAl_2O_4$ phase.

The FTIR spectra of NiAl(20)-400 and NiAl(20)-700 display a shoulder at 700 cm$^{-1}$ and few absorption bands between 510 and 690 cm$^{-1}$, which are attributed to the metal-oxygen stretching vibrations for Ni—O, Al—O, and Ni—O—Al bonds in $NiAl_2O_4$.[66,70-72] The shoulder at 700 cm$^{-1}$ on the spectrum of $NiAl_2O_4$ is attributed to the vibration modes of Al—O in a tetrahedral coordination, and its existence along with the peak at 513 cm$^{-1}$ is the main indication of $NiAl_2O_4$. The peaks at 468 and 506 cm$^{-1}$ visible on the spectrum of NiAl(20)-400 are due to NiO.[73-74] These peaks disappear for NiAl(20)-700, indicating the formation of NiO is separated from the spinel structure at 400° C., and upon increasing temperature Ni species diffuse into the alumina structure to form $NiAl_2O_4$. Therefore, the dark color of NiAl(x)-400 may be a result of a non-stoichiometric ratio of nickel oxide ($NiO_{1-\delta}$).[74] Moreover, the peaks visible between 525 and 530 cm$^{-1}$ in all materials refer to the vibration mode of $Al^{3+}$ in an octahedral coordination of $AlO_6$ in an inverse spinel structure.[70]

Interestingly, the presence of the peak around 526 cm$^{-1}$ was found for $Al_2O_3$-y. Also the $Al_2O_3$-y materials did not show IR absorption at frequencies between 700 and 900, the range in which $Al^{3+}$ (in an inverse spinel) and $AlO_6$ (in normal spinel) are IR active.[70] This result indicates that $Al^{3+}$ species mainly occupy octahedral positions in an inverted spinel structure, which is characteristic for $\delta$-$Al_2O_3$.[75] Therefore, the FTIR analysis complements the XRD data showing that a portion of $\delta$-$Al_2O_3$ is formed along with $\gamma$-$Al_2O_3$ at 400 and 700° C., which is normal considering that the differences in the XRD patterns of these phases are very subtle.

Figure 2:
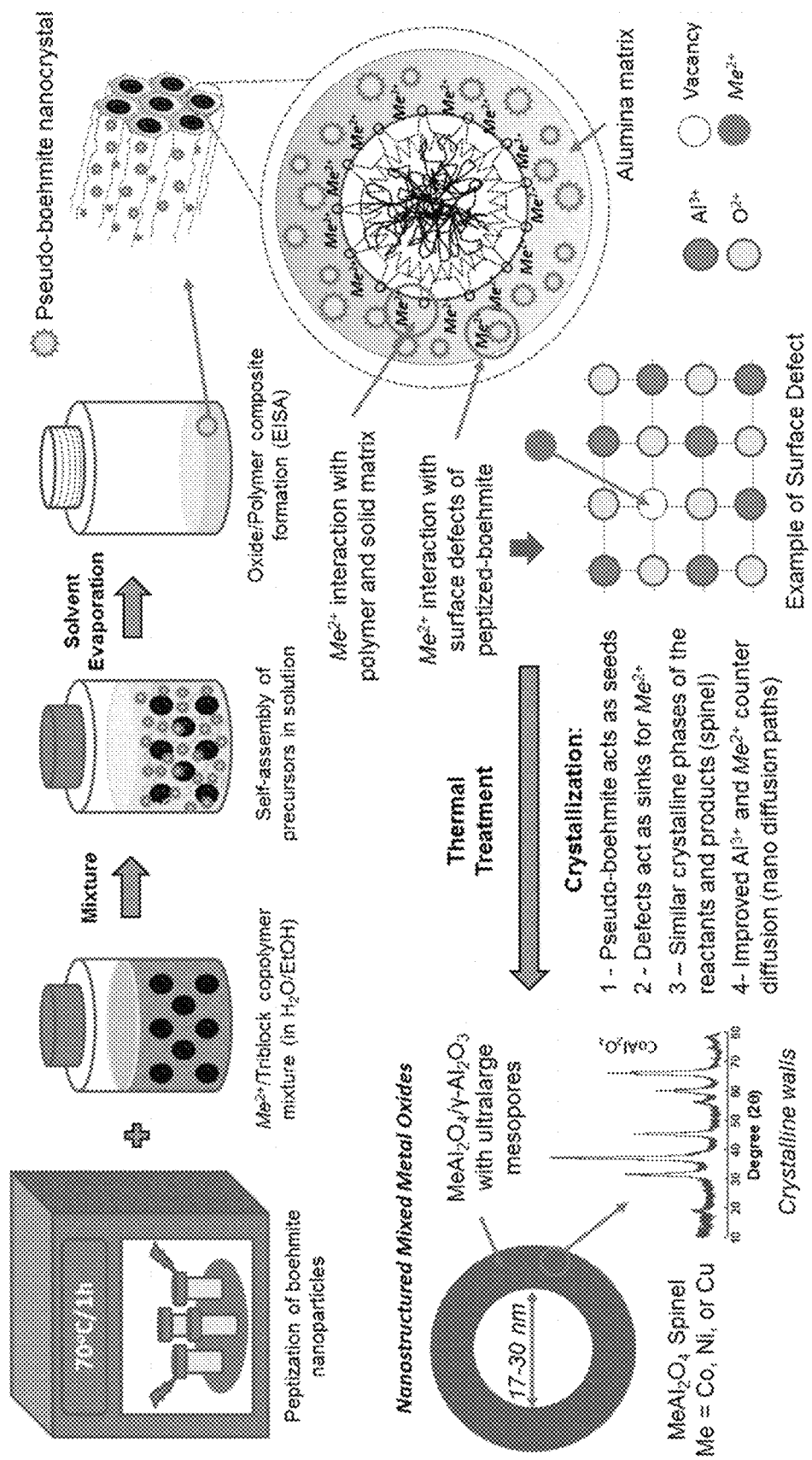
FIG. 2 shows a schematic representation of the peptization of boehmite followed by evaporation induced self-assembly (EISA) to create highly porous and crystalline mesoporous metal aluminates supported on $γ-Al_2O_3$.

The formation rate of a given solid phase, as well as its crystallinity, are controlled mainly by two factors, the chemical reaction itself and by diffusion of reactants. Herein, the latter is related to the counter-diffusion between $Al^{3+}$ and $Me^{2+/3+}$ to form the $MeAl_2O_4$ phase (or other structurally similar metal aluminates like $Me_2AlO_4$ and $MeAlO_3$ supported on alumina or pure phase). This phenomenon is slower at lower temperatures and, therefore, the counter-diffusion is the main kinetic barrier to form the spinel phase. Because of that, metal aluminates are commonly formed at temperatures above 600° C. However, the current XRD and FTIR study implies that the metal aluminates start to form at lower temperatures, and this fact can be related to a few factors, which are represented in FIG. 2. Note that the phase $MgAl_2O_4$ is normally formed at temperatures around 400° C., therefore, our synthesis design will show the higher sintering resistance for this metal in relation to the other metals.

First, the peptization and co-condensation with the block copolymer generate a large amount of crystal defects at the alumina interface,[15] which facilitates the metal diffusion and insertion into the vacancy sites across the boundaries.[56] Second, the presence of nanoparticles reduces the diffusion paths for metal species to a nanometer scale. Third, the peptization of boehmite nanoparticles generates a large amount of alumina polycations, such as $[Al(OH_2)_6]^{3+}$, $[Al_2(OH)_2(OH_2)_{10}]^{4+}$, and $[Al_3(OH)_4(OH_2)_{16}]^{5+}$, which facilitate the diffusion of $Al^{3+}$. Additionally, a positively charged surrounding and vacancies may promote the metal oxidation ($Me^{2+} \rightarrow Me^{3+}$) and possibly increase the transition metal cation diffusion. The later hypothesis is supported by the presence of $Co_3O_4$ and $NiO_{1-\delta}$ in the samples calcined at 400° C. To verify the aforementioned factors and their relation to the presence of Pluronic P123, the MeAl(10)-400 (Me=Co or Ni) samples were synthesized without the presence of the block copolymer. The XRD patterns for these samples are shown in FIG. S6 (Supporting Information) and display different diffraction patterns than those recorded for the samples prepared in the presence of block copolymer. The XRD patterns show peaks for $Co_3O_4$, nickel oxide (black color, $NiO_{1-\delta}$), and $\gamma$-$Al_2O_3$, with no indications of the presence of $CoAl_2O_4$ or $NiAl_2O_4$ phases. Thus, these results confirm that the divalent transition metals are being oxidized to $Co^{3+}$ and $Ni^{3+}$, likely due to the positively charged surroundings formed by the enhanced crystal defects in $\gamma$-$Al_2O_3$. Moreover, these cations are well distributed throughout the material due to their interaction with the block copolymer, which assures a short diffusion path for the transition metal cation to be inserted into $\gamma$-alumina crystal and consequently facilitates the spinel phase formation at lower temperatures. Therefore, the enhanced cation counter-diffusion between $Me^{x+}$ and $Al^{3+}$ presents a smaller kinetic barrier in the early stage of the spinel formation. Additionally, the crystal structures of boehmite and $\gamma$-$Al_2O_3$ closely resemble the structure of the reaction product, $MeAl_2O_4$; therefore its inherent defects may act as a sink for the transition metal cations, thus favoring the spinel phase formation and growth. Moreover, the polymer may be slowing down the oxidation of the transition metal to form a separated metal oxide phase or formation of large MeO domains, which kinetically improves the metal diffusion into the alumina surface with increasing temperature.

Figure 3:
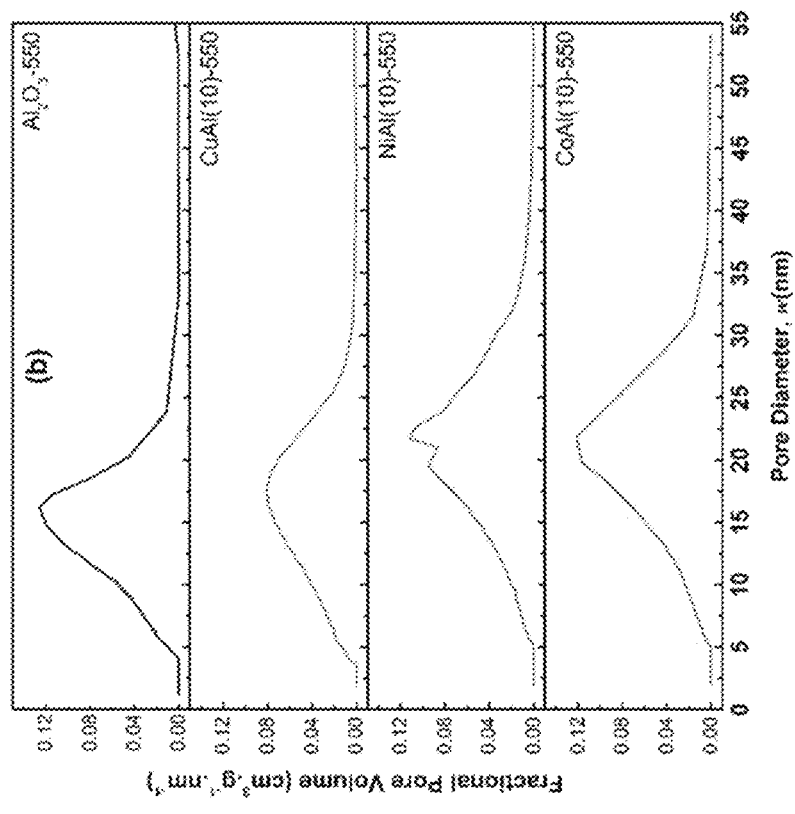
FIG. 3(a) shows $N_2$ physisorption isotherms measured for the MeAl(10)-550 samples, and (b) their respective PSD curves. Isotherms in (a) are shifted along γ-axis by 300 $cm^3 \cdot g^{-1}$.

Textural Properties and Mesophase Sintering Resistance of the Supported Metal Aluminates The formation of spinel structures at lower temperatures is important due to the intrinsic thermal resistance of these phases. Therefore, the frameworks of designed nanostructured materials may show higher resistance to sintering when temperature is applied to improve crystallinity. To evaluate this hypothesis, the textural properties of the synthesized materials were determined by $N_2$ physisorption analysis. FIG. 3 displays the isotherms obtained when 10% of the transition metal was introduced to the synthesis of mesoporous $\gamma$-$Al_2O_3$ and calcination at 550° C. was performed. The isotherms obtained for all synthesized materials, with their respective PSD curves, are shown in, Supporting Information. According to the IUPAC classification, all isotherms can be classified as Type IV with H1 hysteresis loop, which is characteristic for mesoporous materials without pore constrictions.

The transition metal addition not only changed the XRD patterns but also changed the mesophase structure of the resulting materials, as can be seen in FIG. 3. In comparison with $Al_2O_3$-550, the CoAl(10)-550 and NiAl(10)-550 samples show an enhancement in the amount of nitrogen adsorption and a slight change in the case of CuAl(10)-400. Moreover, the capillary condensation for all samples occurs at high relative pressures due to the existence of large pores, and such a feature represents an improvement in porosity of these materials as compared to their counterparts obtained by other synthetic strategies,[19,27,53,76] which usually feature much smaller pores. Larger pores are desirable for improving mass transfer kinetics of reactants/adsorbents, especially in liquid phase applications. FIG. 3 also shows a shift in the capillary condensation to higher relative pressures depending on the kind of transition metal used. Such a shift indicates an enlargement in the pore size, which can be tailored by the kind of transition metal. Recently, such an effect has been assigned to cooperative inter-actions between the metal dopant and the alumina defects.[77] However, we do not expect higher metal doping concentration at temperatures below that of the polymer decomposition. Therefore, we expect a cooperative effect between the transition metal and the triblock copolymer P123. To test this hypothesis, TGA analysis of a mixture of metal cations and the triblock copolymer was performed and is displayed in FIG. 3.

The presence of the transition metal cations completely changed the decomposition patterns of the triblock copolymer P123. Overall, the presence of the transition metal increases the temperature in which the polymer decomposes, showing the largest effect of $Co^{2+}$ followed by $Ni^{2+}$ and $Cu^{2+}$. The observed increase in the decomposition temperature is in agreement with the shift in the capillary condensation to higher values of $P/P_0$, indicating the presence of larger mesopores. For the samples prepared at 400° C., the entire amount of polymer was decomposed, and CoAl(10)-400 showed the largest pores, followed by NiAl(10)-400, CuAl(10)-400, and $Al_2O_3$-400. The pore expansion promoted by the presence of transition metals is also responsible for the increase in the pore volumes (see Table 1). However, this effect was not observed for supported Cu oxide sample, probably due to a more complex decomposition profile.

We suggest that the metalpolymer interaction is the main reason for tailoring the pore diameter size in these materials, while the cooperative effect between the transition metal and alumina defects, as well as the overall material thermomechanical resistance, define the changes in the porosity at temperatures above which the polymer is totally decomposed and the mesopore walls are rigid. On the other hand, if the metal aluminate phase is formed before the polymer decomposition, this can enhance its structural properties because the formed phase is thermally stable. For instance, $MgAl_2O_4$ is well known to be formed at temperatures below than that of transition metal aluminates. For this reason, the total pore volumes of MgAl(x)-y series are higher than those of other series.

TABLE 1

Textural properties of the reference materials, Bh-γ and $Al_2O_3$-γ, and metal aluminates, MeAl(x)-γ, supported on γ-$Al_2O_3$.

| Sample | $S_{BET}$ ($m^2 \cdot g^{-1}$) | $V_{SP}$ ($cm^3 \cdot g^{-1}$) | $W_{KJS}$ (nm) | Sample | $S_{BET}$ ($m^2 \cdot g^{-1}$) | $V_{SP}$ ($cm^3 \cdot g^{-1}$) | $W_{KJS}$ (nm) |
|---|---|---|---|---|---|---|---|
| Boehmite | 311 | 0.32 | 5.5 | $Al_2O_3$-400 | 408 | 1.10 | 14.5 |
| Bh-400 | 266 | 0.35 | 6.6 | $Al_2O_3$-550 | 341 | 1.11 | 16.2 |
| Bh-700 | 247 | 0.39 | 7.6 | $Al_2O_3$-700 | 320 | 1.11 | 14.3 |
| Bh-900 | 176 | 0.35 | 8.2 | $Al_2O_3$-900 | 238 | 0.92 | 15.8 |
| Bh-1100 | 104 | 0.26 | 10.9 | $Al_2O_3$-1100 | 149 | 0.85 | 20.3 |
| NiAl(10)-400 | 306 | 1.49 | 22.7 | NiAl(20)-400 | 295 | 1.62 | 25.7 |
| NiAl(10)-550 | 264 | 1.40 | 21.7 | NiAl(20)-550 | 250 | 1.43 | 22.3 |
| NiAl(10)-700 | 270 | 1.56 | 23.7 | NiAl(20)-700 | 232 | 1.38 | 25.6 |
| NiAl(10)-900 | 228 | 1.40 | 24.7 | NiAl(20)-900 | 195 | 1.34 | 25.2 |
| NiAl(10)-1100 | 169 | 1.13 | 24.1 | NiAl(20)-1100 | 122 | 0.81 | 23.9 |
| CoAl(10)-400 | 315 | 1.50 | 24.0 | CoAl(20)-400 | 278 | 1.44 | 25.0 |
| CoAl(10)-550 | 307 | 1.55 | 21.8 | CoAl(20)-550 | 235 | 1.48 | 29.0 |
| CoAl(10)-700 | 278 | 1.55 | 21.6 | CoAl(20)-700 | 224 | 1.08 | 28.7 |
| CoAl(10)-900 | 777 | 1.41 | 24.0 | CoAl(20)-900 | 178 | 1.36 | 28.5 |
| CoAl(10)-1100 | 115 | 0.56 | 19.2 | CoAl(20)-1100 | 118 | 0.81 | 23.8 |
| CuAl(10)-400 | 329 | 1.13 | 17.0 | CuAl(20)-400 | 260 | 1.05 | 19.3 |
| CuAl(10)-550 | 269 | 1.08 | 16.9 | CuAl(20)-550 | 229 | 0.97 | 18.9 |
| CuAl(10)-700 | 228 | 0.99 | 19.1 | CuAl(20)-700 | 188 | 0.95 | 21.8 |
| CuAl(10)-900 | 166 | 0.93 | 19.9 | CuAl(20)-900 | 100 | 0.61 | 24.2 |
| CuAl(10)-1100 | 26.0 | 0.16 | 23.0 | CuAl(20)-1100 | 6.0 | 0.02 | 30/48 |
| MgAl(10)-400 | 334 | 1.65 | 21.2 | MgAl(20)-400 | 317 | 1.85 | 29.0 |
| MgAl(10)-550 | 378 | 1.77 | 21.4 | MgAl(20)-550 | 296 | 2.08 | 29.1 |
| MgAl(10)-700 | 292 | 1.77 | 21.6 | MgAl(20)-700 | 267 | 1.96 | 30.6 |
| MgAl(10)-900 | 220 | 1.46 | 23.6 | MgAl(20)-900 | 234 | 1.78 | 29.4 |
| MgAl(10)-1100 | 116 | 0.68 | 27.4 | MgAl(20)-1100 | 117 | 0.80 | 22.4 |
| MgAl(30)-400 | 284 | 1.70 | 27.2 | LaAl(10)-550 | 302 | 1.51 | 22.5 |
| MgAl(30)-550 | 279 | 1.69 | 29.5 | FeAl(10)-750 | 214 | 1.36 | 22.3 |
| MgAl(30)-700 | 244 | 1.50 | 25.5 | MnAl(10)-750 | 160 | 1.11 | 15.7 |
| MgAl(30)-900 | 217 | 1.63 | 30.1 | (Mn,Fe)Al(5/5)-750 | 185 | 1.41 | 25.0 |
| MgAl(30)-1100 | 97.4 | 0.65 | 24.6 | (Cu,Fe)Al(5/5)-750 | 181 | 1.40 | 28.0 |
| FeAl(5)-550 | 319 | 1.44 | 19.0 | (Ni,Mg)Al(10/5)-700 | 280 | 1.59 | 25.3 |
| FeAl(5)-700 | 280 | 1.49 | 21.0 | (Ni,La)Al(10/5)-700 | 220 | 1.51 | 26.1 |
| FeAl(5)-900 | 208 | 1.32 | 22.5 | (Ni,Ce)Al(10/5)-700 | 215 | 1.24 | 29.2 |
| FeAl(10)-550 | 295 | 1.45 | 21.9 | FeAl(20)-550 | 235 | 0.95 | 19.6 |
| FeAl(10)-700 | 219 | 1.38 | 22.2 | FeAl(20)-700 | 184 | 0.94 | 22.0 |
| FeAl(10)-900 | 169 | 1.20 | 25.6 | FeAl(20)-900 | 122 | 0.86 | 28.0 |

Table 1 shows that the addition of $Ni^{2+}$ and $Co^{2+}$ promotes a significant enhancement in the total pore volume, along with an enlargement of pore sizes, and such features are observed across all samples regardless of the calcination temperature. On the other hand, $Cu^{2+}$ addition shows no significant variations in the pore volume at 400 and 500° C. but a decrease at higher temperatures. At first it seems that the pore expansion occurs with increasing temperature. However, such a phenomenon is not probable because temperature increase is a driving force for sintering. Because these samples are highly porous, we suggest that pores in the macropore range (pores bigger than 50 nm) are reduced in size with increasing temperature and, therefore, become mesopores (2-50 nm), for which the range is observed by $N_2$ adsorption.

This effect causes variations in the pore volumes and pore sizes across the samples studied, which makes it difficult to correlate the enhancement in sintering resistance in relation to the pore volume. Thus, the evaluation of the effect of the formation of metal aluminate phases at early temperatures cannot be based solely on the pore volumes. However, such an effect seems to not affect notably the surface areas, likely because smaller pores, micropores, and mesopores in general contribute significantly more to the specific surface area than macropores. Nevertheless, an enhancement in sintering resistance minimizes the closure of small pores and as a result decreases the rate of surface area loss.

Figure 4:
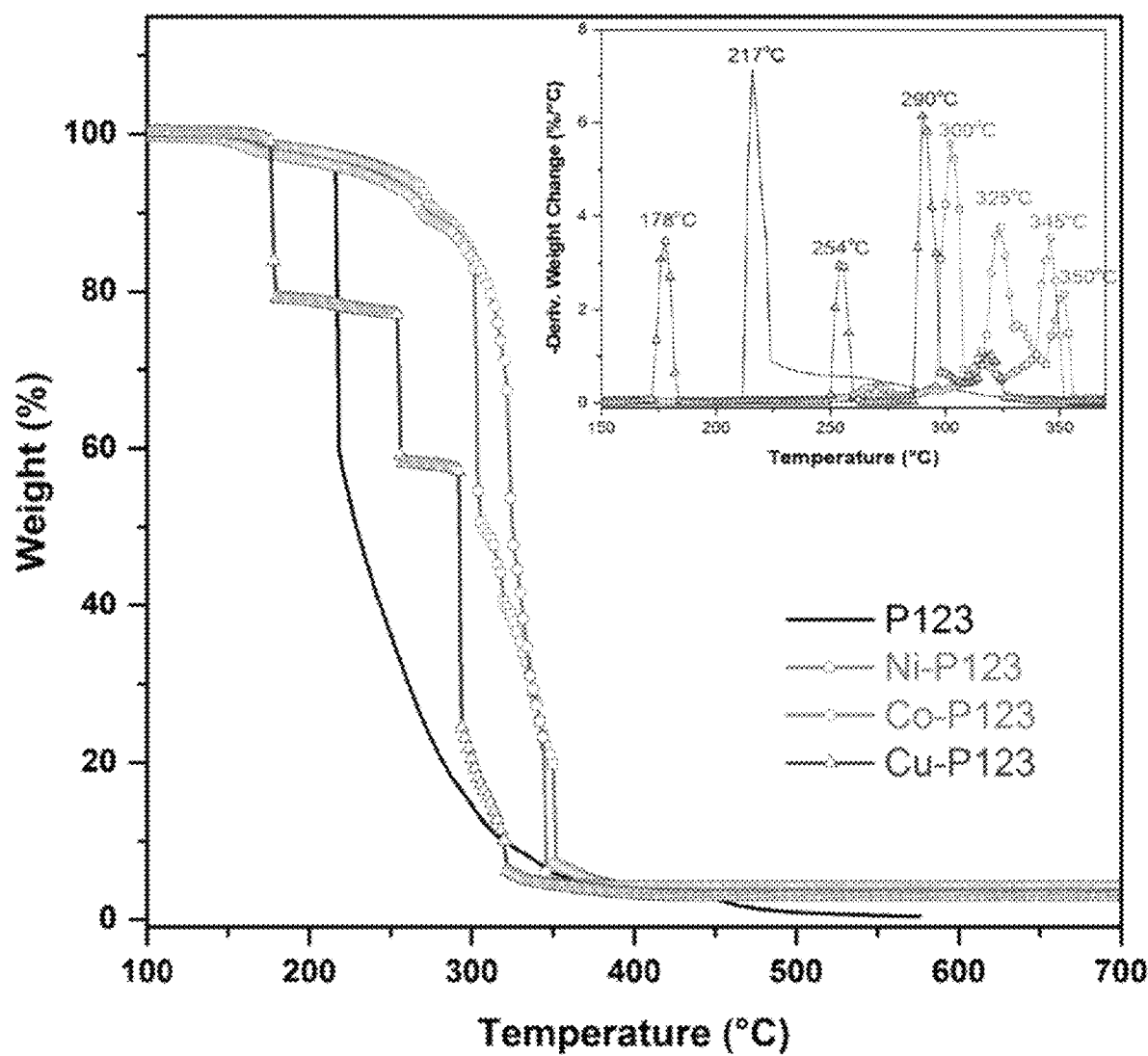
FIG. 4 shows a thermogravimetric analysis of mixtures of triblock copolymer Pluronic P123 in the presence of $Ni^{2+}$, $Co^{2+}$, or $Cu^{2+}$.
Figure 5:
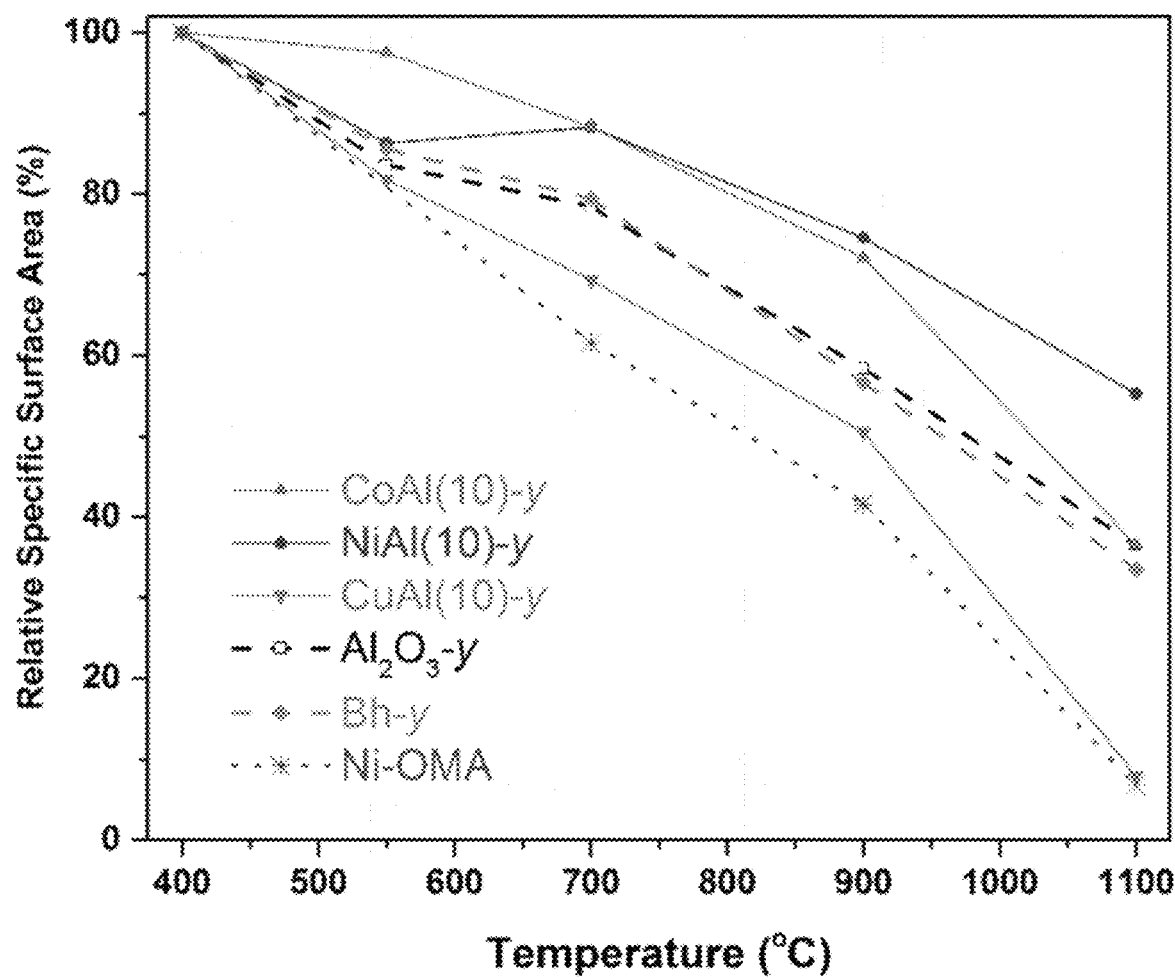
FIG. 5 shows a percentage of the surface area loss vs. calcination temperature for MeAl(10)-γ materials and $Al_2O_3$-γ. Bh-γ, and Ni-OMA* reference materials. *Data for Ni-OMA (10% nickel in ordered mesoporous alumina) have been taken from Ref. 17.
Figure 16A:
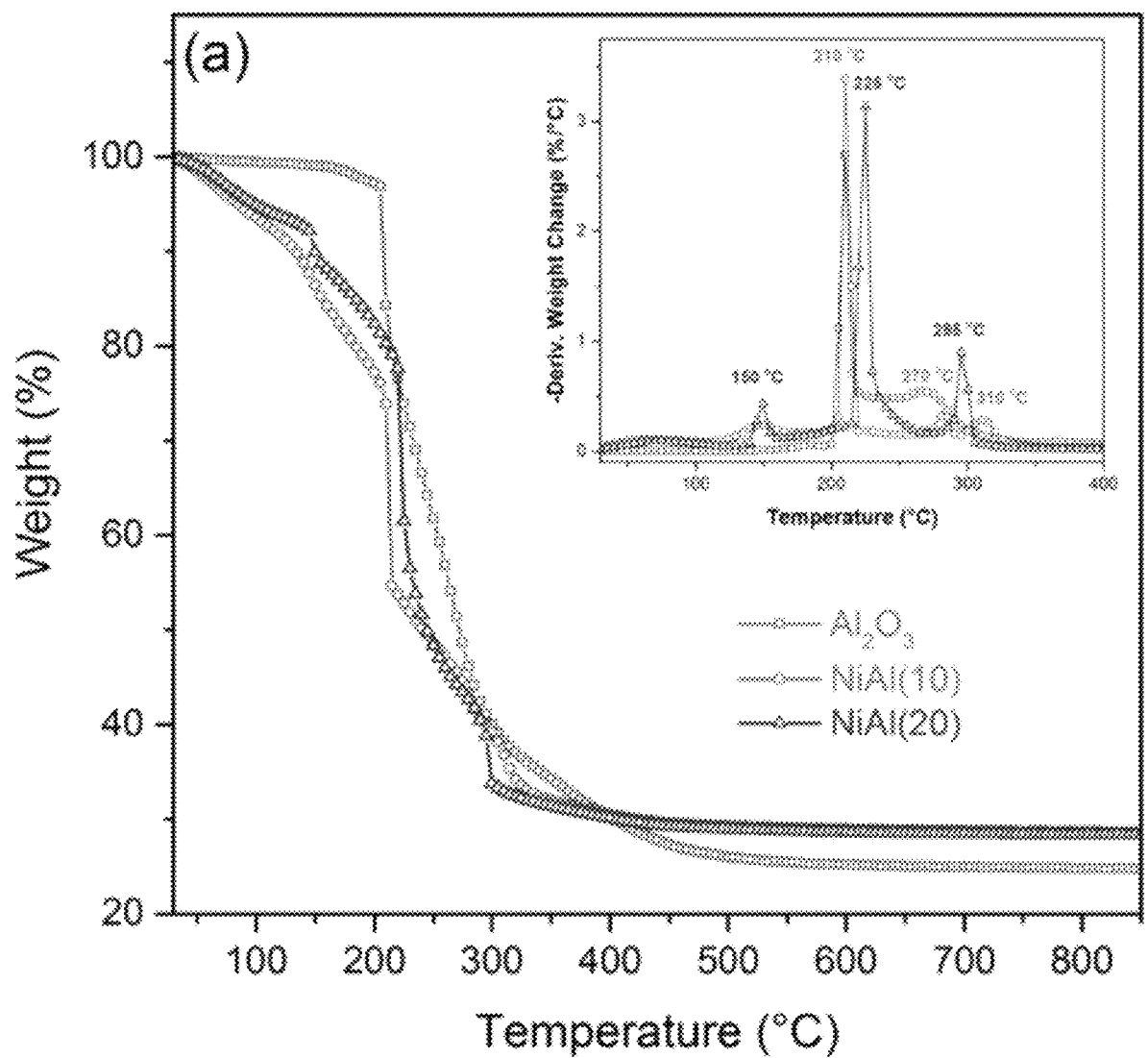
FIG. 16 shows thermogravimetric profiles and their derivative curves (inset) for the materials synthesized with (a) nickel precursor addition, and (b) cobalt and copper addition, in comparison to the profile of the alumina sample ($Al_2O_3$) synthesized without transition metal addition.
Figure 16B:
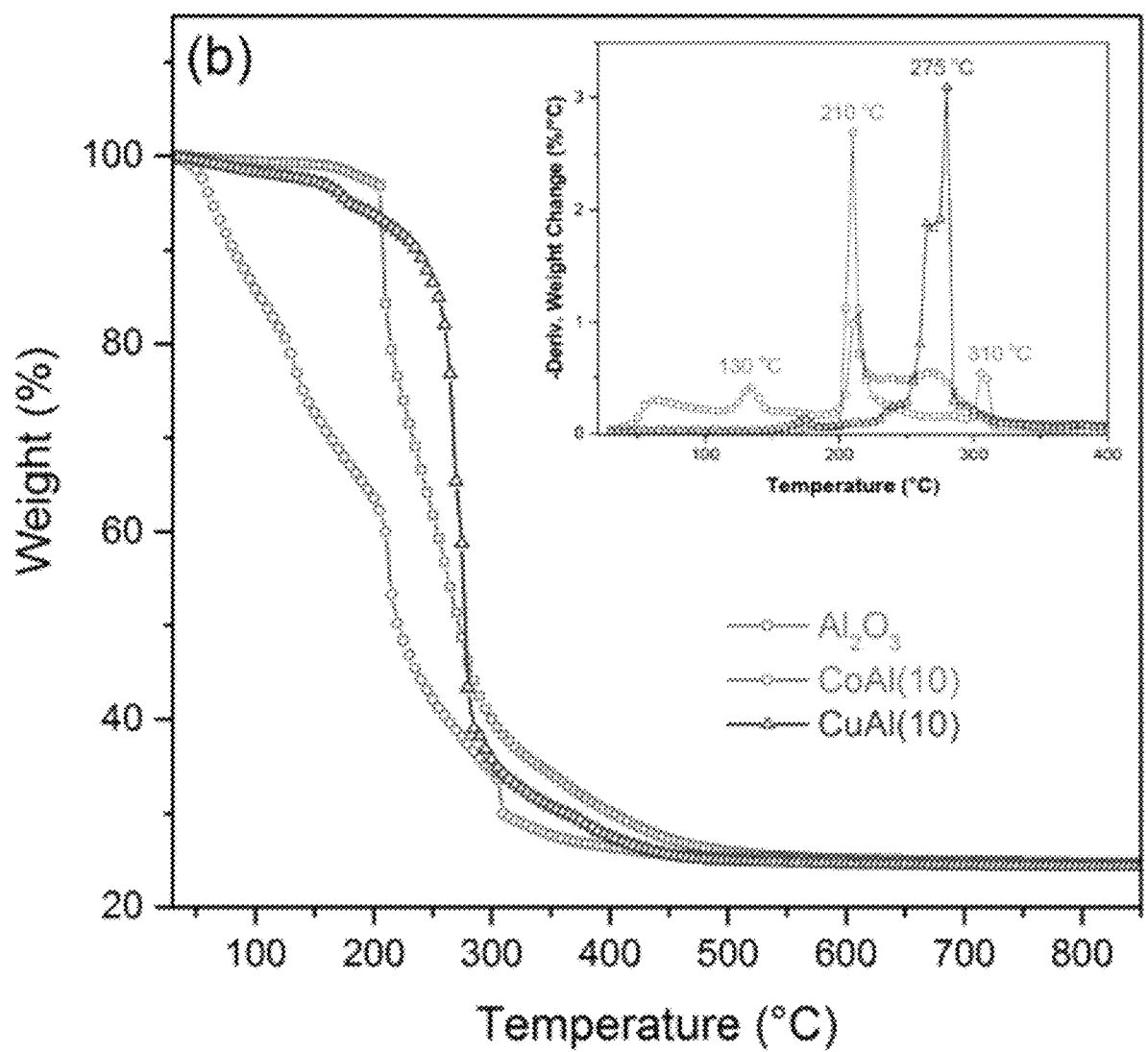

To evaluate the aforementioned sintering resistance, the relative decrease in the surface area with increasing temperature is shown in FIG. 4. The relative percentage loss was used to normalize other effects in $S_{BET}$ that may arise from different synergetic effects between transition metal species, triblock copolymer, and alumina precursors. Such effects are capable of changing the self-assembly process, which in turn changes the mesophase structure, resulting in different surface areas after polymer decomposition. At 400° C. the entire polymer is already decomposed, and in addition, the majority of the precursor is hydrolyzed and solvent evaporated (see the TG of the samples in FIG. 16, Supporting Information). Nonetheless, the percentage loss in $S_{BET}$ is related to the thermal resistance of the synthesized materials at temperatures above 400° C.

As can be seen from FIG. 4 the addition of $Co^{2+}$ and $Ni^{2+}$ promotes higher resistance to the surface area loss across all calcination temperatures, which is related to the formation of the thermal resistant transition metal aluminate phases at lower temperatures as evidenced by the XRD and FTIR studies. We suggest that the presence of surface defects and smaller distances for cation counter-diffusion promote the formation of the spinel phases at lower temperatures.

Additionally, the crystalline phase similarities (spinel phase) between reactant and products promote a smaller change in entropy, and consequently, smaller surface energy loss is needed to compensate the entropy change. On the other hand, the addition of $Cu^{2+}$ showed lower thermal stability as compared to the reference materials, $Al_2O_3$-y and Bh-y, which is related to several changes in the crystalline phase with increasing temperature. This effect is more evident when the formation of $\alpha$-$Al_2O_3$ was induced in CuAl(10)-1100, thus drastically decreasing the surface area.

Interestingly, the reference materials, $Al_2O_3$-y and Bh-y, have quite similar thermal resistance, although both materials possess very distinct textural properties. The XRD analysis indicates that both solids show analogous phase transitions with increasing temperature. Additionally, a comparison of NiAl(10)-y and Ni-OMA shows that NiAl(10)y features a significantly higher thermoresistance. Both materials possess the same chemical composition (10% Ni-doped into $Al_2O_3$), but significantly differ in the degree of crystallinity. The data for Ni-OMA were taken from ref 17, showing the transition from amorphous to crystalline structure with increasing temperature. Therefore, the above comparison confirms our assumption that the drastic decrease in the surface area is related to the larger change in entropy caused by the increase in crystallinity and change of crystalline phases; the latter seems to be more significant. For instance, the use of Mg ratifies these observations. Since $MgAl_2O_4$ is formed around 400° C., which is lower temperature than those for the formation of other metal aluminates, $MgAl_2O_4$ exhibited higher and more stable porosity among all tested aluminates.

It is worth mentioning that the pore size analysis of the synthesized solids was performed by the KJS method (Kruk-Jaroniec-Sayari method) calibrated up to 19 nm.[78,79] This method uses the well-ordered materials with different pore sizes to improve the relation between the pore size and capillary condensation pressure that is needed for calculation of PSD. This method is often applied for reliable pore size analysis. However, the alumina-based samples studied in this work possess also pore diameters outside the aforementioned calibration range; thus, deviations in the pore sizes are expected.

On the other hand, a comparison with available literature data allows us to rationalize the deviation limits. Cao and co-workers synthesized a series of SBA-15 with ultra large pores, for which the pore size diameters were accurately assessed by XRD analysis.[80] They obtained a pore size of 26 nm for a capillary condensation event at $P/P_0 \approx 0.94$ (midpoint); the BJH method overestimated this pore size by 8 nm. Herein, the sample CoAl(10)-900 has a similar capillary condensation midpoint, at $P/P_0 \approx 0.94$. and the calculated pore diameter is 24 nm. Therefore, we can expect that the method used may underestimate the pore sizes up to 2 nm.

Figure 17A:
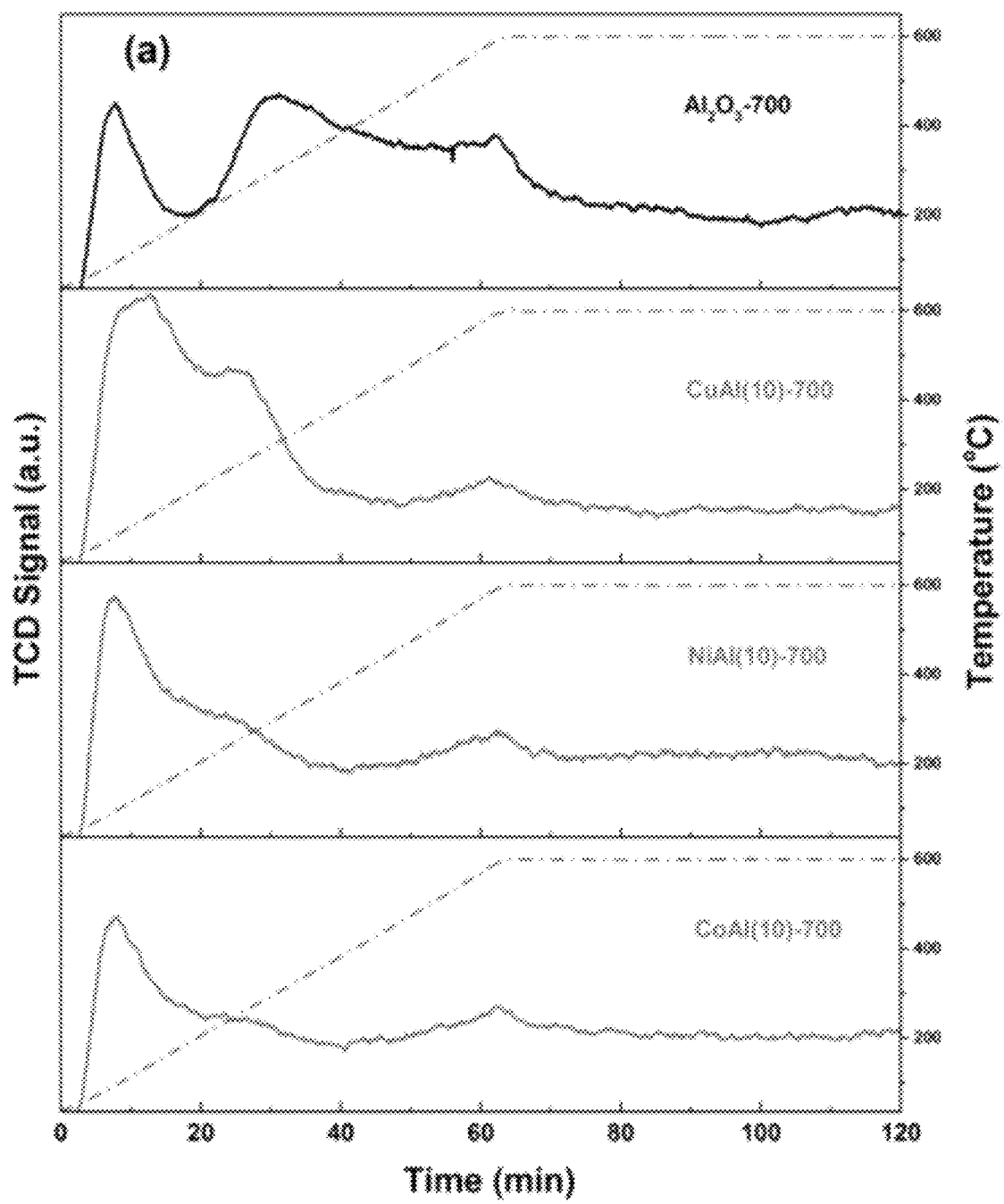
FIG. 17 shows temperature-programmed desorption of (a) $CO_2$ and (b) $NH_3$ for the MeAl(10)-700 samples. The total amount of $CO_2$ chemisorbed (top to bottom) is 0.55, 0.77, 0.98 and 1.0 $mmol \cdot g^{-1}$, whereas the total amount of $NH_3$ chemisorbed (top to bottom) is 1.28, 1.33, 1.57, and 1.56 $mmol \cdot g^{-1}$.
Figure 17B:
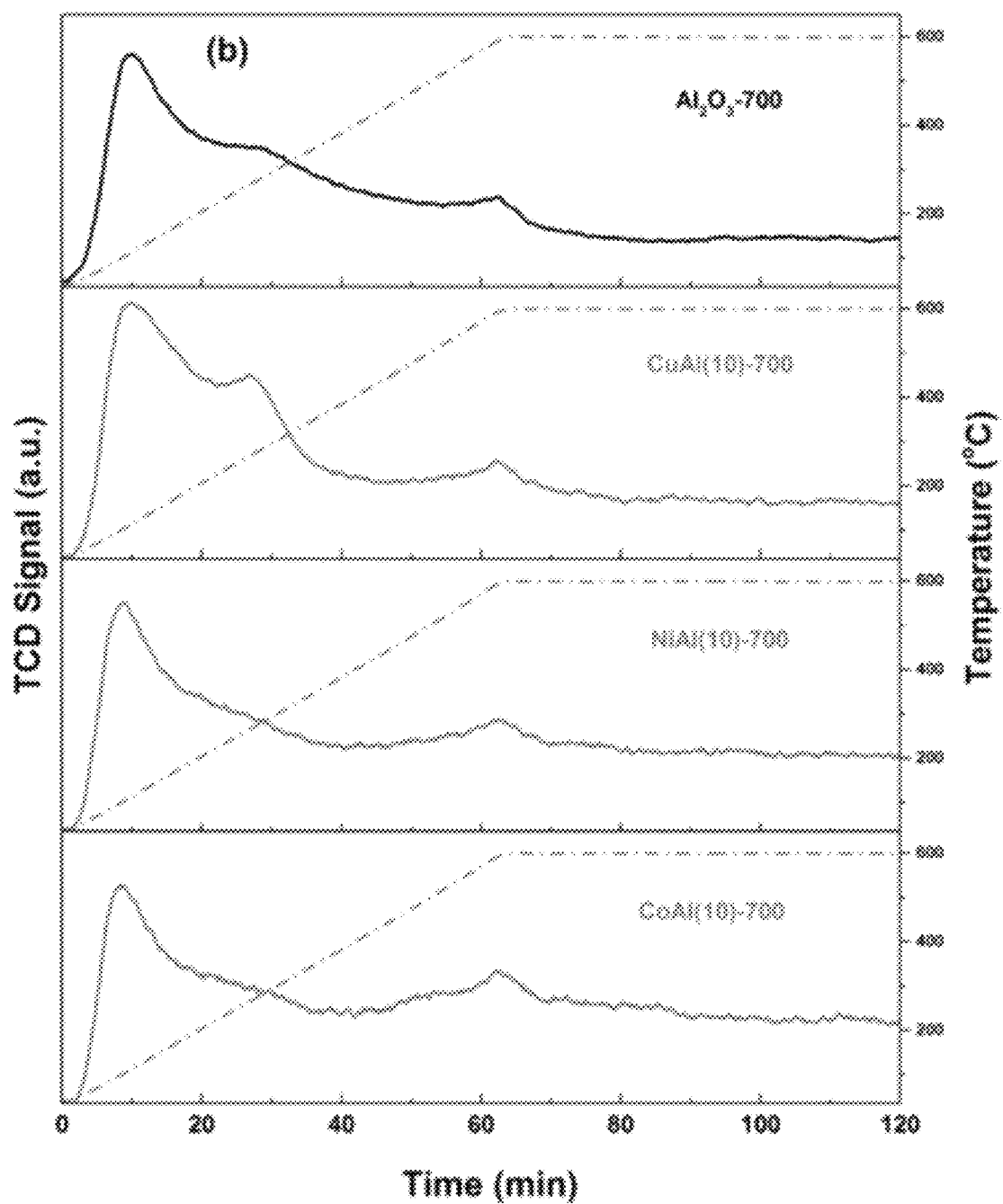

The surface acidity and basicity of the synthesized materials were evaluated by $NH_3$- and $CO_2$-TPD analyses, respectively, as shown in FIG. 17, Supporting Information. An increase in the amount of acid and basic sites was observed upon addition of transition metals. The $NH_3$-TPD analyses showed sorption capacities ranging from 1.3 to 1.6 $mmol \cdot g^{-1}$. The most significant difference was observed for CuAl(10)-700, displaying a stronger chemisorption peak around 270° C., which was not observed for other materials. This result may be related to the strong adsorption of ammonia at the copper oxide surface in comparison to that on nickel and cobalt oxides.[81-84]

A more pronounced difference is observed in the case of $CO_2$-TPD profiles, A 2-fold increase in the adsorption capacities is observed, approximately from 0.5 to 1.0 $mmol \cdot g^{-1}$. Additionally, the transition metal insertion clearly reduced the strength of basic sites across all samples. This observation may be related to the, presence of surface defects, because the chemisorption of $CO_2$ in solids is strongly influenced by the type of surface defects. For instance, oxygen vacancies or undercoordinated oxygen sites tend to strongly adsorb $CO_2$, even possibly forming carbonate structures.[57-60] Nonetheless, it is expected that oxygen vacant sites bind $CO_2$ much more strongly than undercoordinated oxygen sites. Therefore, the weakening in the strength of basic sites can be used to explain a decrease in the amount of surface defects due to the insertion of transition metal cations in the $\gamma$-$Al_2O_3$ crystal structure. Thus, an increase in the $CO_2$ adsorption capacity is likely due to an increase in the amount of under coordinated oxygen sites or Me-OH surface groups.

Experiments, Data and Charts (Supporting Information)

Synthesis of $MeAl_2O_4$ with ultralarge mesopores. Reactants: Boehmite (Sasol, ~60 nm particles); nickel (II) nitrate hexahydrate 99% (Across Organics); copper (II) nitrate trihydrate (Across Organics); cobalt (II) nitrate hexahydrate 99% (Across Organics); magnesium nitrate hexahydrate (Fisher Scientific); Iron (II) chloride tetrahydrate; Lanthanum (III) chloride heptahydrate (Across Organics); Ammonium cerium(IV) sulfate dihydrate (Across Organics); anhydrous ethanol 200 proof 99.5% (Across Organics); nitric acid 68-70 wt. % (Across Organics); and triblock copolymer Plutonic®.

The procedure used is an adaptation of the procedure reported elsewhere (*ACS Appl. Mater. Interfaces*, 2010, 2, 588-593). Approximately 2.50 g of triblock copolymer was dissolved in 20 mL of anhydrous ethanol, followed by the addition of the transition metal source ($Ni^{2+}$, $Co^{2+}$, or $Cu^{2+}$), and stirred for 4 hours. The amount of metal added was between 5 to 30% based on the amount of aluminum in boehmite. Meanwhile, 1.20 g of boehmite nanoparticles (~20 mmoles of Al) were dispersed in 15 mL of water with 0.26 mL of nitric acid ($[H^+]/[Al^{3+}]=0.2$). The resulting mixture was subjected to microwave irradiation at 70° C. (heating hate of $10°$ $C.·min^{-1}$) for 1 hour under stirring conditions, aiming to peptize boehmite nanoparticles and form a white semi-transparent gel. After cooling down this gel to room temperature, the peptized-alumina gel was transferred to the polymer/metal cation solution and stirred for 4 hours in a closed seal at room temperature. After that, solvent evaporation was performed first at 60° C. for 48 hours, and then at 100° C. for another 48 hours. Large and semi-transparent solids were formed with different colors depending on the type of metal added. The final solids were subjected to different calcination temperatures under air atmosphere, varying from 400 to 1100° C., in a horizontal quartz tube furnace using a heating rate of $1°$ $C.·min^{-1}$, and held at the final temperature for 4 hours (1 hour when 900 and 1100° C. were used).

Safety note: Nitric acid and alcohols should not be mixed in concentrations greater than 10% (v/v) to avoid rapid formation of nitrogen dioxide ($NO_2$) and possible explosion. Herein, despite the fact that nitric acid is consumed during the boehmite peptization, the overall used concentration is 1.3% (v/v) in relation to ethanol, and 0.7% (v/v) in the mixture of water/ethanol.

Polymer-transition metal mixture. To study the metal cation effect on the polymer decomposition, solutions containing 0.625 g of Pluronic P123 dissolved in 5.0 mL of ethanol and 3.75 mL of deionized water were prepared. 0.5 mmoles of either nickel, cobalt or copper nitrate were added to these solutions, and stirred in a closed vessel until obtaining clear solutions. The solutions were consecutively dried at 60° C. for 48 hours, and 100° C. for another 48 hours. A viscous and homogenous gel was obtained, which was further analyzed by thermogravimetry (TGA). Measurements and characterization procedures are provided below.

Measurements and Characterization. Powder X-ray diffraction measurements (XRD) were performed using a Geigerflex (Rigaku, Inc) using Cu κα radiation (0.154 nm) from 10.0° to 80.0° (2θ—wide angle). The conditions involved a voltage of 45 kV, a current of 35 mA, and a step size of 0.02°, at $0.8°·min^{-1}$.

High Resolution Thermogravimetric (TG) analyses were performed on a TA Instrument TGA Q500 Thermogravimetric analyzer. The TG profiles were recorded up to 800° C. in flowing air with a heating rate of $6°$ $C.·min^{-1}$. Infrared spectra of samples were obtained on a Bruker vector 33 in the range of 4000-500 $cm^{-1}$, using a resolution of 4 $cm^{-1}$ and 100 scans.

Nitrogen physisorption measurements were performed using ASAP 2010 (Micromeritics, Inc.) volumetric Analyzers, using ultra-high-purity nitrogen gas (99.999%) at the temperature of −196° C. Prior to the analysis all samples were outgassed under vacuum for 2 hours at 200° C. to remove physisorbed molecules.

$NH_3$ and $CO_2$ Temperature-Programmed Desorption ($NH_3/CO_2$-TPD) were performed in a Chemisorption Analyzer Auto Chem 2920 (Micromeritics, Inc.). First, the samples were degassed by heating to 600° C. (heating rate of $10°$ $C.·min^{-1}$) under helium flow (50 $cm^3·min^{-1}$) to remove possible adsorbed molecules. Then, the samples were cooled down to 50° C., and subjected to either $CO_2$ or $NH_3$ gas flow (both 5% in He; 50 $cm^3·min^{-1}$) for 1 hour. After exposure to the probe molecule, a 50 $cm^3·min^{-1}$ helium flow was used for 1 hour to remove the physisorbed $CO_2$ or $NH_3$ molecules. Finally, data were acquired by temperature desorption of the probe molecule by heating at $10°$ $C.·min^{-1}$ to 600° C., and holding at the maximum temperature for 1 hour.

The specific surface areas ($S_{BET}$) of the materials studied were calculated using the $N_2$ adsorption data in the relative pressure range from 0.05 to 0.2 and molecular cross-sectional area of 0.162 $nm^2$ (*Chem. Mat.* 2001, 13, 3169-3183). The single-point pore volume ($V_{sp}$) was evaluated from the amount of nitrogen adsorbed at $P/P_o≈0.99$. The pore size distribution (PSD) was calculated using the KJS method (*Langmuir*, 2006, 22, 6767-6760).

Additional Information

The term solid solution indicates that the metal containing oxide phase can be uniformly dispersed in aluminum oxide. Additionally, we have experimental data showing that the proposed method allows for uniform incorporation of iron, manganese, cerium, lanthanum, and magnesium into alumina framework and formation of crystalline metal aluminates (see Table 1). The use of magnesium significantly improves the porosity and produces materials with very high stability among all tested samples. Magnesium aluminate is an important ceramic material in industry, and usually obtained with low porosity and surface area; in contrast, our method produces high surface area and large porosity crystalline materials as displayed in table 1.

Peptization of crystalline or poorly crystalline alumina precursors such as commercial boehmite was performed with nitric acid as a peptizating agent and commercial Pluronic block copolymer as a structure-directing agent. However, other peptization strategies, including other peptizating agents, other polymers, conventional thermal treatment, microwave irradiation or sonication can be used to enhance defects and generate aluminum polycations in solution. The commercially available Pluronic® P123 block copolymer was used as a structure directing agent to generate porosity and bring the counter diffusion to the nanoscale level.

The mass ratio of peptized alumina precursor to block copolymer could be tuned; the ratio used in the paper was 1:2.08, but different ratios (between 1:1 to 1:3) were studied and delivered similar results.

Stirring time and drying conditions can be easily tuned without significant changes in the materials' properties. The synthesis mixture was stirred for 4 hours, and dried at 60° C. for 48 hours, then at 100° C. for another 48 hours. The longer stirring times give similar results and thermal analytical studies indicate that drying temperatures can be tuned. The latter also includes the heating rate applied to convert precursors in the final product.

As indicated above, the synthesis with copper salt generated alpha alumina with much higher surface area than that of analogous materials obtained by the current methods. The properties of the resulting composite can be further improved/tuned by changing the amount of copper used and/or temperature and time conditions. This also can generate mixtures of other transitional aluminas with alpha alumina. The most important aspect is to create a highly porous structure with desired crystallinity at lower temperatures.

Several studies in literature show that the copper present in alumina can be removed by leaching techniques. Therefore, it is expected that alpha alumina (aluminum oxide) with lower copper concentration (copper doping) than that of starting material can be obtained by post synthesis treatments.

Experimental studies (data not shown in paper) show that the metal content in the mixed oxide materials can be reduced to generate supported metallic particles. These particles can display nanometer sizes and have catalytic properties. Because the degree of metal dispersion can be tuned up to single-atom catalysts, the resulting catalysts exhibit unique features that may or may not differ from that observed in bulk oxides or supported metal oxides obtained by the current methods. High surface area can improve the stability of supported metallic particles in respect to sintering. Partial reduction can be used to tailor the catalytic properties of the material too.

The fact that the materials can be peptized and assembled to create the final mixed metal oxides indicates that the synthesized composites can be fabricated in the form of monoliths, films, particles such as spheres, rods and so on. Additives and polymers can also be used to fabricate these materials in several forms. These processes are commonly applied to process ceramics, and the important aspect herein is to transfer the textural properties of the synthesized powders to the final product.

The synthesis of $MeAl_2O_4$ with exceptional textural properties such as ultra large pores and high surface area was successfully achieved by rational design of the synthesis route that allows one to minimize the entropy changes during phase transition under temperature evolution. The addition of transition metals during synthesis resulted in the formation of a highly defective surface that promotes the formation of metal aluminate phases at lower temperatures. Because of the high thermomechanical resistance of $MeAl_2O_4$ and $\gamma$-$Al_2O_3$ obtained by this method, the materials showed a decrease in the degree of sintering. As a result, the materials showed higher surface areas, high crystallinity, larger pore volumes, and larger pore sizes than those obtained by other methods. Additionally, it was shown that the presence of transition metals changes the thermo-decomposition profile of the triblock copolymer, the mesophase directing agent, which implies changes in the pore sizes and pore volumes of the synthesized materials. The addition of $Co^{2+}$ resulted in the highest decomposition temperature of the block copolymer, followed by $Ni^{2+}$ and $Cu^{2+}$ additions. As a result, the addition of $Co^{2+}$ provided materials with the highest pore diameters and pore volumes, followed by those obtained after adding $Ni^{2+}$ and $Cu^{2+}$.

The proposed synthesis strategy represents an advance in the creation of transition metal aluminate phases with high porosity and surface area, since these materials usually possess lower surface areas and pore volumes due to the high temperature applied to obtain the spinel phases. The most common approach to obtain high surface area metal aluminates is creating nanoparticles and/or using metal alkoxides as a precursor. However, the use of nanoparticles can be limited because of difficulties related to the possible product-reactant separation issue. Regardless, the synthesized $MeAl_2O_4$ with ultralarge mesopores shows surface areas comparable to or larger than those obtained for $MeAl_2O_4$ nanoparticles. Additionally, their enhanced acid-base properties make these materials appropriate as supports, adsorbents, and catalysts. For instance, the ultralarge pores of these materials make them very attractive as hosts for large compounds such as enzymes, where large pores facilitate the diffusion of host, reactants, and products, while high surface area may accommodate a larger amount of host molecules.

Certain types of ceramic materials can be only prepared at high temperatures, at which amorphous or poorly crystalline phases are converted into the desired crystalline phase. This is the case of metal aluminates such $NiAl_2O_4$, $CoAl_2O_4$, and $CuAl_2O_4$. However, the use of high temperatures to transform the amorphous phases to crystalline ones promote sintering, the consequence of which is the collapse of porous structure accompanied by the increase of crystallinity. Therefore, the currently available methods to produce crystalline ceramic materials are limited to their formation at high temperatures, which is associated with substantial shrinkage of the porous structure resulting in significant lowering their surface area and porosity. In many cases, the porous structure totally collapses at temperatures higher as 1000° C. Therefore, we have designed a new synthesis strategy that circumvents the aforementioned problem in order to create crystalline materials with high porosity and large surface area, where the porous structure do not collapse even after exposing them to temperatures as high as 1100° C. This was achieved by inducing the formation of high-temperature metal aluminates at lower temperatures.

Metal aluminates ($MeAl_2O_4$ or $MeAlO_3$–Me=Mg, Mn, Fe, Ni, Co, Cu, Ce, or La; or any combination thereof), or said metal aluminate nanoparticles with an alumina ($Al_2O_3$) support or substrate, such as ($\gamma$-alumina; or $\theta$-alumina or $\alpha$-alumina, or any combination thereof, were synthesized in three steps as follows. (1) commercial boehmite nanoparticles having an average particle size of from about 1 to about 100 nm and desirably from about 25 to about 60 nm were peptized in a concentrated aqueous acid solution such as hydrochloric acid, nitric acid, and the like with $HNO_3$ being preferred, due to easy elimination during calcination, using molar ratios of $[H^+]/[Al^{3+}]$ in the range of 0.05 to approximately 0.3. The peptization temperatures range was from about 40° C. to about 90° C., and preferably where about 45° C. to about 75° C., such as about 70° C. for short periods of time such as 0.75 to about 1.5 hours or approximately 1 hour. The use of boehmite as raw material is important to generate initial crystallinity while the peptization enhances defects, which both promote counter diffusion and act as sinks for metal cations, in turn enhancing the metal dispersion and its insertion into the crystal structure upon thermal treatment. Microwave irradiation was performed only for high throughput studies due to the amount of trials; however, conventional thermal treatment was shown to deliver similar results. (2) Meanwhile, a solution of commercially available block copolymer was prepared in an organic solvent that is miscible with water such as various alcohols having from 1 to 4 or 5 carbon atoms including various isomers thereof such as isopropyl alcohol, isobutyl alcohol, isopentyl alcohol, or any combination thereof, and the like, with ethanol being preferred (10-15% m/v), and then both solutions were mixed. Different amounts of ethanol can be used without interference since ethanol will be evaporated in the following steps and well as the organic solvents but ethanol was a cost efficient choice and therefore primarily used. Various block copolymers can be utilized that are diblock, triblock, etc., block copolymers that generally contain at least one hydrophilic block and at least hydrophobic block wherein the hydrophilic-hydrophobic blocks or hydrophobic-hydrophilic blocks alternate within the block copolymer, and any combination thereof. Suitable examples of block copolymers include the various different types of Pluronic® made by BASF and generally have blocks having a weight average molecular weight of from about 1,000 to about 15,000 or greater. Suitable Pluronic block copolymer is Pluronic 123 that contains ethylene glycol block-a polypropylene glycol block- and a polyethylene glycol block. Other suitable Pluronic block copolymers include F-127, and F-108 The most often used peptized boehmite to polymer mass ratio was in the range 1 to 3 or 1 to 2; nonetheless, different ratios (approximately between 1:1 to 1:7 or 1:1 to 1:4) can be used to obtain similar results. The block copolymer such as Pluronic 123 was used as a mesopore structure directing agent but other structure directing agents are expected to work too as long as they facilitate formation of nanostructured metal aluminates at lower temperatures. Various specific salts of the above metals, e.g. nitrate, sulfate, and chloride salts were added to the mixture at concentrations between about 2% to about 30% and desirably from about 5% to about 20% in relation to the total molar amount of $Al^{3+}$ in boehmite (AlOOH). The resulting mixture was stirred in a sealed vessel, at ambient, e.g. room temperature (about 10° C. to about 40° C., desirably about 12° C. to about 28° C., preferably about 14° C. to about 24° C.) for about 2 to 6 hours, desirably about 3 to 5 hours, and preferably 4 hours (longer time may be needed for large scale systems), and dried at about 60° C. or higher (bellow the decomposition temperature of the polymer) for a day or longer to provide enough time to evaporate the solvent and form a product such as a solid material or gel. Longer stirring times gave similar results and thermal analytical studies indicated that drying temperatures can be tuned. (3) Finally, the obtained solids were calcined at temperatures ranging from 400 to 1100° C.; higher temperatures can be applied by any conventional method and the surface area loss will continue as temperature increases is a driving force for sintering. Thus, low temperatures are desired such as about 300° C. to about 1,400° C., desirably from about 400° C. to about 1,100° C. or about 1,000° C. or about 900° C. Metal aluminate phases were formed above about 400° C. and their crystallinity improved with increasing temperature. The key to protect the materials from an extensive sintering upon thermal treatment was the formation of the metal aluminate phase at lower temperatures, and for this reason the materials herein described possess better textural properties than those of reported. Moreover, analogous synthesis was performed without the structure-directing agent (Polymer) and the resulting materials did not show the formation of metal aluminates at lower temperatures, thus, indicating the importance of bringing the counter diffusion to the nanometer scale level. Interestingly, the latter synthesis created black nickel in $\gamma$-$Al_2O_3$, demonstrating the oxidizing properties of the solid matrix due to the presence of highly defective structure. Generally, at the stoichiometric ratio of metal to aluminum of about 1 to 2, the final product was the metal aluminate phase, e.g. $MeAl_2O_4$. However, if a larger amount of aluminum in relation to the stoichiometric ratio is used the final product is the metal aluminate supported on an alumina ($Al_2O_3$) structure, skeleton, framework, and the like. Moreover, a portion of a metal oxide phase may coexist with the metal aluminate phase depending on the thermal treatment applied. The alumina can have different crystal phases such as gamma ($\gamma$) theta ($\theta$) or alpha ($\alpha$) wherein the gamma and theta phases are generally produced at calcining temperatures of about 1,000° C. or below whereas the alpha-alumina phases are formed at calcining temperatures of appropriately about 1,000° C. The end result is that high surface area materials up to about 410 $m^2/g$, desirably from about 5 to about 410, and preferably about 20 or 150 to about 330 $m^2/g$ were produced. High porosity up to 2.5 $cm^3/g$ and desirably from about 0.5 to about 1.5 or 2.1 $cm^3/g$ were obtained. Ultra large mesopores (up to 30 nm, by the KJS method) were obtained. The above properties were quite well preserved upon high temperature treatment (above 400° C.) to improve crystallinity and mechanical resistance. For instance, the use of Cu induced the phase transition from $\gamma$- to $\theta$- to $\alpha$-alumina at lower temperature, which is known in the literature; however, our synthesis produces $\alpha$-alumina with much higher surface area (>5 $m^2/g$) and porosity than those of $\alpha$-alumina obtained by the currently available methods.

While in accordance with the patent statutes the best mode and preferred embodiment have been set forth, the scope of the invention is not limited thereto, but rather by the scope of the attached claims.

REFERENCES (1) Fiori, G.; Bonaccorso, F.; Iannaccone, G.; Palacios, T.; Neumaier, D.; Seabaugh, A.; Banerjee, S. K.; Colombo, L. Electronics Based on Two-dimensional Materials. Nat. Nanotechnol. 2014, 9, 768-779.

(2) Jayalakshmi, M.; Balasubramanian, K. Simple Capacitors to Supercapacitors—An Overview. Int. J. Electrochem. Sci. 2008, 3, 1196-1217.

(3) Li, J.; Zhang, J. Z. Optical Properties and Applications of Hybrid Semiconductor Nanomaterials. Coord. Chem. Rev. 2009, 253, 3015-3041.

(4) Ogletree, D. F.; Schuck, P. J.; Weber-Bargioni, A. F.; Borys, N. J.; Aloni, S.; Bao, W.; Barja, S.; Lee, J.; Melli, M.; Munechika, K.; Whitelam, S.; Wickenburg, S. Revealing Optical Properties of Reduced-Dimensionality Materials at Relevant Length Scales. Adv. Mater. 2015, 27, 5693-5719.

(5) Shiju, N. R.; Guliants, V. V. Recent Developments in Catalysis using Nanostructured Materials. Appl. Catal., A 2009, 356,1-17.

(6) Zaera, F. Nanostructured Materials for Applications in Heterogeneous Catalysis. Chem. Soc. Rev. 2013, 42, 2746-2762.

(7) Zhou, C.; Xia, X.; Lin, C.; Tong, D.; Beltramini, J. Catalytic Conversion of Lignocellulosic Biomass to Fine Chemicals and Fuels. Chem. Soc. Rev. 2011, 40, 5588-5617.

(8) Labhasetwar, N.; Saravanan, G.; Megarajan, S. K.; Manwar, N.; Khobragade, R.; Doggali, P.; Grasset, F. Perovskite-type catalytic materials for environmental applications. Sci. Technol. Adv. Mater. 2015, 16, 036002.

(9) Trueba, M.; Trasatti. S. $\gamma$-Alumina as a Support for Catalysts: A review of Fundamental Aspects. Eur. J. Inorg. Chem. 2005, 2005, 3393-3403.

(10) Qian, X.; Fuku, K.; Kuwahara, Y.; Kamegawa, T.; Mori, K.; Yamashita, H. Design and Functionalization of Photocatalytic Systems within Mesoporous Silica. ChemSusChem 2014, 7, 1528-1536.

(11) Perez, L. L.; Perdriau, S.; Brink, G. t.; Kooi, B. J.; Heeres, H. J.; Melian-Cabrera, I. Stabilization of Self-Assembled Alumina Meso-phases. Chem. Mater. 2013, 25, 848-855.

(12) Klimov, O. V.; Leonova, K. A.; Koryakina, G. I.: Gerasimov, E. Y.; Prosvirin, I. P.; Cherepanova, S. V.; Budukva, S. V.; Pereyma, V. Y.; Dik, P. P.; Parakhin, O. A.; Noskov, A. S. Supported on Alumina Co—Mo Hydrotreating Catalysts: Dependence of Catalytic and Strength Characteristics on the Initial AlOOH Particle Morphology. Catal. Today 2014, 220,66-77.

(13) Pinheiro, A. L.; Pinheiro, A. N.; Valentini, A.; Mendes Filho, J.; de Sousa, F. F.; de Sousa, J. R.; Rocha, M. d. G. C.; Bargiela, P.; Oliveira, A. C. Analysis of Coke Deposition and Study of the Structural Features of MAl2O4 Catalysts for the Dry Reforming of Methane. Catal. Commun. 2009, 11,11-14.

(14) Vasiliadou, E. S.; Eggenhuisen, T. M.; Munnik, P.; de Jongh, P. E.; de Jong, K. P.; Lemonidou, A. A. Synthesis and Performance of Highly Dispersed Cu/SiO2 Catalysts for the Hydrogenolysis of Glycerol. Appl. Catal., B 2014, 145, 108-119.

(15) Fulvio, P. F.; Brosey, R. I.; Jaroniec, M. Synthesis of Mesoporous Alumina from Boehmite in the Presence of Triblock Copolymer. ACS Appl. Mater. Interfaces 2010, 2, 588-593.

(16) Goncalves, A. A. S.; Faustino, P. B.; Assaf, J. M.; Jaroniec, M. One-Pot Synthesis of Mesoporous Ni—Ti—Al Ternary Oxides: Highly Active and Selective Catalysts for Steam Reforming of Ethanol. ACS Appl. Mater. Interfaces 2017, 9, 6079-6092.

(17) Morris, S. M.; Fulvio, P. F.; Jaroniec, M. Ordered Mesoporous Alumina-Supported Metal Oxides. J. Am. Chem. Soc. 2008, 130, 15210-15216.

(18) Cai, W.; Yu, J.; Anand, C.; Vinu, A.; Jaroniec, M. Facile Synthesis of Ordered Mesoporous Alumina and Alumina-Supported Metal Oxides with Tailored Adsorption and Framework Properties. Chem. Mater. 2011, 23, 1147-1157.

(19) de Morais Batista, A. H.; Ramos, F. S. O.; Braga, T. P.; Lima, C. L.; de Sousa, F. F.; Barros, E. B. D.; Mendes Filho. J.; de Oliveira, A. S.; de Sousa, J. R.; Valentini, A.; Oliveira, A. C. Mesoporous MAl2O4 (M═Cu, Ni, Fe or Mg) spinels: Characterisation and Application in the Catalytic Dehydrogenation of Ethylbenzene in the Presence of CO2. Appl. Catal., A 2010, 382, 148-157.

(20) Giannakas, A. E.; Ladavos, A. K.; Armatas, G. S.; Pomonis, P. J. Surface Properties, Textural Features and Catalytic Performance for NO plus CO Abatement of Spinels MAl2O4 (M═Mg, Co and Zn) Developed by Reverse and Bicontinuous Microemulsion Method. Appl. Surf. Sci. 2007, 253, 6969-6979.

(21) Rahnamaeiyan, S.; Nasiri, M.; Talebi, R.; Khademolhoseini, S. Novel Sol-gel Method for Synthesis of Cobalt Aluminate and its Photocatalyst Application. J. Mater. Sci.: Mater. Electron. 2015, 26, 8720-8725.

(22) Chorkendorff, I.; Niemantsverdriet, J. W. Concepts of modern catalysis and kinetics; Wiley-VHC: Weinheim, Germany, 2003.

(23) Shang, X.; Wang, X.; Nie, W.; Guo, X.; Zou, X.; Ding, W.; Lu, X. Facile Strategy for Synthesis of Mesoporous Crystalline γ-alumina by Partially Hydrolyzing Aluminum Nitrate Solution. J. Mater. Chem. 2012, 22, 23806-23814.

(24) Perez, L. L.; Zarubina, V.; Heeres, H. J.; Melian-Cabrera, I. Condensation-Enhanced Self-Assembly as a Route to High Surface Area alpha-Aluminas. Chem. Mater. 2013, 25, 3971-3978.

(25) Wang, X.; Pan, D.; Guo, M.; He, M.; Niu, P.; Li, R. Facile Synthesis of Highly Ordered Mesoporous Alumina with High Thermal and Hydrothermal Stability using Zirconia as Promoter. Mater. Lett. 2013, 97,27-30.

(26) Vedyagin, A. A.; Volodin, A. M.; Stoyanovskii, V. O.; Kenzhin, R. M.; Slavinskaya, E. M.; Mishakov, I. V.; Plyusnin, P. E.; Shubin, Y. V. Stabilization of Active Sites in Alloyed Pd—Rh Catalysts on γ-Al2O3 Support. Catal. Today 2014, 238,80-86.

(27) Tirsoaga, A.; Visinescu, D.; Jurca, B.; Ianculescu, A.; Carp, O. Eco-friendly Combustion-based Synthesis of Metal Aluminates MAl2O4 (M═Ni, Co). J. Nanopart. Res. 2011, 13, 6397-6408.

(28) Stathopoulos, V.; Pomonis, P. Low-temperature Synthesis of Spinels MAl2O4 (M═Mg, Co, Ni, Cu, Zn) Prepared by a Sol-gel Method. Prog. Colloid Polym. 2001, 118,17-21.

(29) Dhak, D.; Pramanik, P. Particle Size Comparison of Soft-chemically Prepared Transition Metal (Co, Ni, Cu, Zn) Aluminate Spinels. J. Am. Ceram. Soc. 2006, 89, 1014-1021.

(30) Yue, W.; Zhou, W. Crystalline Mesoporous Metal Oxide. Prog. Nat. Sci. 2008, 18, 1329-1338.

(31) Zhen, M.; Zhou, B.; Ren, Y. Crystalline Mesoporous Transition Metal Oxides: Hard-templating Synthesis and Application in Environ-mental Catalysis. Front. Environ. Sci. Eng. 2013, 7, 341-355.

(32) Pozzoli, V. A.; Ruiz, M. S.; Kingston, D.; Razzitte, A. C. Entropy Production During the Process of Sintering. Procedia Mater. Sci. 2015, 8, 1073-1078.

(33) Deraz, N. M. Synthesis and Characterization of Nano-Sized Nickel Aluminate Spinel Crystals. Int. J. Electrochem. Sci. 2013, 8, 5203-5212.

(34) Trumble, K. P.; Ruhle, M. The Thermodynamics of Spinel Interphase Formation at Diffusion-Bonded Ni/Al2O3 Interfaces. Acta Metall. Mater. 1991, 39, 1915-1924.

(35) Pettit, F. S.; Randklev, E. H.; Felten, E. J. Formation of NiAl2O4 by Solid State Reaction. J. Am. Ceram. Soc. 1966, 49, 199-203.

(36) Ghule, A. V.; Ghule, K.; Punde, T.; Liu, J.; Tzing, S.; Chang, J.; Chang, H.; Ling, Y. In Situ Monitoring of NiO-Al2O3 Nanoparticles Synthesis by Thermo-Raman Spectroscopy. Mater. Chem. Phys. 2010, 119,86-92.

(37) Anchieta, C. G.; Tochetto, L.; Madalosso, H. B.; Sulkovski, R. D.; Serpa, C.; Mazutti, M. A.; Almeida, A. R. F. d.; Gilndel, A.; Foletto, E. L. Effect of Thermal Treatment on the Synthesis of NiAl2O4 Spinel Oxide using Chitosan as Precursor. Ceramica 2015, 61, 477-481.

(38) Taguchi, M.; Nakane, T.; Hashi, K.; Ohki, S.; Shimizu, T.; Sakka, Y.; Matsushita, A.; Abe, H.; Funazukuri, T.; Naka, T. Reaction Temperature Variations on the Crystallographic State of Spinel Cobalt Aluminate. Dalton Trans. 2013, 42, 7167-7176.

(39) Jafari, M.; Hassanzadeh-Tabrizi, S. A. Preparation of CoAl2O4 Nanoblue Pigment via Polyacrylamide Gel Method. Powder Technol. 2014, 266, 236-238.

(40) Srisawad, N.; Chaitree, W.; Mekasuwandumrong, O.; Praserthdam, P.; Panpranot, J. Formation of CoAl2O4 Nanoparticles via Low-Temperature Solid-State Reaction of Fine Gibbsite and Cobalt Precursor. J. Nanomater. 2012, 2012, 108369.

(41) Ummartyotin, S.; Sangngern, S.; Kaewvilai, A.; Koonsaeng, N.; Manuspiya, H.; Laobuthee, A. Cobalt Aluminate (CoAl2O4) Derived from Co—Al-TEA Complex and Its Dielectric Behaviors. J. Sustainable Energy Environ. 2009, 1,31-37.

(42) Kwak, B. K.; Park, D. S.; Yun, Y. S.; Yi, J. Preparation and characterization of nanocrystalline CuAl2O4 spinel catalysts by Sol-gel Method for the Hydrogenolysis of Glycerol. Catal. Commun. 2012, 24, 90-95.

(43) Hu, C.; Shih, K.; Leckie, J. O. Formation of Copper Aluminate Spinel and Cuprous Aluminate Delafossite to Thermally Stabilize Simulated Copper-laden Sludge. J. Hazard. Mater. 2010, 181, 399-404.

(44) Li, W. D.; Li, J. Z.; Guo, J. K. Synthesis and Characterization of Nanocrystalline CoAl2O4 Spinel Powder by Low Temperature Combustion. J. Eur. Ceram. Soc. 2003, 23, 2289-2295.

(45) Ahmed, I. S. A Simple Route to Synthesis and Characterization of CoAl2O4 Nanocrystalline via Combustion Method using Egg White (Ovalbumins) as a New Fuel. Mater. Res. Bull. 2011, 46, 2548-2553.

(46) Hashemzehi, M.; Saghatoleslami, N.; Nayebzadeh, H. Micro-wave-Assisted Solution Combustion Synthesis of Spinel-Type Mixed Oxides for Esterification Reaction. Chem. Eng. Commun. 2017, 204, 415-423.

(47) Manikandan, A.; Durka, M.; Selvi, M. A.; Antony, S. A. Sesamum Indicum Plant Extracted Microwave Combustion Synthesis and Opto-Magnetic Properties of Spinel MnxCo1-xAl2O4 Nano-Catalysts. J. Nanosci. Nanotechnol. 2016, 16, 448-456.

(48) Mimani, T. Instant Synthesis of Nanoscale Spinel Aluminates. J. Alloys Compd. 2001, 315, 123-128.

(49) Lv, W.; Liu, B.; Qiu, Q.: Wang, F.; Luo, Z.; Zhang, P.; Wei, S. Synthesis, Characterization and Photocatalytic Properties of Spinel CuAl2O4 Nanoparticles by a Sonochemical Method. J. Alloys Compd. 2009, 479, 480-483.

(50) Abaide, E. R.; Anchieta, C. G.; Foletto, V. S.; Reinehr, B.; Nunes, L. F.; Kuhn, R. C.; Mazutti, M. A.; Foletto, E. L. Production of Copper and Cobalt Aluminate Spinels and Their Application As Supports for Inulinase Immobilization. Mater. Res. (Sao Carlos, Braz.) 2015, 18, 1062-1069.

(51) Habibi, N.; Wang, Y.; Arandiyan, H.; Rezaei, M. Low-temperature Synthesis of Mesoporous Nanocrystalline Magnesium Aluminate (MgAl2O4) Spinel with High Surface Area using a Novel Modified Sol-gel Method. Adv. Powder Technol. 2017, 28, 1249-1257.

(52) Kumar, R. T.; Suresh, P.; Selvam, N. C. S.; Kennedy, L. J.; Vijaya, J. J. Comparative Study of Nano Copper Aluminate Spinel Prepared by Sol-gel and Modified Sol-gel Techniques: Structural, Electrical, Optical and Catalytic Studies. J. Alloys Compd. 2012, 522, 39-45.

(53) Platero, E. E.; Arean, C. O.; Parra, J. B. Synthesis of High Surface Area CoAl2O4 and NiAl2O4 Spinels by an Alkoxide Route. Res. Chem. Intermed. 1999, 25, 187-194.

(54) Otero Arean, C.; Penarroya Mentruit, M.; Escalona Platero, E.; Llabrés i Xamena, F. X.; Parra, J. B. Sol-gel Method for Preparing High Surface Area CoAl2O4 and Al2O3-CoAl2O4 Spinels. Mater. Lett. 1999, 39,22-27.

(55) Cesteros, Y.; Salagre, P.; Medina, F.; Sueiras, J. E. Preparation and Characterization of Several High-area NiAl2O4 Spinels. Study of their Reducibility. Chem. Mater. 2000, 12, 331-335.

(56) McCarty, K. F.; Nobel, J. A.; Bartelt, N. C. Vacancies in Solids and the Stability of Surface Morphology. Nature 2001, 412, 622-625.

(57) Pavelec, J.; Hulva, J.; Halwidl, D.; Bliem, R.; Gamba, O.; Jakub, Z.; Brunbauer, F.; Schmid, M.; Diebold, U.; Parkinson, G. S. A Multi-Technique Study of CO2 Adsorption on Fe3O4 Magnetite. J. Chem. Phys. 2017, 146, 014701.

(58) Funk, S.; Hokkanen, B.; Johnson, E.; Burghaus, U. Effect of Oxygen Vacancy Sites on CO2 Adsorption Dynamics: The case of Rutile (1×1)-TiO2(110). Chem. Phys. Lett. 2006, 422, 461-465.

(59) Liu, L.; Zhao, C.; Li, Y. Spontaneous Dissociation of CO2 to CO on Defective Surface of Cu(I)/TiO2-x Nanoparticles at Room Temperature. J. Phys. Chem. C 2012, 116, 7904-7912.

(60) Wang, J.; Hokkanen, B.; Burghaus, U. Adsorption of CO2 on Pristine Zn—ZnO(0001) and Defected Zn—ZnO (0001): A Thermal Desorption Spectroscopy Study. Surf. Sci. 2005, 577, 158-166.

(61) Peymannia, M.; Soleimani-Gorgani, A.; Ghahari, M.; Najafi, F. Production of a Stable and Homogeneous Colloid Dispersion of Nano CoAl2O4 Pigment for Ceramic ink-jet ink. J. Eur. Ceram. Soc. 2014, 34, 3119-3126.

(62) James, T.; Padmanabhan, M.; Warrier, K. G. K.; Sugunan, S. CuAl2O4 Formation and its Effect on α-Al2O3 Phase Evolution on Calcination of Metal ion Doped Boehmite Xerogels. Mater. Chem. Phys. 2007, 103, 248-254.

(63) Ragupathi, C.; Vijaya, J. J.; Kennedy. L. J.; Bououdina, M. Combustion Synthesis, Structure, Magnetic and Optical Properties of Cobalt Aluminate Spinel Nanocrystals. Ceram. Int. 2014, 40, 13067-13074.

(64) Stangar, U. L.; Orel, B.; Krajnc, M.; Korosec, R. C.; Bukovek, P. Sol-gel-derived Thin Ceramic CoAl2O4 Coatings for Optical Applications. Mater. Technol. 2002, 36, 387-394.

(65) Ouandi, N.; Guillemet, S.; Durand, B.; El Ouatib, Rakho, L. E.; Moussa, R.; Samdi, A. Synthesis of CoA2lO4 by Double Decomposition Reaction Between LiAlO2 and Molten KCoCl3. J. Eur. Ceram. Soc. 2008, 28, 1987-1994.

(66) Salleh, N. F. M.; Jalil, A. A.; Triwahyono, S.; Efendi, J.; Mukti, R. R.; Hameed, B. H. New Insight into Electrochemical-induced Synthesis of NiAl2O4/Al2O3: Synergistic Effect of Surface Hydroxyl Groups and Magnetism for Enhanced Adsorptivity of Pd(II). Appl. Surf. Sci. 2015, 349, 485-495.

(67) Preudhomme, J.; Tarte, P. Infrared Studies of Spinels—III: The Normal II-III Spinels. Spectrochim. Acta, Part A 1971, 27, 1817-1835.

(68) Ghiasi, M.; Malekzadeh, A.; Mardani, H. Synthesis and Optical Properties of Cubic Co3O4 Nanoparticles via Thermal Treatment of a Trinuclear Cobalt Complex. Mater. Sci. Semicond. Process. 2016, 42, 311-318.

(69) McClure, D. The Distribution of Transition Metal Cations in Spinels. J. Phys. Chem. Solids 1957, 3, 311-317.

(70) Ragupathi, C.; Vijaya, J. J.; Kennedy, L. J. Preparation, Characterization and Catalytic Properties of Nickel Aluminate Nanoparticles: A Comparison Between Conventional and Microwave Method. J. Saudi Chem. Soc. 2017, 21, S231S239.

(71) Meyer, F.; Hempelmann, R.; Mathur, S.; Veith, M. Micro-emulsion Mediated Sol-gel Synthesis of Nano-scaled MAl2O4 (M═Co, Ni, Cu) Spinels from Single-source Heterobimetallic Alkoxide Precursors. J. Mater. Chem. 1999, 9, 1755-1763.

(72) Leal, E.; de Melo Costa, A. C. F.; de Freita, N. L.; de Lucena Lira, H.; Goldschmidt Aliaga Kiminami, R. H.;

Gama, L. NiAl2O4 Catalysts Prepared by Combustion Reaction using Glycine as Fuel. Mater. Res. Bull. 2011, 46, 1409-1413.
(73) Allahyar, S.; Taheri, M.; Abharya, A.; Mohammadi, K. Simple New Synthesis of Nickel Oxide (NiO) in Water using Microwave Irradiation. J. Mater. Sci.: Mater. Electron. 2017, 28, 2846-2851.
(74) Balamurugan, S.; Philip, A. J. L.; Vidya, R. S. A Versatile Combustion Synthesis and Properties of Nickel Oxide (NiO) Nanoparticles. J. Supercond. Novel Magn. 2016, 29, 2207-2212.
(75) Busca, G.; Lorenzelli, V.; Escribano, V.; Guidetti, R. FT-IR Study of the Surface-Properties of the Spinels NiAl2O4 and CoAl2O4 in Relation to Those of Transitional Aluminas. J. Catal. 1991, 131, 167-177.
(76) Ribeiro, N. F. P.; Neto, R. C. R.; Moya, S. F.; Souza, M. M. V. M; Schmal, M. Synthesis of NiAl2O4 with High Surface Area as Precursor of Ni Nanoparticles for Hydrogen Production. Int. J. Hydrogen Energy 2010, 35, 11725-11732.
(77) Fu, L.; Yang, H.; Hu, Y.; Wu, D.; Navrotsky. A. Tailoring Mesoporous α-Al2O3 Properties by Transition Metal Doping: A Combined Experimental and Computational Study. Chem. Mater. 2017, 29, 1338-1349.
(78) Kruk, M.; Jaroniec, M. Gas Adsorption Characterization of Ordered Organic-Inorganic Nanocomposite Materials. Chem. Mater. 2001, 13, 3169-3183.
(79) Kruk, M.; Jaroniec, M.; Sayari, A. Application of Large Pore MCM-41 Molecular Sieves to Improve Pore Size Analysis Using Nitrogen Adsorption Measurements. Langmuir 1997, 13, 6267-6273.
(80) Cao, L.; Man, T.; Kruk, M. Synthesis of Ultra-Large-Pore SBA-15 Silica with Two-Dimensional Hexagonal Structure Using Triisopropylbenzene as Micelle Expander. Chem. Mater. 2009, 21, 1144-1153.
(81) Tang, H.; Gunathilake, C.; Zhou, X.; Jaroniec, M. Polymer-templated Mesoporous Hybrid Oxides of Al and Cu: Highly Porous Sorbents for Ammonia. RSC Adv. 2016, 6, 38662-38670.
(82) Hinokuma, S.; Matsuki, S.; Kawabata, Y.; Shimanoe, H.; Kiritoshi, S.; Machida, M. Copper Oxides Supported on Aluminum Oxide Borates for Catalytic Ammonia Combustion. J. Phys. Chem. C 2016, 120, 24734-24742.
(83) Hinokuma, S.; Shimanoe, H.; Matsuki, S.; Kawano, M.; Kawabata, Y.; Machida, M. Catalytic Activity and Selectivities of Metal Oxides and Pt/Al2O3 for NH3 Combustion. Chem. Lett. 2016, 45, 179-181.
(84) Liu, E.; Sarkar, B.; Wang, L.; Naidu, R. Copper-complexed Clay/poly-acrylic Acid Composites: Extremely Efficient Adsorbents of Ammonia Gas. Appl. Clay Sci. 2016, 121, 154-161.

What is claimed is:

1. A crystalline material comprising: porous metal aluminum oxide, comprising $MeAl_2O_4$ or $MeAl_3$, or metal aluminum oxide on an alumina ($Al_2O_3$) support, or any combination thereof, wherein said metal (Me) comprises nickel, cobalt, copper, manganese, iron, lanthanum, cerium or magnesium, or any combination thereof, said crystalline material having a high specific surface area of from about 5 to about 410 m$^2$/g, and a porosity of less than about 2.5 cm$^3$/g.

2. The crystalline material of claim 1, wherein said surface area is from about 20 to about 330 m$^2$/g, and wherein said porosity is from about 0.5 to about 2.1 cm$^3$/g.

3. The crystalline material of claim 2, wherein said surface area is from about 150 m$^2$/g to about 330 m$^2$/g, and wherein said porosity is from about 0.5 cm$^3$/g to about 1.5 cm$^3$/g.

4. The crystalline material of claim 1, wherein said metal aluminum oxide is said $MeAl_2O_4$, $MeAl_3$ or $Me_2AlO_4$.

5. The crystalline material of claim 1, wherein said metal aluminum oxide is said $MeAl_2O_4$, $MeAlO_3$ or $Me_2AlO_4$ on an alumina ($Al_2O_3$) support.

6. The crystalline material of claim 3, wherein said metal aluminum oxide is said $MeAl_2O_4$, $MeAl_2O_3$ or $Me_2AlO_4$ and is derived from boehmite.

7. The crystalline material of claim 3, wherein said metal aluminum oxide is said $MeAl_2O_4$ on an alumina ($Al_2O_3$) support and is derived from boehmite.

* * * * *

UNITED STATES PATENT AND TRADEMARK OFFICE
CERTIFICATE OF CORRECTION

PATENT NO. : 11,643,333 B2
APPLICATION NO. : 16/658481
DATED : May 9, 2023
INVENTOR(S) : Mietek Jaroniec and Alexandre A. S. Goncalves It is certified that error appears in the above-identified patent and that said Letters Patent is hereby corrected as shown below:

In the Claims

In Claim 1, second Line, "MeAl3" should be replaced with --MeAlO3--.

In Claim 4, second Line, "MeAi3" should be replaced with --MeAlO3--.

In Claim 6, second Line, "MeAl2O3" should be replaced with --MeAlO3--.

Signed and Sealed this
Twentieth Day of June, 2023

Katherine Kelly Vidal
*Director of the United States Patent and Trademark Office*